US011573097B2

(12) United States Patent
Khoe et al.

(10) Patent No.: US 11,573,097 B2
(45) Date of Patent: *Feb. 7, 2023

(54) LOCATION-BASED FEATURES FOR COMMUTE ASSISTANT

(71) Applicant: Apple Inc., Cupertino, CA (US)

(72) Inventors: May-Li Khoe, San Francisco, CA (US); Joseph A. Hagedorn, San Francisco, CA (US); Marcel van Os, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 413 days.

This patent is subject to a terminal disclaimer.

(21) Appl. No.: 16/228,212

(22) Filed: Dec. 20, 2018

(65) Prior Publication Data

US 2019/0145793 A1   May 16, 2019

Related U.S. Application Data

(63) Continuation of application No. 14/081,526, filed on Nov. 15, 2013, now Pat. No. 10,215,586.

(Continued)

(51) Int. Cl.
| G01C 21/36 | (2006.01) |
| G01C 21/26 | (2006.01) |
| G01C 21/34 | (2006.01) |
| G01C 21/32 | (2006.01) |
| G08G 1/13 | (2006.01) |

(52) U.S. Cl.
CPC ......... G01C 21/3694 (2013.01); G01C 21/26 (2013.01); G01C 21/32 (2013.01); G01C 21/34 (2013.01); G01C 21/3423 (2013.01); G01C 21/3661 (2013.01); G08G 1/13 (2013.01)

(58) Field of Classification Search
CPC .... G01C 21/3694; G01C 21/26; G01C 21/32; G01C 21/34; G01C 21/3423; G01C 21/3661; G08G 1/13
See application file for complete search history.

(56) References Cited

U.S. PATENT DOCUMENTS 4,914,605 A     4/1990  Loughmiller et al.
5,170,165 A  *  12/1992  Iihoshi ................... G01C 21/30
                                                            340/995.22

(Continued)

FOREIGN PATENT DOCUMENTS

CN    102840866 A    12/2012
EP     1102037 A1     5/2001

(Continued)

OTHER PUBLICATIONS

Ruhs, Chris, "My Favorite Android Apps: Maps," Jun. 24, 2011, 1 page, available at http://www.youtube.com/watch?v=v2aRkLkLT3s.

(Continued)

*Primary Examiner* — Ig T An
(74) *Attorney, Agent, or Firm* — Invoke

(57) ABSTRACT

Some embodiments provide a commute application that provides a first presentation of several stops along a route. The commute application also receives a selection of a stop from the several stops along the route. The commute application further provides a second presentation for displaying several different routes that traverse through the selected stop.

26 Claims, 45 Drawing Sheets

Related U.S. Application Data

(60) Provisional application No. 61/830,055, filed on Jun. 1, 2013.

(56) References Cited

U.S. PATENT DOCUMENTS

| | | | |
|---|---|---|---|
| 5,265,024 A * | 11/1993 | Crabill | G05D 1/0055 342/26 A |
| 5,289,572 A | 2/1994 | Yano et al. | |
| 5,448,485 A * | 9/1995 | Ishibashi | B61L 27/0016 340/988 |
| 5,654,892 A | 8/1997 | Fujii et al. | |
| 6,115,655 A * | 9/2000 | Keith | G01C 21/26 701/33.4 |
| 6,175,805 B1 * | 1/2001 | Abe | G01C 21/32 701/410 |
| 6,282,489 B1 | 8/2001 | Bellesfield et al. | |
| 6,321,158 B1 * | 11/2001 | DeLorme | G01C 21/26 340/995.16 |
| 6,393,346 B1 * | 5/2002 | Keith | G01C 21/26 340/438 |
| 6,587,780 B2 | 7/2003 | Trovato | |
| 6,732,047 B1 * | 5/2004 | de Silva | G01C 21/3611 340/988 |
| 7,469,827 B2 | 12/2008 | Katragadda et al. | |
| 7,486,201 B2 * | 2/2009 | Kelly | G01C 21/3694 340/905 |
| 7,522,995 B2 * | 4/2009 | Nortrup | G08G 1/0967 701/425 |
| 7,746,343 B1 | 6/2010 | Charaniya et al. | |
| 7,925,427 B2 | 4/2011 | Zehler | |
| 7,957,871 B1 | 6/2011 | Echeruo | |
| 7,996,045 B1 | 8/2011 | Bauer et al. | |
| 8,185,297 B2 * | 5/2012 | MacLeod | G01C 21/3694 701/119 |
| 8,285,310 B1 | 10/2012 | Shrum, Jr. et al. | |
| 8,315,801 B2 | 11/2012 | Takagi | |
| 8,355,862 B2 | 1/2013 | Matas et al. | |
| 8,464,182 B2 | 6/2013 | Blumenberg et al. | |
| 8,489,641 B1 | 7/2013 | Seefeld et al. | |
| 8,520,002 B2 | 8/2013 | Stambaugh | |
| 8,606,516 B2 | 12/2013 | Vertelney et al. | |
| 8,607,167 B2 | 12/2013 | Matas et al. | |
| 8,639,654 B2 | 1/2014 | Vervaet et al. | |
| 8,762,048 B2 | 6/2014 | Kosseifi et al. | |
| 8,781,716 B1 * | 7/2014 | Wenneman | G08G 1/0129 701/118 |
| 8,798,918 B2 | 8/2014 | Onishi et al. | |
| 8,849,564 B2 | 9/2014 | Mutoh | |
| 8,874,361 B2 * | 10/2014 | Krumm | G01C 21/32 701/400 |
| 8,996,312 B1 * | 3/2015 | Freund | G06Q 10/047 701/533 |
| 9,043,150 B2 | 5/2015 | Forstall et al. | |
| 9,062,985 B2 | 6/2015 | Demiryurek et al. | |
| 9,140,570 B1 * | 9/2015 | Baird | G01C 21/3682 |
| 9,154,982 B2 * | 10/2015 | Chan | H04W 24/08 |
| 9,239,246 B2 * | 1/2016 | Jones | G01C 21/3682 |
| 9,494,436 B2 * | 11/2016 | Yanku | G01C 21/3661 |
| 9,568,331 B1 * | 2/2017 | Narang | G01C 21/3617 |
| 9,602,977 B2 * | 3/2017 | Gueziec | G01C 21/3407 |
| 9,958,280 B2 * | 5/2018 | Scofield | G01C 21/3423 |
| 9,983,021 B1 * | 5/2018 | Baird | G01C 21/343 |
| 2001/0056325 A1 | 12/2001 | Pu et al. | |
| 2002/0057212 A1 * | 5/2002 | Hamilton | G08G 1/137 340/988 |
| 2002/0069017 A1 | 6/2002 | Schmier et al. | |
| 2002/0099500 A1 | 7/2002 | Schmier et al. | |
| 2003/0109266 A1 | 6/2003 | Rafiah et al. | |
| 2003/0229446 A1 * | 12/2003 | Boscamp | G08G 1/0962 701/469 |
| 2004/0024525 A1 * | 2/2004 | Maruyama | G07C 5/085 340/995.18 |
| 2004/0070602 A1 | 4/2004 | Kobuya et al. | |
| 2004/0158395 A1 | 8/2004 | Yamada et al. | |
| 2004/0236498 A1 | 11/2004 | Le et al. | |
| 2004/0257340 A1 * | 12/2004 | Jawerth | G06F 3/04892 345/157 |
| 2005/0197767 A1 * | 9/2005 | Nortrup | H04W 4/027 701/420 |
| 2005/0216301 A1 * | 9/2005 | Brown | G06Q 10/047 705/5 |
| 2005/0273251 A1 | 12/2005 | Nix et al. | |
| 2005/0273252 A1 | 12/2005 | Nix et al. | |
| 2006/0041372 A1 | 2/2006 | Kubota et al. | |
| 2006/0267959 A1 * | 11/2006 | Goto | G06F 3/0488 345/173 |
| 2007/0138347 A1 * | 6/2007 | Ehlers | G08G 1/096844 246/1 R |
| 2007/0159355 A1 * | 7/2007 | Kelly | G08G 1/096716 340/905 |
| 2008/0030379 A1 | 2/2008 | Park | |
| 2008/0068221 A1 | 3/2008 | Park | |
| 2008/0103686 A1 | 5/2008 | Alberth et al. | |
| 2008/0288884 A1 | 11/2008 | Daughtrey | |
| 2009/0063041 A1 | 3/2009 | Hirose et al. | |
| 2009/0118998 A1 * | 5/2009 | Chau | G06Q 30/0226 701/120 |
| 2009/0119001 A1 | 5/2009 | Moussaeiff et al. | |
| 2009/0143977 A1 | 6/2009 | Beletski et al. | |
| 2009/0150069 A1 * | 6/2009 | Iao | G01C 21/3614 701/426 |
| 2009/0177387 A1 * | 7/2009 | Liu | G01C 21/20 701/533 |
| 2009/0198767 A1 | 8/2009 | Jakobson et al. | |
| 2009/0254273 A1 | 10/2009 | Gill et al. | |
| 2010/0045704 A1 | 2/2010 | Kim | |
| 2010/0094531 A1 * | 4/2010 | MacLeod | G06T 13/00 701/119 |
| 2010/0115030 A1 | 5/2010 | Hong et al. | |
| 2010/0125403 A1 * | 5/2010 | Clark | G09B 29/10 701/120 |
| 2010/0153010 A1 | 6/2010 | Huang | |
| 2010/0191457 A1 * | 7/2010 | Harada | G01C 21/3617 701/533 |
| 2010/0227593 A1 | 9/2010 | Myr | |
| 2010/0253549 A1 | 10/2010 | Kim et al. | |
| 2010/0268450 A1 * | 10/2010 | Evanitsky | G01C 21/3423 701/533 |
| 2010/0280853 A1 | 11/2010 | Petralia et al. | |
| 2010/0302236 A1 | 12/2010 | Kinnan et al. | |
| 2010/0305850 A1 * | 12/2010 | Krumm | G01C 21/32 701/532 |
| 2011/0077807 A1 | 3/2011 | Hyde et al. | |
| 2011/0130916 A1 | 6/2011 | Mayer | |
| 2011/0153186 A1 | 6/2011 | Jakobson | |
| 2011/0167058 A1 | 7/2011 | Van Os | |
| 2011/0295942 A1 | 12/2011 | Raghunath et al. | |
| 2011/0301835 A1 * | 12/2011 | Bongiorno | G01C 21/343 705/5 |
| 2012/0001029 A1 * | 1/2012 | Kondo | B61L 15/0027 246/108 |
| 2012/0023097 A1 | 1/2012 | Lebeau et al. | |
| 2012/0041674 A1 | 2/2012 | Katzer | |
| 2012/0105475 A1 | 5/2012 | Tseng | |
| 2012/0253659 A1 | 10/2012 | Pu et al. | |
| 2012/0254804 A1 | 10/2012 | Sheha et al. | |
| 2012/0303263 A1 | 11/2012 | Alam et al. | |
| 2012/0307676 A1 * | 12/2012 | Chan | H04W 24/08 370/252 |
| 2013/0030849 A1 * | 1/2013 | Bongiorno | G06Q 10/025 705/6 |
| 2013/0046456 A1 * | 2/2013 | Scofield | G01C 21/3453 701/117 |
| 2013/0117057 A1 * | 5/2013 | Van Moltke | G01C 21/3415 705/7.13 |
| 2013/0191020 A1 | 7/2013 | Emani et al. | |
| 2013/0234868 A1 | 9/2013 | Koth | |
| 2013/0328924 A1 | 12/2013 | Arikan et al. | |
| 2013/0344802 A1 | 12/2013 | Armour et al. | |

(56) References Cited

U.S. PATENT DOCUMENTS

| | | | |
|---|---|---|---|
| 2014/0012498 A1* | 1/2014 | Gustafson | G01C 21/3423 701/468 |
| 2014/0067257 A1* | 3/2014 | Dave | H04W 4/40 701/423 |
| 2014/0095066 A1 | 4/2014 | Bouillet et al. | |
| 2014/0129135 A1 | 5/2014 | Holden et al. | |
| 2014/0142834 A1* | 5/2014 | Maitra | G01C 21/3423 701/117 |
| 2014/0309923 A1* | 10/2014 | Ricci | G01C 21/3484 701/400 |
| 2014/0330505 A1* | 11/2014 | Wenneman | G08G 1/0129 701/117 |
| 2014/0343843 A1* | 11/2014 | Yanku | G01C 21/3632 701/491 |
| 2014/0358409 A1 | 12/2014 | Khoe et al. | |
| 2014/0358410 A1 | 12/2014 | Khoe et al. | |
| 2014/0358411 A1 | 12/2014 | Khoe et al. | |
| 2014/0372904 A1 | 12/2014 | Liu et al. | |
| 2015/0046083 A1 | 2/2015 | Maitra et al. | |
| 2015/0142301 A1* | 5/2015 | Dave | G01C 21/3461 701/423 |
| 2015/0177017 A1* | 6/2015 | Jones | G01C 21/3682 701/428 |
| 2015/0262399 A1 | 9/2015 | Popescu | |
| 2016/0012724 A1* | 1/2016 | Ahiko | B61L 27/0016 340/994 |
| 2016/0334235 A1* | 11/2016 | Gustafson | G01C 21/3492 |

FOREIGN PATENT DOCUMENTS

| | | | | |
|---|---|---|---|---|
| EP | 2853467 A1 | * | 4/2013 | B61L 25/02 |
| EP | 2672225 A2 | | 12/2013 | |
| EP | 2672226 A2 | | 12/2013 | |
| EP | 2853467 A1 | * | 4/2015 | B61L 25/02 |
| WO | 2011/146141 A1 | | 11/2011 | |
| WO | 2012/034581 A1 | | 3/2012 | |
| WO | 2013/184348 A2 | | 12/2013 | |
| WO | 2013/184444 A2 | | 12/2013 | |
| WO | 2013/184449 A2 | | 12/2013 | |
| WO | 2014/151145 A2 | | 9/2014 | |

OTHER PUBLICATIONS

Google Transit App.

Author Unknown, "Google Maps Voice Navigation in Singapore," software2tech, Jul. 20, 2011, 1 page, available at http://www.youtube.com/watch?v=7B9JN7BkvME.

Author Unknown, "Garmin. nuvf 1100/1200/1300/1400 series owner's manual," Jan. 2011, 72 pages, Garmin Corporation, No. 68, Jangshu 2nd Road, Sijhih, Taipei County, Taiwan.

Author Unknown, "Android 2.3.4 User's Guide", May 20, 2011, pp. 1-384, Google, Inc.

Author Unknown, "'Touch & Go' Owner's Manual," Jul. 2011, 218 pages, Toyota, United Kingdom.

* cited by examiner

LOCATION-BASED FEATURES FOR COMMUTE ASSISTANT

INCORPORATION BY REFERENCE

Each of the following applications are hereby incorporated by reference: application Ser. No. 14/081,526 filed on Nov. 15, 2013 and application No. 61/830,055 filed on Jun. 1, 2013. The Applicant hereby rescinds any disclaimer of claim scope in the parent applications or the prosecution history thereof and advises the USPTO that the claims in this application may be broader than any claim in the parent applications.

BACKGROUND

A countless number of cities and regions around the world have public and/or private transit systems that provides passenger transport services between locations in the cities and regions, and in some cases, other cities and regions. Such transit systems use any number of different modes of transit such as buses, shuttles, trains, metros, subways, air planes, helicopters, boats, etc.

The majority of the transit systems operate on set schedules that specify pickup and arrival times at stops along the different routes offered by the transit systems. Software developers today have created applications that allow users to view these schedules while the users are mobile and on the move. Many of the applications also provide a map that shows the paths traveled by the transit system's different routes along.

BRIEF SUMMARY

Some embodiments of the invention provide a novel commute application that has several features for viewing routes and schedules for the routes. In some embodiments, the commute application provides a novel user interface that presents the routes and the schedules for the routes in an intuitive and fluid manner. For instance, the commute application of some embodiments includes several user interface widgets for facilitating the presentation of different routes that are part of different transit systems in a way that different route alternatives can be easily viewed.

In some embodiments, the commute application provides a dynamic focus table that dynamically presents schedules for trips along a particular route. For instance, when a particular route is selected to view its details, the dynamic focus table of some embodiments automatically presents the next upcoming trip along the particular route. In some embodiments, the dynamic focus table displays the next upcoming trip information based on the current time of the device, on which the commute application is executing, and also the current location of the device. In other embodiments, this table shows the next upcoming trip based on the current time of the device, and not based on the current location of the device.

In some embodiments, the dynamic focus table allows a user to quickly scroll through all the trips that are scheduled to travel along the particular route throughout the day or for a certain period of time. In some embodiments, the commute application receives updates to the arrival and departure time of transit vehicles at each stop along a route from a set of servers operated by a transit operator or from one or more third parties that collect this information from the transit operator or from equipment that these parties install on the transit vehicles.

The commute application of some embodiments includes a location-centric user interface widget that allows a user to browse all the trips along routes that stop at and/or pass through a particular location, irrespective of the time of the trips, the mode of transit used for the trips, and the destinations of the trips. For instance, in some embodiments, the commute application provides a user interface widget that allows a user to select a particular stop and view all the different trips along all the different routes that stop at and/or pass through the particular stop. Alternatively, or in conjunction, the commute application of some embodiments allows the user to view all the different trips along all the different routes that stop at and/or pass through the user's location or near the user's location.

The commute application of some embodiments displays different graphical representations of transit systems, routes, stops and/or schedules for different localities. For instance, in some embodiments, the elements of graphical representations (e.g., fonts, icons, symbols, colors, shapes, etc.) in each particular locality are defined differently based on the graphical representations of the transit data (e.g., the route data, stop data, schedule data, etc.) that the transit system operator or operators use in that locality. This approach allows the commute application to customize the views (e.g., map views, list views, etc.) displayed in the commute application to match the graphical representation of the transit data in different localities, which, in turn, causes the application to appear more realistic to the user of the application.

In some embodiments, a set of servers receives the graphical representations of the transit systems, routes, stops and schedules for each locality (e.g., each city, state, etc.) from one or more transit system data providers (e.g., train operators, bus operators, etc.) of the locality and/or third parties that work with these data providers. This set of servers then provides the received graphical representations to specify the route, stop, and schedule display for a particular locality to a device's commute application when the device is operating in that particular locality.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
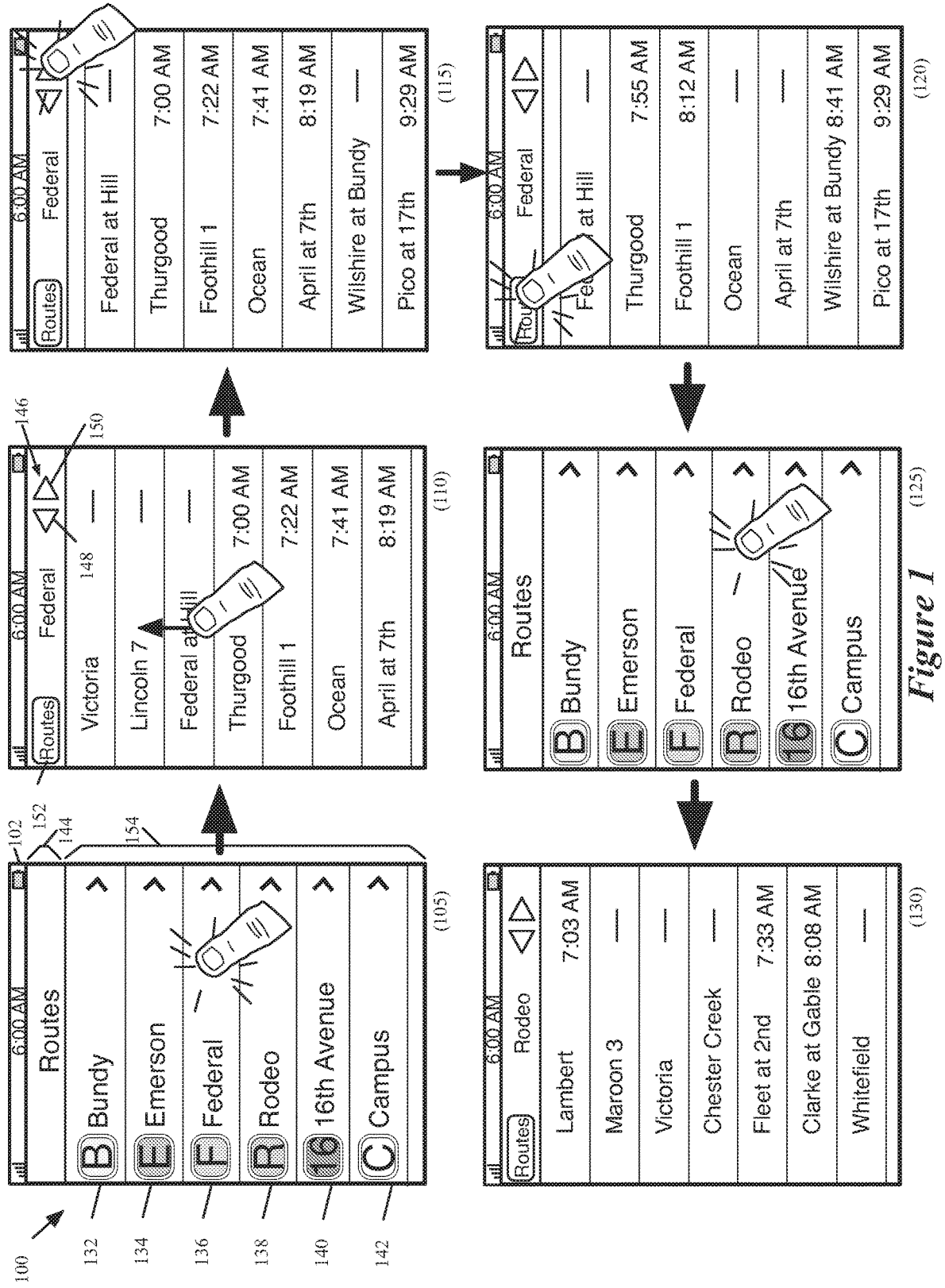
FIG. 1 conceptually illustrates the commute application of some embodiments providing different routes and scheduled times of trips along the different routes.

In the following detailed description of the invention, numerous details, examples, and embodiments of the invention are set forth and described. However, it will be clear and apparent to one of ordinary skill in the art that the invention is not limited to the embodiments set forth and that the invention may be practiced without some of the specific details and examples discussed.

Some embodiments of the invention provide a novel commute application that has several features for viewing routes and schedules for the routes of one or more transit systems. In some embodiments, the commute application provides a novel user interface that presents the routes and the schedules for the routes in an intuitive and fluid manner. For instance, the commute application of some embodiments includes several user interface widgets for facilitating the presentation of different routes that are part of different transit systems in a way that different route alternatives can be easily viewed.

In some embodiments, the commute application provides a dynamic focus table that dynamically presents schedules for trips along a particular route. For instance, when a particular route is selected to view its details, the dynamic focus table of some embodiments automatically presents the next upcoming trip along the particular route. In some embodiments, the dynamic focus table allows a user to quickly scroll through all the trips that are scheduled to travel along the particular route throughout the day or in a certain period of time.

The commute application of some embodiments includes a location-centric user interface widget that allows a user to browse all the trips along routes that stop at and/or pass through a particular location, irrespective of the time of the trips, the mode of transit used for the trips, and the destinations of the trips. For instance, in some embodiments, the commute application provides a user interface widget that allows a user to select a particular stop and view all the different trips along all the different routes that stop at and/or pass through the particular stop. Alternatively, or in conjunction, the commute application of some embodiments allows the user to view all the different trips along all the different routes that stop at and/or pass through the user's location or near the user's location.

In some embodiments, a route is a defined set of geographical locations that includes a start location, an end location, and one or more locations in between the start and end locations. The geographical locations of a route are referred to in some embodiments as stops or stop locations. The route of some embodiments may include only a start location and an end location (i.e., the route does not have any stop locations in between the start and end locations). Examples of geographical locations include intersections, street addresses, points of interest (e.g., a subway station, a restaurant, a coffee shop, etc.), a set of geographical coordinates (e.g., longitude and latitude coordinates), and/or any other type of information for specifying a geographical location.

The route of some embodiments is traveled along via a mode of transit (e.g., a bus, a shuttle, a train, a subway, a taxi, etc.). In some embodiments, a route is part of a transit system that includes a network of routes that are all traveled along using the same mode of transit. One or more routes in the network of routes of a transit system of some embodiments are traveled along using several different modes of transit. Examples of such a route include a bus line of a bus system, a subway line of a subway system, a train line of a railway system, etc.

This application frequently refers to a trip or trips along a route. In some embodiments, a trip along a route is defined as travel in one direction along the route via a transit vehicle that starts at one of the stops of the route, ends at another stop in the route, and may include any number of stops between the start and end stops. In some instances, a trip includes only a start stop and an end stop along the route.

FIG. 1 conceptually illustrates the commute application of some embodiments providing different routes and schedules for trips along the different routes. Specifically, FIG. 1 illustrates a graphical user interface (GUI) 100 of the commute application at six different stages 105-130 of providing schedules for trips along different routes.

The first stage 105 illustrates the GUI 100 displaying a page for viewing different routes. As shown, the page of the GUI 100 in the first stage 105 includes display areas 102, 144, and 154. In some embodiments, the display area 102 is for providing status information. As shown, the display area 102 in this example is displaying icons indicating the strength of a signal (e.g., cellular signal strength) being received at a device on which the commute application is operating, the strength of the battery powering the device, and the current time, which may be set manually by a user or automatically by the device.

In the first stage 105, the display area 144 is displaying a label "Routes" to indicate that the currently displayed page of the GUI 100 is displaying different routes. Also in the first stage 105, the display area 154 is displaying several selectable user interface (UI) items 132-142. Each UI item 132-142 is for transitioning to displaying a page of the GUI 100 that shows details of a particular route. As illustrated, each UI item 132-142 includes a graphical indicator (e.g., an icon) that represents the particular route.

In addition, the first stage 105 of the GUI 100 shows a user selecting one of the selectable UI items 132-142 in order to view details of a route. In particular, the user in this example is selecting the UI item 136 by using a finger to tap on the UI item 136 displayed on a touchscreen of a device on which the commute application is operating in order to view details of a route labeled Federal. When the commute application receives the selection of the UI item 136, the commute application of some embodiments transitions to displaying a page that shows the details of the Federal route.

The second stage 110 shows the GUI 100 after the user selected the UI item 136 to view the details of the Federal route. As shown, the second stage 110 of the GUI 100 shows a page in which the display area 144 is displaying the name of a route for which details are being displayed (the Federal route in this example), a UI control 146 for displaying the schedules for different trips along the route, and a selectable UI item 152 for transitioning back to the page of the GUI 100 displaying the different routes that is illustrated in the first stage 105.

The UI control 146 includes a selectable UI item 148 for displaying trip information for a trip that is scheduled to run before the trip for which trip information is currently being displayed in the display area 154. Additionally, the UI control 146 includes a selectable UI item 150 for displaying trip information for a trip that is scheduled to run after the trip for which trip information is currently displayed in the display area 154.

At the second stage 110, the display area 154 is displaying a table that includes the stops along a route selected from the page illustrated in the first stage 105. The table also displays a schedule for a trip along the selected route. As shown in the second stage 110, the display area 154 is displaying the top portion of the table that shows along the left side in separate rows of the table the first several stops along the Federal route that starts at a stop named Victoria followed by stops named Lincoln 7, Federal at Hill, Thurgood, Foothill 1, Ocean, and April at 7th. In addition, the top portion of the table shows along the right side of the corresponding rows in the table several times of the schedule for the first several stops of the trip along the Federal route. As illustrated, the trip is scheduled to start at the Thurgood stop at 7:00 AM and follows with stops at Foothill I at 7:22 AM, Ocean at 7:41 AM, and April at 7th at 8:19 AM.

As further described below, the commute application of some embodiments displays the stops of the route and their corresponding schedule based on the current time of the device. In some of these embodiments, the commute application also accounts for the location of the device on which the commute application is executing in determining what portion of a route to display. Also as illustrated in FIG. 1, some of the stops (e.g. Victoria, Lincoln 7, and Federal at Hill) in stage 110 do not have corresponding scheduled time. These stops may not have corresponding scheduled time for different reasons in different embodiments. For instance, the dynamic focus table of some embodiments does not provide scheduled time for a stop when the stop is not active, the stop is already passed in a particular trip, or the stop is not included in a trip that is currently being displayed in the dynamic focus table.

The second stage 110 of the GUI 100 shows the user performing a scroll operation on the table in order to view a different portion of the table. As shown in this example, the user is performing the scroll operation by using a finger to touch a location in the display area 154 displayed on the touchscreen and dragging the finger along the touchscreen in an upwards direction relative to the GUI 100 in order to scroll the table upwards and view the bottom of the table. The second stage 110 illustrates that the GUI 100 in this example provides the user a single point in the commute application at which to view the stops at the start and end of a particular route and any stops in between the start and end stops. When the commute application of some embodiments receives the described gesture input for scrolling the table, the commute application scrolls the table upwards with respect to the display area 154 to display the bottom portion of the table.

The third stage 115 illustrates the GUI 100 after the user performed the scrolling operation on the table to view the bottom portion of the table. In the third stage 115, the display area 154 is displaying the bottom portion of the table, which shows along the left side in separate rows of the table the last two stops named Wilshire at Bundy and Pico at 17th that follow the April at 7th stop along the Federal route. The bottom portion of the table also shows along the right side of the corresponding row in the table the time of the schedule for the last stop of the trip along the Federal route. As shown, the trip is scheduled to end at the Pico at 17th stop at 9:29 AM.

Additionally, the third stage 115 of the GUI 100 shows the user selecting one of the selectable UI items of the UI control 146 to view a schedule for a different trip along the Federal route. Specifically, the user in the third stage 115 is selecting the UI item 150 of the UI control 146 by using a finger to tap the UI item 150 displayed on the touchscreen in order to view a schedule for a different trip along the Federal route that is scheduled to run after the trip currently displayed in the third stage 115. When the commute application receives the selection of the UI item 150, the commute application of some embodiments replaces the schedule of the current trip displayed in the table with a schedule for a different trip along the Federal route that is scheduled to run after the trip currently displayed in the third stage 115. In some embodiments, upon receiving the selection of the UI item 150, the commute application replaces the table currently displayed in the display area 154 with a table that includes the same stops along the Federal route and a schedule for a different trip along the Federal route that is scheduled to run after the trip currently displayed in the third stage 115.

Next, the fourth stage 120 shows the GUI 100 after the user selected the UI item 150 to view a scheduled time for a different trip along the Federal route. As shown, the fourth stage 120 shows the display area 154 is displaying the bottom portion of the table illustrated in the second and third stages 110 and 115 except the table in the fourth stage 120 includes the schedule for a trip along the Federal route that is scheduled to run after the trip displayed in the third stage 115. In this example, the bottom portion of the table shows along the left side in separate rows of the table the same stops along the Federal route that are illustrated in the third stage 115. The bottom portion of the table also shows along the right side of the corresponding rows in the table several times of the schedule for the last several stops of the trip along the Federal route. As shown, the last several stops of the trip in this example is scheduled to stop at the Thurgood stop at 7:55 AM the Foothill I stop at 8:12 AM, the Wilshire at Bundy stop at 9:33 AM, and the Pico at 17th stop at 10:19 AM.

The fourth stage 120 of the GUI 100 also shows the user selecting the selectable UI item 152 to view the different routes shown in the first stage 105. As shown, the user in the fourth stage 120 is selecting the UI item 152 by using a finger to tap the UI item 152 displayed on the touchscreen in order to return to the page illustrated in the first stage 105 displaying different routes. Upon receiving the selection of the UI item 152, the commute application of some embodiments transitions to displaying the page illustrated in the first stage 105.

The fifth stage 125 illustrates the GUI 100 after the user selected the UI item 152 to view the page displaying the different routes illustrated in the first stage 105. For the example shown in the fifth stage 125, the user is selecting the UI item 138 by using a finger to tap on the UI item 138 displayed on the touchscreen in order to view details of a route labeled Rodeo. When the commute application receives the selection of the UI item 138, the commute application of some embodiments transitions to displaying a page that shows the details of the Rodeo route.

Finally, the sixth stage 130 shows the GUI 100 after the user selected the UI item 138 to view the details of the Rodeo route. As illustrated in the sixth stage 130, the GUI 100 is displaying a page in which the display area 144 is displaying the name of a route for which details are being displayed (the Rodeo route in this example) as well as the UI control 146 and the selectable UI item 152.

In addition, the display area 154 in the sixth stage 130 is displaying a table that includes the stops along the Rodeo route and a schedule for a trip along the Rodeo route. Specifically, the table shows along the left side in separate rows of the table the stops along the Rodeo route that starts at a stop named Lambert, continues with stops named Maroon 3, Victoria, Chester Creek, Fleet at 2nd, Clarke at Gable, and ends at a stop named Whitefield. The table in the sixth stage 130 also shows along the right side of the corresponding rows in the table times of the schedule for the stops of the trip along the Rodeo route. As illustrated, the trip is scheduled to start at the Lambert stop at 7:03 AM, follows with a stop at Fleet at 2nd at 7:33 AM, and ends at the Clarke and Gable stop at 8:08 AM.

Figure 2:
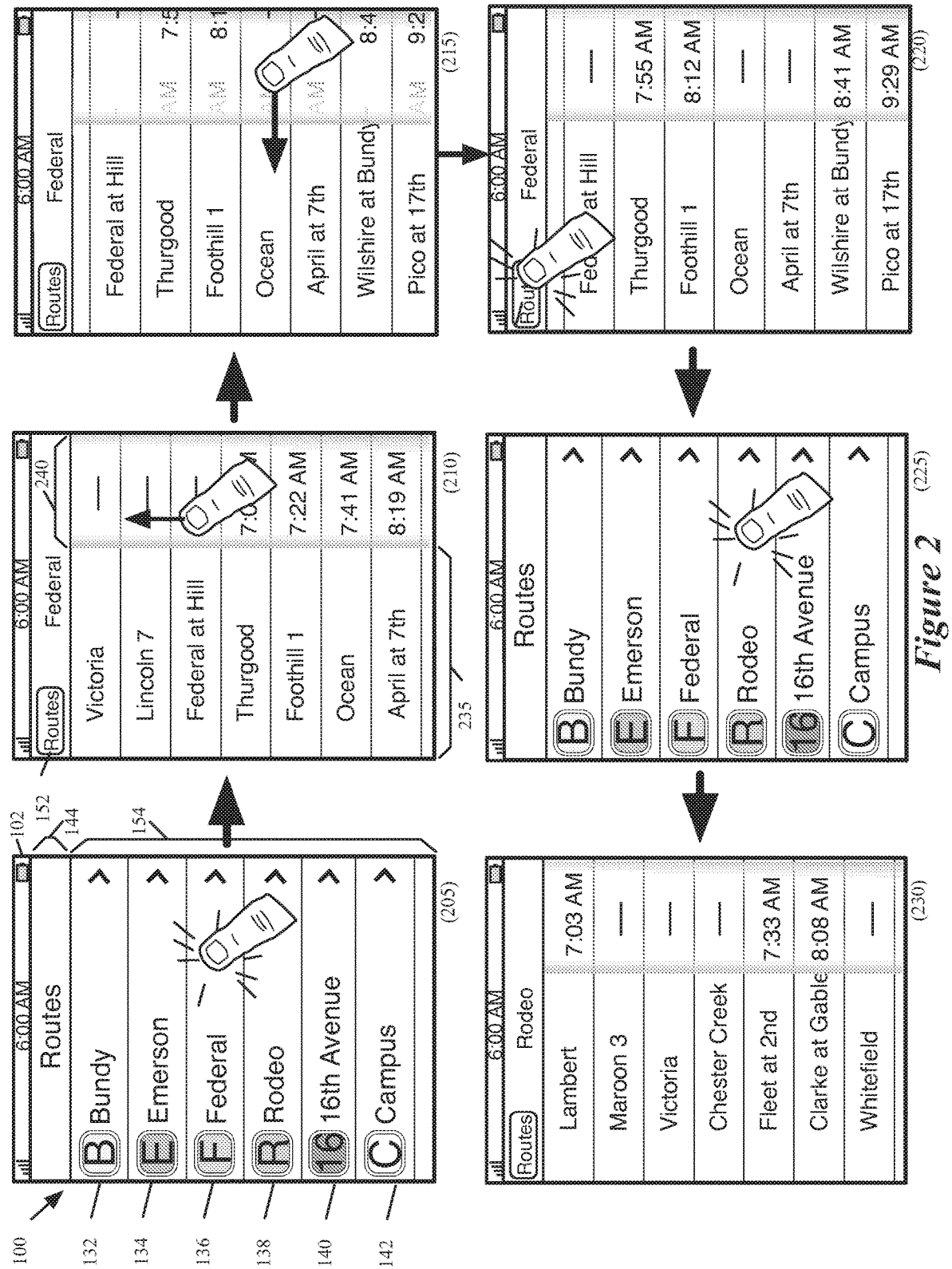
FIG. 2 conceptually illustrates the commute application of some embodiments providing different routes and scheduled times of trips along the different routes through a focus table.

FIG. 2 conceptually illustrates the commute application of some embodiments providing different routes and scheduled times of trips along the different routes through a focus table. In particular, FIG. 2 illustrates the GUI 100 of the commute application at six different stages 205-230 of providing schedules for trips along different routes.

The first stage 205 of the GUI 100 is the same as that GUI 100 illustrated in the first stage 105 described above by reference to FIG. 1. That is, the first stage 205 shows a page of the GUI 100 for viewing different routes. Specifically, the display area 102 is displaying icons indicating the strength of a signal being received at a device on which the commute application is operating, the strength of the battery powering the device, and the current time. Also in the first stage 205, the display area 144 is displaying the label "Routes" and the display area 154 is displaying the selectable UI items 132-142

Similar to the first stage 105 of FIG. 1, the first stage 205 shows a user selecting the UI item 136 by using a finger to tap on the UI item 136 displayed on the touchscreen of the device on which the commute application is operating in order to view details of a route labeled Federal. Upon receiving the selection of the UI item 136, the commute application of some embodiments transitions to a page displaying the details of the Federal route.

The second stage 210 shows the GUI 100 after the user selected the UI item 136 to view the details of the Federal route. As shown, the second stage 210 of the GUI 100 shows a page in which the display area 144 is displaying the name of a route for which details are being displayed (the Federal route in this example) and the selectable UI item 152.

The display area 154 in this example is for displaying a focus table that includes two columns 235 and 240. The column 235 is for displaying stops along a route selected from the page for displaying different routes illustrated in the first stage 205. The column 240 is for displaying a schedule for a trip along the selected route. As illustrated, the color by which column 240 is represented in the focus table is different than the color of the other column 235. In some embodiments, the difference in representation of columns of a focus table indicates that other user inputs (e.g., scrolling up/down, etc.) are available to receive more trips' information along a certain route. As shown, the display area 154 is displaying the top portion of a focus table that includes the stops along the Federal route, which the user selected in the first stage 205, and a schedule for a trip along the Federal route. Specifically, the top portion of the focus table is displaying in separate rows of the column 235 shows the same first several stops along the Federal route that are illustrated in the second stage 110 of FIG. 1. The top portion of the focus table is also displaying in corresponding rows of the column 240 the times of the schedule for the first several stops of the same trip along the Federal route as the times illustrated in the second stage 110 of FIG. 1.

The second stage 210 of the GUI 100 also shows the user performing a scroll operation on the focus table in order to view a different portion of the focus table. The user in this example is performing the scroll operation by using a finger to touch a location in the display area 154 displayed on the touchscreen and dragging the finger along the touchscreen in an upwards direction relative to the GUI 100 in order to scroll to the focus table upwards and view the bottom of the focus table. When the commute application of some embodiments receives the described gesture input for scrolling the focus table, the commute application scrolls the focus table upwards with respect to the display area 154 to display the bottom portion of the focus table.

The third stage 215 illustrates the GUI 100 after the user performed the scrolling operation on the focus table to view the bottom portion of the focus table. In the third stage 215, the display area 154 is displaying the bottom portion of the focus table, which shows in separate rows of the column 235 the last two stops of the same trip along the Federal Route illustrated in the third stage 115 of FIG. 1. Additionally, the bottom portion of the focus table shows in a corresponding row of the column 240 the time of the schedule for the last stop of the same trip along the Federal route shown in the third stage 115 of FIG. 1.

In addition, the third stage 215 of the GUI 100 shows the user performing a scroll operation on the column 240 of the focus table to view a schedule for a different trip along the Federal route. Specifically, the user in the third stage 215 is performing the scroll operation by using a finger to touch a location on the column 240 of the focus table in the display area 154 that is displayed on the touchscreen and dragging the finger along the touchscreen in a leftward direction relative to the GUI 100 in order to scroll a schedule for a different trip into view in the column 240.

In some embodiments, when the commute application receives the described gesture input for scrolling to the schedule for a different trip, the commute application slides the schedule for the current trip displayed in the column 240 out of view while sliding a schedule for a different trip along the Federal route into view. For this example, the commute application slides the schedules into and out of view such that the schedule for the current trip displayed in the column 240 appears to slide underneath the column 235 while the schedule for the different trip along the Federal route appears to slide out from the right side of the column 240 towards the left side of the column 240.

Next, the fourth stage 220 shows the GUI 100 after the user performed the scrolling operation on the column 240 to view a scheduled time for a different trip along the Federal route. In the fourth stage 220, the display area 154 is displaying the bottom portion of the focus table illustrated in the second and third stages 210 and 215 except the focus table in the fourth stage 220 includes the schedule for a trip along the Federal route that is scheduled to run after the trip displayed in the third stage 215. In this example, the bottom portion of the focus table in separate rows of the column 235 the same stops along the Federal route that are illustrated in the third stage 215. Additionally, the bottom portion of the focus table also shows in separate rows of the column 240 several times of the schedule for the last several stops of the same trip along the Federal route illustrated in the fourth stage 120 of FIG. 1.

The fourth stage 220 of the GUI 100 additionally shows the user selecting the selectable UI item 152 to view the different routes shown in the first stage 205. As illustrated, the user in the fourth stage 220 is selecting the UI item 152 by using a finger to tap the UI item 152 displayed on the touchscreen in order to return to the page illustrated in the first stage 205 displaying different routes. In some embodiments, when the commute application receives the selection of the UI item 152, the commute application transitions to displaying the page shown in the first stage 205.

The fifth stage 225 illustrates the GUI 100 after the user selected the UI item 152 to view the page displaying the different routes illustrated in the first stage 205. In addition, the fifth stage 225 of the GUI 100 illustrates the user selecting another one of the selectable UI items 132-142 in order to view details of a different route. The user in this example is selecting the UI item 138 by using a finger to tap on the UI item 138 displayed on the touchscreen in order to view details of a route labeled Rodeo. In some embodiments, upon receiving the selection of the UI item 138, the commute application transitions to displaying a page that shows the details of the Rodeo route.

Finally, the sixth stage 230 shows the GUI 100 after the user selected the UI item 138 to view the details of the Rodeo route. As illustrated, the GUI 100 is displaying a page in which the display areas 144 is displaying the name of a route for which details are being displayed (the Rodeo route in this example) and the selectable UI item 152.

The sixth stage 230 also shows the display area 154 displaying a focus table that includes the stops along the Rodeo route and a schedule for a trip along the Rodeo route. Specifically, the focus table shows in separate rows of the column 235 the same stops along the Rodeo route that are illustrated in the sixth stage 130 of FIG. 1. Additionally, the focus table in the sixth stage 230 shows in corresponding rows of the column 240 the times of the schedule for the stops of the same trip along the Rodeo route illustrated in the sixth stage 130 of FIG. 1.

While FIG. 2 illustrates an example of a focus table in which stops of a route and a schedule for a trip along the route are displayed in different columns, the commute application of some embodiments provides a focus table in which stops of a route and a schedule for a trip along the route are displayed in different rows. In some such embodiments, the schedules for different trips along the route are scrollable (e.g., along a vertical direction) through the row for displaying a schedule of a trip along the route.

Figure 3:
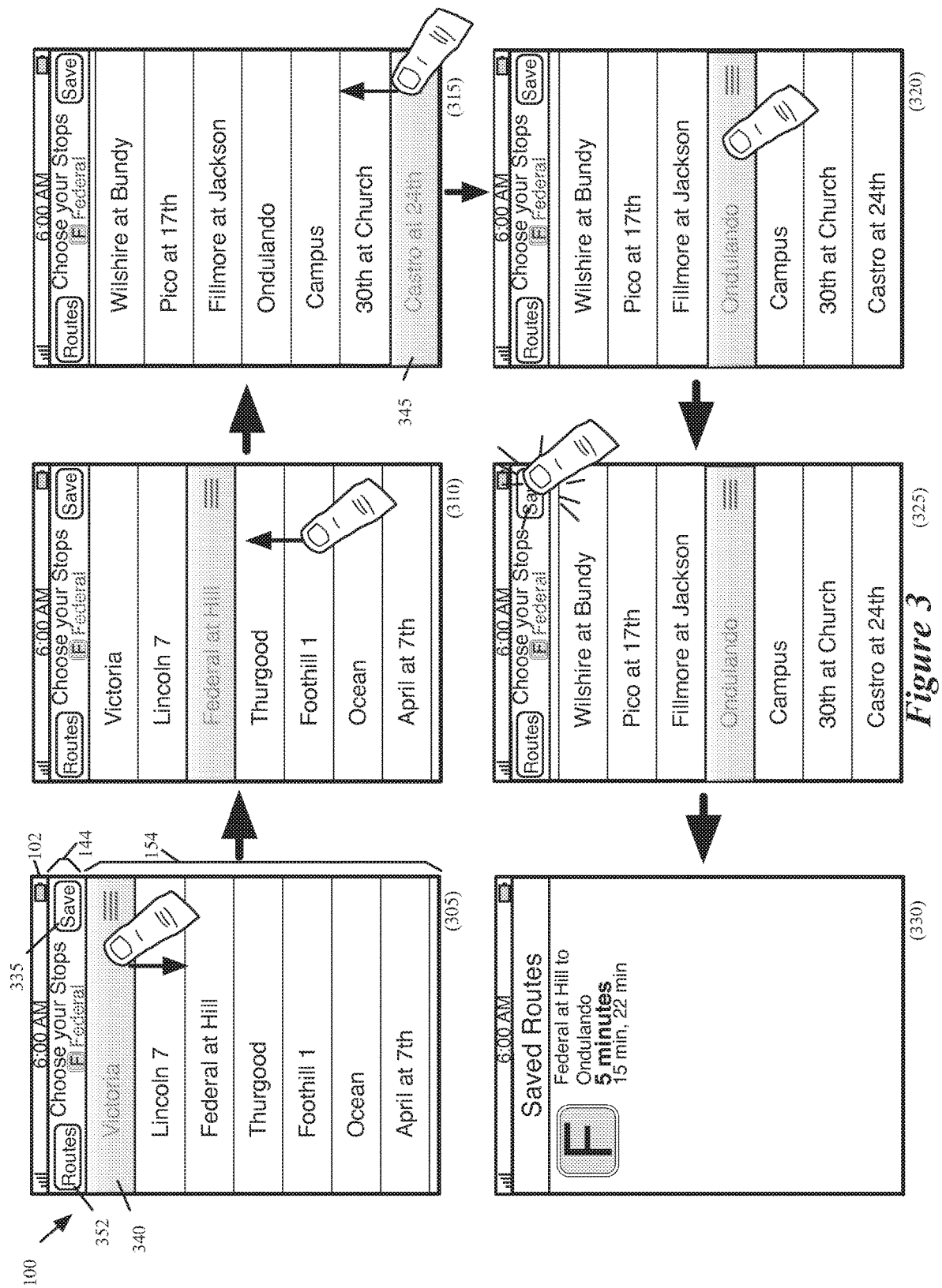
FIG. 3 conceptually illustrates the commute application of some embodiments that provides a feature for saving a route.

FIG. 3 conceptually illustrates the commute application of some embodiments that provides a feature for saving a route. Specifically, FIG. 3 illustrates the GUI 100 of the commute application at six different stages 305-330 of creating a saved route. In some embodiments, a saved route includes a portion of a defined route (e.g., the routes displayed in the first stage 105 of FIG. 1). The portion of the defined route in some embodiments includes some but not all of the stops in the defined route. In some embodiments, the portion of the defined route includes all the stops in the defined route.

The first stage 305 illustrates the GUI 100 displaying a page for creating a saved route. As shown in the first stage 305, the page of the GUI 100 includes the display areas 102, 144, and 154. The display area 102 in this stage 305 is displaying the same information that is displayed in the display area 102 described above by reference to FIGS. 1 and 2. The display area 144 is displaying in the first stage 305 a label Federal to indicate that the information currently displayed on page of the GUI 100 is for the Federal route, a selectable UI item 352 for transitioning back to a page of the GUI 100 displaying different routes (e.g., the page of the GUI 100 illustrated in the first stages of FIGS. 1 and 2), and a selectable UI item 335 for storing a saved route.

In this example, the display area 154 is for displaying a table that includes stops of a route, a movable UI control 340 for selecting a stop in the route as a starting point stop of a saved route, and a movable UI control 345 (not shown in the first stage 305) for selecting a stop in the route as an ending point stop of the saved route. For this example, the UI control 340 is positioned at a default location at the top of the table and the UI control 345 is positioned at a default location at the bottom of the table. In some embodiments, the UI controls 340 and 345 are referred to as stop pickers.

Additionally, the first stage 305 of the GUI 100 shows a user moving the UI control 340 to select a starting point stop for a saved route. In particular, the user in this example moves the UI control 340 by using a finger to touch the UI control 340 displayed on the touchscreen and dragging the finger along the touchscreen in a downward direction relative to the GUI 100 to a stop in the table displayed on the touchscreen in order to select the stop as the starting point stop of the saved route. When the commute application of some embodiments receives the described gesture input to select a stop in the table, the commute application moves the UI control 340 downwards with respect to the display area 154 and over the stop in the table.

The second stage 310 illustrates the GUI 100 after the user moved the UI control 340 to select a stop in the Federal route. As shown, the user in this example moved the UI control 340 over the Federal at Hill stop in the table to select the stop as the starting point stop of the saved route.

The second stage 310 of the GUI 100 also shows the user performing a scroll operation on the table in order to view a different portion of the table. For this example, the user is performing the scroll operation by using a finger to touch a location in the display area 154 displayed on the touchscreen and dragging the finger along the touchscreen in an upwards direction relative to the GUI 100 in order to scroll the table upwards and view the bottom of the table. In some embodiments, upon receiving the described gesture input for scrolling the table, the commute application scrolls the table upwards with respect to the display area 154 to display the bottom portion of the table.

The third stage 315 illustrates the GUI 100 after the user performed the scrolling operation on the table to view the bottom portion of the table. As shown, the display area 154 is displaying the bottom portion of the table, which shows in separate rows of the table the last several stops that follow the April at 7th stop along the Federal route. The last several stops in this example are named Wilshire at Bundy, Pico at 1i\ Filmore at Jackson, Ondulando, Campus, 30th at Church, and Castro at 24th. In addition, the third stage 315 shows the display area 154 displaying the UI control 345, which is positioned at the bottom of the table.

The third stage 315 of the GUI 100 further illustrates the user moving the UI control 345 to select an ending point stop for the saved route. For this example, the user moves the UI control 345 by using a finger to touch the UI control 345 displayed on the touchscreen and dragging the finger along the touchscreen in an upward direction relative to the GUI 100 to a stop in the table displayed on the touchscreen in order to select the stop as the ending point stop of the saved route. When the commute application receives the described gesture input to select a stop in the table, the commute application of some embodiments moves the UI control 345 upwards along the display area 154 and over the stop in the table.

The fourth stage 320 shows the user finished with moving the UI control 345 to the Ondulando stop in order to select the ending point stop in Federal route. In this example, the user moved the UI control 345 over the Ondulando stop in the table to select the stop as the ending point stop of the saved route.

The fourth stage 320 of the GUI 100 also illustrates the user performing a scroll operation on the table in order to view a different portion of the table. For this example, the user is performing the scroll operation by using a finger to touch a location in the display area 154 displayed on the touchscreen and dragging the finger along the touchscreen in an upwards direction relative to the GUI 100 in order to scroll the table upwards and view the bottom of the table. In some embodiments, upon receiving the described gesture input for scrolling the table, the commute application scrolls the table upwards with respect to the display area 154 to display the bottom portion of the table.

Next, the fifth stage 325 shows the user selecting the selectable UI item 335 to store the saved route according to the stops selected by the UI controls 340 and 345. The user in this example is selecting the UI item 335 by using a finger to tap the UI item 335 displayed on the touchscreen in order store the saved route. Upon receiving the selection of the UI item 335, the commute application of some embodiments stores (e.g., in a storage on the device) the saved route specifying the Federal at Hill stop in the Federal route as the starting point stop of the saved route and the Ondulando stop in the Federal route as the ending point stop of the saved route. After storing the saved route, the commute application of some embodiments transitions to displaying a page that displays a list of saved routes.

Finally, the sixth stage 330 illustrates the GUI 100 after the user selected the UI item 335 to create the saved route and the commute application transitioned to a page displaying a list of saved routes. As illustrated, the GUI 100 is displaying a page in which the display area 144 is displaying a label "Saved Routes" to indicate that the currently displayed page of the GUI 100 is displaying the current saved routes created and stored by the commute application.

As shown, the display area 154 in the sixth stage 330 is displaying information describing saved routes stored on the device. In this example, the saved route stored in the fifth stage 325 is the only saved route stored on the device. As shown, the information describing the saved route includes an icon indicating the route from which the saved route was created (the Federal route in this example), the starting and ending point stops of the saved route, and different countdown times for different trips along the saved route. In some embodiments, as shown in this example, the countdown times for the next three trips along the saved route are displayed. A countdown time in some embodiments indicates an amount of time until transit vehicles will arrive at the starting point stop of the saved route (the Federal at Hill stop in this example) based on the current time of the device. Specifically, the countdown times for the saved route in this example indicate that transit vehicles will arrive at the Federal at Hill stop in 5 minutes, 15 minutes, and 22 minutes. In some embodiments, the commute application constantly, or at defined intervals, updates the countdown times displayed in the display area 154. In some embodiments, the commute application updates the countdown times based on the updates that the commute application receives on the arrival and departure time of transit vehicles at each stop along a route from a set of servers operated by a transit operator or from one or more third parties that collect this information from the transit operator or from equipment that these parties install on the transit vehicles.

A general view of a commute application of some embodiments and how the application provides different routes and schedules for trips along the different routes, a focus table feature, and a feature for saving a route were described above by reference to FIGS. 1-3. Several more detailed embodiments of the invention are described below. Section I describes example features of a commute application of some embodiments. Next, Section II describes Dynamic Focus Table feature provided by the commute application of some embodiments. Section III then describes details and examples of Favorites feature provided by the commute application in some embodiments. Section IV presents several other features provided by the commute application of some embodiments. Section V describes the server side features and how data is provided to a commute application of some embodiments. Section VI describes an electronic system with which some embodiments of the invention are implemented.

I. Example Features

Figure 4:
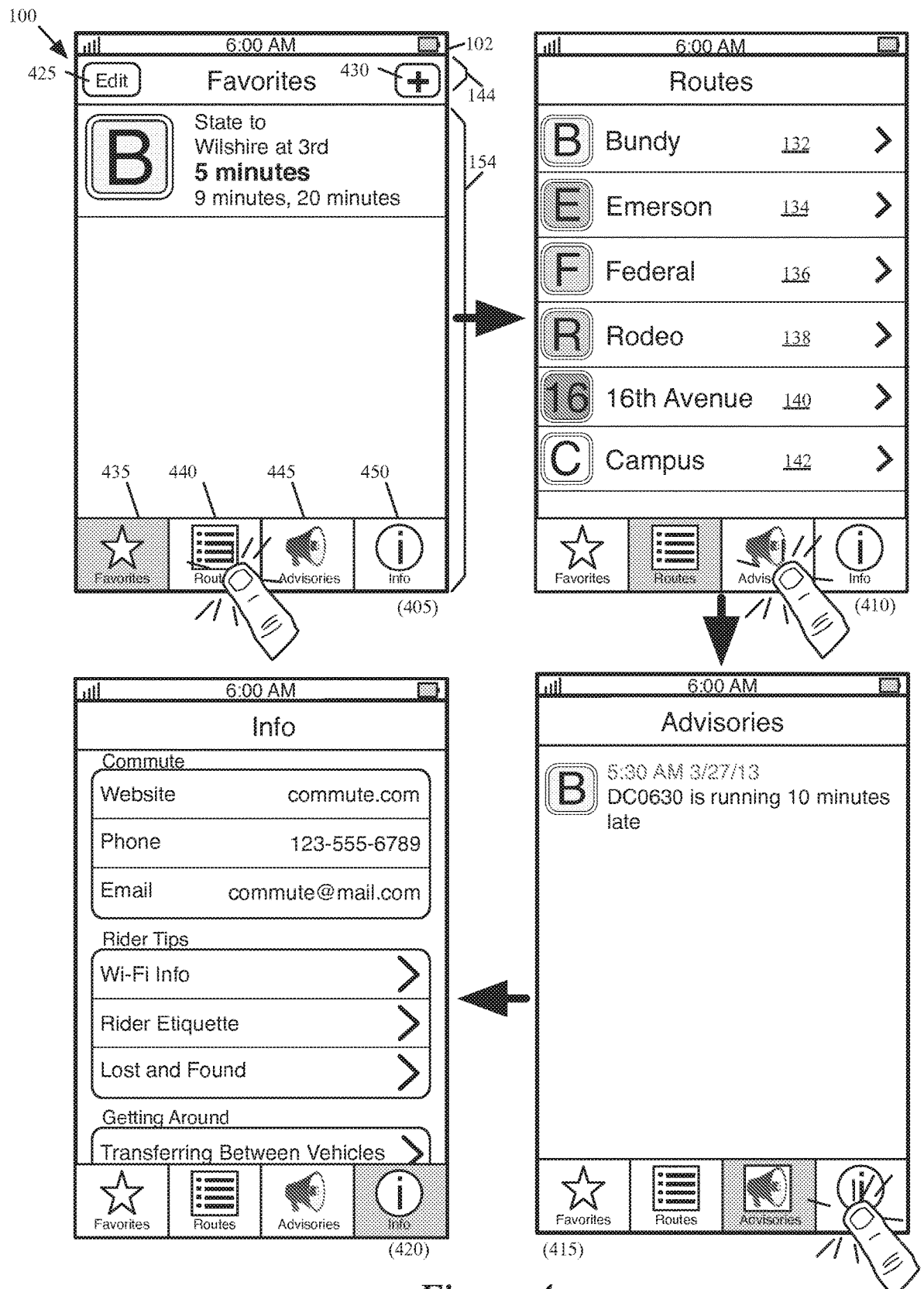
FIG. 4 conceptually illustrates the commute application of some embodiments that provides several different features.

FIG. 4 conceptually illustrates the commute application of some embodiments that provides several different features. In particular, FIG. 4 illustrates the GUI 100 of the commute application at four different stages 405-420 showing different features of the commute application.

The first stage 405 of the GUI 100 illustrates a Favorites feature of the commute application. As shown, the first stage 405 shows a page of the GUI 100 for displaying the current saved routes created and stored by the commute application. As shown, the page of the GUI 100 in the first stage 405 includes display areas 102, 144, and 154. The display area 102 in this stage 405 is displaying the same information that is displayed in the display area 102 described above by reference to FIGS. 1 and 2. The display area 144 is displaying in the first stage 405 a label "Favorites" to indicate that the currently displayed page of the GUI 100 is for the Favorites feature, a selectable UI item 425 for editing (e.g., modifying, deleting, etc.) saved routes displayed in the display area 154, and a selectable UI item 430 for transitioning to a page of the GUI 100 for creating a saved route.

In this example, the display area 154 is for displaying information describing different saved routes stored on the device in different selectable rows. In this example, the display area 154 is displaying information describing one saved route in a selectable row that includes an icon indicating the route from which the saved route was created, the starting and ending point stops of the saved route, and different countdown times for different trips along the saved route. In some embodiments, as shown in this example, the countdown times for the next three trips along the saved route are displayed. Specifically, the countdown times for the saved route in this example indicate that transit vehicles will arrive at the State stop in 5 minutes, 9 minutes, and 20 minutes. The commute application of some embodiments constantly, or at defined intervals, updates the countdown times displayed in the display area 154.

The selectable UI items 435-450 are for navigating to a page of the GUI 100 for a particular feature. In particular, when a user is using a particular feature of the commute application, the UI items 435-450 allow the user to quickly access any of the other features. In this example, the UI item 435 is for navigating to a page for the Favorites feature, the UI item 440 is for navigating to a page for a Routes feature, the UI item 445 is for navigating to a page for an Advisories feature, and the UI item 450 is for navigating to a page for an Info feature. The Routes feature, Advisories feature, and Info feature will be describe below.

The first stage 405 of the GUI 100 also shows a user selecting the UI item 440 to navigate to a page of the GUI 100 for the Routes feature. In this example, the user is selecting the UI item 440 by using a finger to tap on the UI item 440 displayed on the touchscreen of the device on which the commute application is operating in order to view the page for the Routes feature. When the commute application receives the selection of the UI item 440, the commute application of some embodiments transitions to displaying a page for the Routes feature.

The second stage 410 shows the GUI 100 after the user selected the UI item 440 to view the page for the Routes feature. As shown, the second stage 410 of the GUI 100 is similar to the first stage 105 of the GUI 100 for viewing different routes as described above by reference to FIG. 1. Specifically, the second stage 410 shows the display area 402 displaying icons indicating the strength of a signal, the strength of the battery, and the current time; the display area 144 displaying the label "Routes" to indicate that the currently displayed page of the GUI 100 is displaying different routes; and the display area 154 displaying the selectable UI items 132-142. In addition, the display area 154 in the second stage 410 is displaying the selectable UI items 435-450 at the bottom of the display area 154.

The second stage 410 of the GUI 100 also illustrates the user selecting the UI item 445 to navigate to a page of the GUI 100 for the Advisories feature. The user for this example is selecting the UI item 445 by using a finger to tap on the UI item 445 displayed on the touchscreen in order to view the page for the Advisories feature. Upon receiving the selection of the UI item 445, the commute application of some embodiments transitions to displaying a page for the Advisories feature.

The third stage 415 illustrates the GUI 100 after the user selected the UI item 445 to view the page for the Advisories feature. In the third stage 415 the display area 144 is displaying the label "Advisories" to indicate that the currently displayed page of the GUI 100 is displaying a list of notifications. The display area 154 in the third stage 415 is displaying a notification received on Mar. 27, 2013 at 5:30 AM indicating that a transit vehicle for the trip DC0630 traveling along route B is running 10 minutes late. Additionally, the display area 154 is displaying the selectable UI items 435-450 at the bottom of the display area 154.

The third stage 415 of the GUI 100 also shows the user selecting the UI item 450 to navigate to a page of the GUI 100 for the Info feature. The user in this example is selecting the UI item 450 by using a finger to tap on the UI item 450 displayed on the touchscreen in order to view the page for the Info feature. In some embodiments, when the commute application receives the selection of the UI item 450, the commute application transitions to displaying a page for the Info feature.

The fourth stage 420 illustrates the GUI 100 after the user selected the UI item 450 to view the page for the Info feature. As shown in the fourth stage 420, the display area 144 is displaying the label "Info" to indicate that the currently displayed page of the GUI 100 is displaying information related to the commute application as well as other information. The fourth stage 420 also shows the display area 154 displaying contact information, advice for riders, and information about how to get around. The display area 154 is also displaying the selectable UI items 435-450 at the bottom of the display area 154.

II. Dynamic Focus Table

As described above, the commute application of some embodiments provides several different features for viewing different routes, portions of different routes, and schedules for trips along the different routes. The following section will describe details, examples, and embodiments of a Routes feature provided by the commute application of some embodiments.

Figure 5:
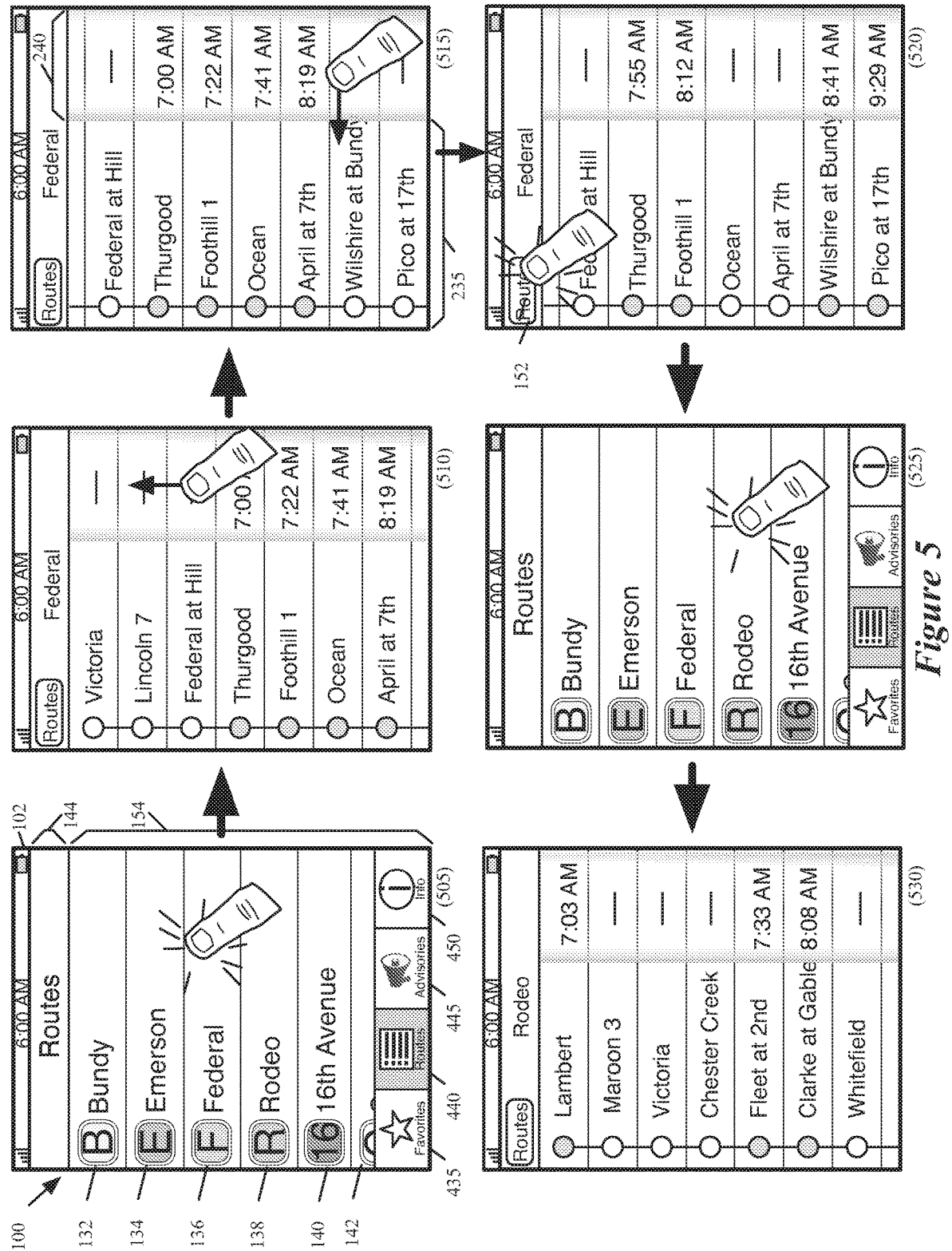
FIG. 5 conceptually illustrates the commute application of some embodiments providing different routes and scheduled times of trips along the different routes through a dynamic focus table.

FIG. 5 conceptually illustrates the commute application of some embodiments providing different routes and scheduled times of trips along the different routes through a dynamic focus table. In particular, FIG. 5 illustrates the GUI 100 of the commute application at six different stages 505-530 of providing schedules for trips along different routes.

The first stage 505 is similar to the first stage 205 of FIG. 2 except the first stage 505 of FIG. 5 includes the selectable UI items 435-450 arranged at the bottom of the display area 154. As shown, the UI item 440 is highlighted to indicate that the currently displayed page of the GUI 100 is for the Routes feature. In addition, the first stage 505 shows in this example a user selecting the UI item 136 to view the details of the Federal route in the same manner as that described above by reference to the first stage 205 of FIG. 2.

The second stage 510 is similar to the second stage 210 of FIG. 2. The second stage 510 additionally shows that the dynamic focus table displayed in the display area 154 includes a status circle adjacent to the left side of each stop in the dynamic focus table to graphically indicate the state or status of the stop. Also, each status circle is connected to adjacent status circles with a line. In some embodiments, each line connecting two status circles has two different appearances that represent two different states of the connection between the two stops that the line is connecting. The two different appearances of each line include in some embodiments (1) a colored (e.g., filled) line to indicate that the connection is active and (2) a grayed-out circle (e.g., a grayed-out version of the colored line) to indicate that the connection is inactive.

In some embodiments, each status circle has three different appearances that represent three different states of the stop to which the status circle is associated. The three different appearances of each status circle include in some embodiments (1) an empty (e.g., non-filled) circle to indicate that the stop is not included in a trip that is being displayed in the dynamic focus table, (2) a colored (e.g., filled) circle to indicate that the stop is included in a trip that is currently being displayed in the dynamic focus table and that the stop is coming up, and (3) a grayed-out circle (e.g., a grayed-out version of the colored circle) to indicate that the stop is included in a trip that is currently being displayed in the dynamic focus table and that the stop has been passed. As shown in the second stage 510, the status circles for the Victoria, Lincoln 7, and Federal at Hill stops are empty and the status circles for the Thurgood, Foothill 1, Ocean, and April at 7th stops are colored.

Additionally, the second stage 510 of the GUI 100 also shows the user performing a scroll operation on the focus table in order to view a different portion of the focus table in the same manner as that described above by reference to the second stage 210 of FIG. 2.

The third stage 515 is similar to the third stage 215 of FIG. 2 but the third stage 515 of FIG. 5 illustrates that the dynamic focus table displayed in the display area 154 includes status circles adjacent to the stops, as explained above. As illustrated, the status circles for the Wilshire at Bundy and Pico at 17th stops are empty. The third stage 515 also shows the user performing a scroll operation on the column 240 of the focus table to view a schedule for a different trip along the Federal route in the same fashion as that described above by reference to the third stage 215 of FIG. 2.

As described above, when the commute application of some embodiments receives the gesture input for scrolling to the schedule for a different trip, the commute application slides the schedule for the current trip displayed in the column 240 out of view while sliding a schedule for a different trip along the Federal route into view. In some embodiments, the commute application also updates the status circles of each stop based on the schedule for the different trip along the Federal route that is sliding into view.

The fourth stage 520 is similar to the fourth stage 220 of FIG. 2. The fourth stage 520 of FIG. 5 also illustrates that the focus table displayed in the display area 154 includes status circles adjacent to the stops. The commute application for this example updated the status circles of the stops along the Federal route to reflect the schedule for the trip displayed in the dynamic focus table. As shown, the status circles for the Federal at Hill, Ocean, April at 7th, and Pico at 17th stops are empty to indicate that these stops are not included in the trip currently being displayed in the dynamic focus table. The Thurgood, Foothill 1, Wilshire at Bundy, and Pico at 17th stops are colored to indicate that the stops are included in the trip currently being displayed in the dynamic focus table. The fourth stage 520 additionally illustrates the user selecting the selectable UI item 152 to view the different routes shown in the first stage 505 in the same manner as that described above by reference to the fourth stage 220 of FIG. 2.

The fifth stage 525 is similar to the fifth stage 225 of FIG. 2 except the fifth stage 525 of FIG. 5 also shows the selectable UI items 435-450 arranged at the bottom of the display area 154. In addition, the fifth stage 525 shows the user selecting the UI item 138 in the same fashion as that described above by reference to the fifth stage 25 of FIG. 2.

The sixth stage 530 is similar to the sixth stage 230 of FIG. 2 but the sixth stage 530 of FIG. 5 shows that the focus table displayed in the display area 154 includes status circles adjacent to the stops. As shown, the status circles for the Maroon 3, Victoria, Chester Creek, and Whitefield stops are empty and the status circles for the Lambert, Fleet at 2nd, and Clarke and Gable stops are colored.

Figure 6:
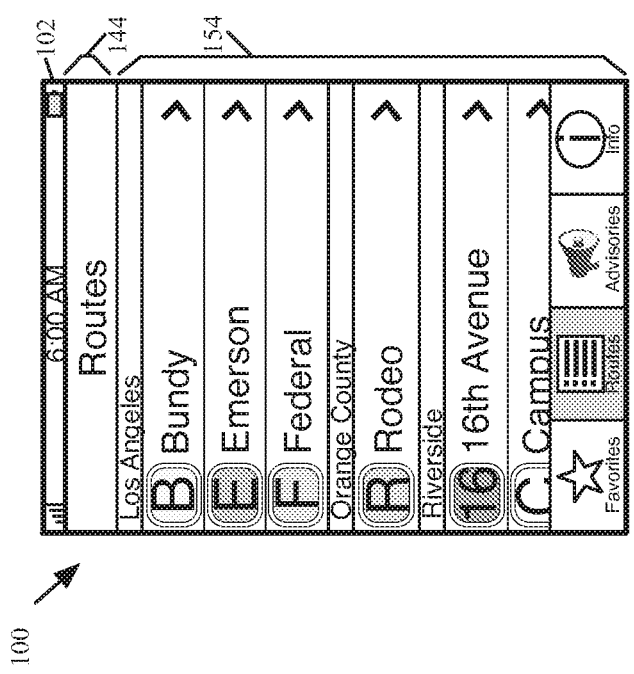
FIG. 6 conceptually illustrates the commute application of some embodiments providing a page for displaying different routes.

FIG. 6 conceptually illustrates the commute application of some embodiments providing a page for displaying different routes. The GUI 100 is similar to the first stage 505 described above by reference to FIG. 5 except the routes displayed in the display area 154 of FIG. 6 are organized according to the geographical area to which the routes belong. In some embodiments, the routes are organized according to the geographical area from which the routes start and/or at which the routes end.

For this example, the routes Bundy, Emerson, and Federal are arranged under a banner labeled "Los Angeles" to indicate that these routes belong to the Los Angeles area. The Rodeo route is arranged under a banner labeled "Orange County" to indicate that the Rodeo route belongs to the Orange County area. Lastly, the routes 16th Avenue and Campus are arranged under a banner labeled "Riverside" to indicate that these routes belong to the Riverside area.

Figure 7:
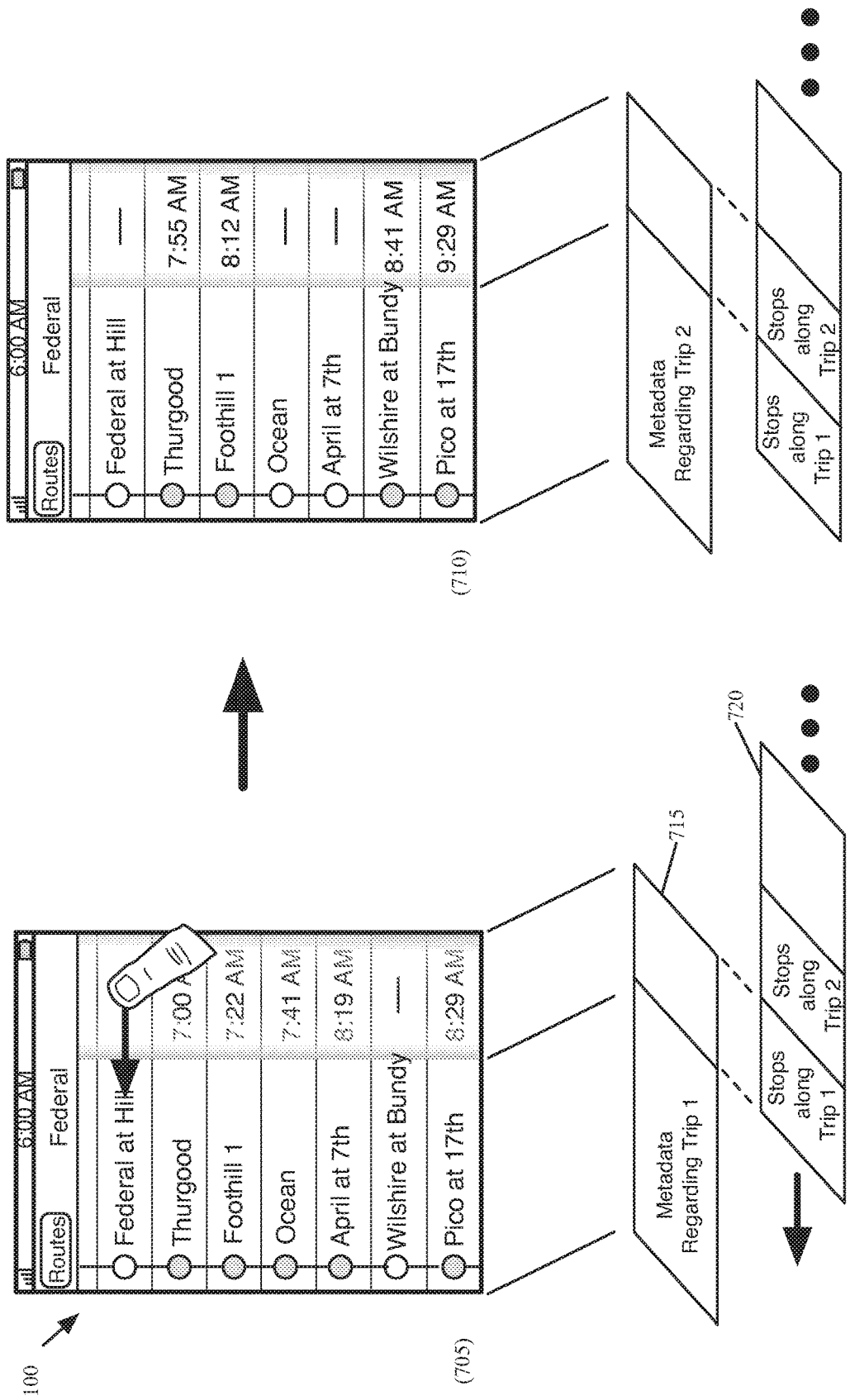
FIG. 7 conceptually illustrates a perspective view of the dynamic focus table of some embodiments.

FIG. 7 conceptually illustrates a perspective view of the dynamic focus table of some embodiments. Specifically, FIG. 7 illustrates the perspective view of the dynamic focus table at two different stages 705 and 710 that corresponds to the dynamic focus table described above by reference to the third and fourth stages 515 and 520 of FIG. 5.

The first stage 705 illustrates the GUI 100 at the third stage 515 of FIG. 5 and a corresponding perspective view of the dynamic focus table in the GUI 100. As shown, the dynamic focus table of some embodiments includes two components: a stationary panel 715 and a movable panel 720. The right side of the panel 715 is transparent (e.g., an open window), allowing portions of the panel 720 to be displayed through the right side of the panel 715. The left side of the panel 715 is for displaying metadata regarding a trip (e.g., statuses of stops in the route) in the panel 720 that is being displayed through the right side of the panel 715. As shown, the left side of the panel 715 in the first stage 705 is displaying metadata regarding Trip 1 along the Federal route since the schedule for Trip 1 is being displayed through the right side of the panel 715. The metadata in this example includes the statuses of the status circles for the stops along the Federal route based on Trip 1. The movable panel 720 includes schedules for different trips along a particular route. As shown in the first stage 705, the movable panel 720 includes schedules for Trip 1 and Trip 2 along the Federal route. The schedule of some embodiments includes times for each stop along a particular trip.

In some embodiments, the commute application moves the panel 720 according to input that the commute application receives (e.g., the input described above by reference to the third stage 215 of FIG. 2) to view a schedule for a different trip. When the schedule in the panel 720 displayed through the right side of the panel 715 changes, the commute application of some embodiments updates the left side of the panel 715 to display the metadata regarding the schedule in the panel 720 that is displayed through the right side of the panel 715.

The second stage 710 illustrates the GUI 100 at the fourth stage 520 of FIG. 5 and the corresponding perspective view of the dynamic focus table in the GUI 100. For this example, commute application moved the panel 720 towards the left so that the schedule for Trip 2 is displayed through the right side of the panel 715. In addition, the commute application updated the left side of the panel 715 to display metadata regarding Trip 2. As shown in the GUI 100 in the second stage 710, the status circles are updated based on the schedule for the trip being displayed in the dynamic focus table.

The above-described FIG. 7 illustrates a dynamic focus table where the panel 715 remains still while the panel 720 moves relative to the panel 715 to display schedules for different trips along a particular route. In some embodiments, the commute application instead moves the panel 715 with respect to the panel 720 while keeping the panel 720 fixed in order to display different schedules in the panel 720 through the right side of the panel 715.

Figure 8:
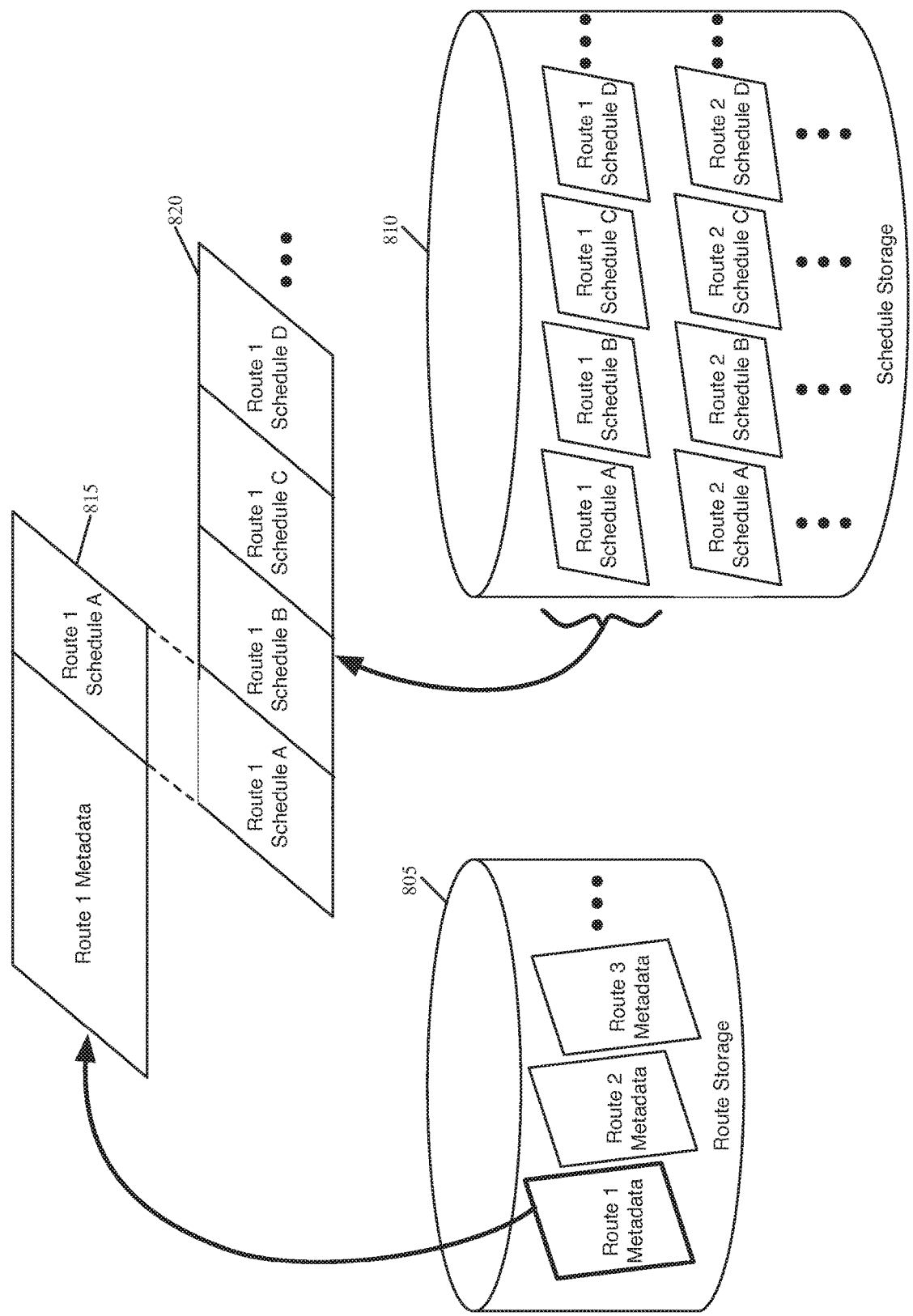
FIG. 8 conceptually illustrates an example of the manner in which data is stored for the dynamic focus table of some embodiments.

FIG. 8 conceptually illustrates an example of the manner in which data is stored for the dynamic focus table of some embodiments. In particular, FIG. 8 illustrates components 815 and 820 of a dynamic focus table, route storage 805 and schedule storage 810. The components 815 and 820 of the dynamic focus table are similar to the panels 715 and 720, respectively, which are described above by reference to FIG. 7. That is, the panel 815 is a stationary panel in which the right side is transparent, allowing portions of the panel 820 to be displayed through the right side, and the left side is for displaying metadata regarding a trip in the panel 820 that is being displayed through the right side, and the panel 820 is a moveable panel that includes schedules for different trips along a particular route.

As shown in FIG. 8, the route storage 805 is for storing metadata for different routes. Examples of such metadata include the names of stops along a route, a geographical area to which the route belongs, a graphical representation (e.g. icons) of the route, as well as other information describing the route. As illustrated, the route storage 805 is storing metadata for Route 1, Route 2, Route 3, etc.

The schedule storage 810 is for storing schedule data for different trips along the different routes stored in the route storage 805. The schedule data for a trip along a route in some embodiments includes a time for each of the stops on the trip along the route. As shown in FIG. 8, the schedule storage 810 in this example is storing schedule information for Schedule A, Schedule B, Schedule C, Schedule D, etc. for Route 1; Schedule A, Schedule B, Schedule C, Schedule D, etc. for Route 2, etc.

In some embodiments, the schedule data for a trip along a route also includes status information for the status circles in the dynamic focus table. The commute application of some such embodiments uses the status information in the schedule data for a trip to update the metadata displayed in left side of the panel 815 when the schedule for the trip in the panel 820 is moved into view and displayed through the panel 815.

While FIG. 8 describes the data for the dynamic focus table of some embodiments stored in two separate storages, one of ordinary skill in the art will understand that the data may be stored differently in different embodiments. For instance, in some embodiments, the data fort the dynamic focus table is stored in a single physical storage while, in other embodiments, the routes and/or the schedule storage is stored across several physical storages.

Figure 9:
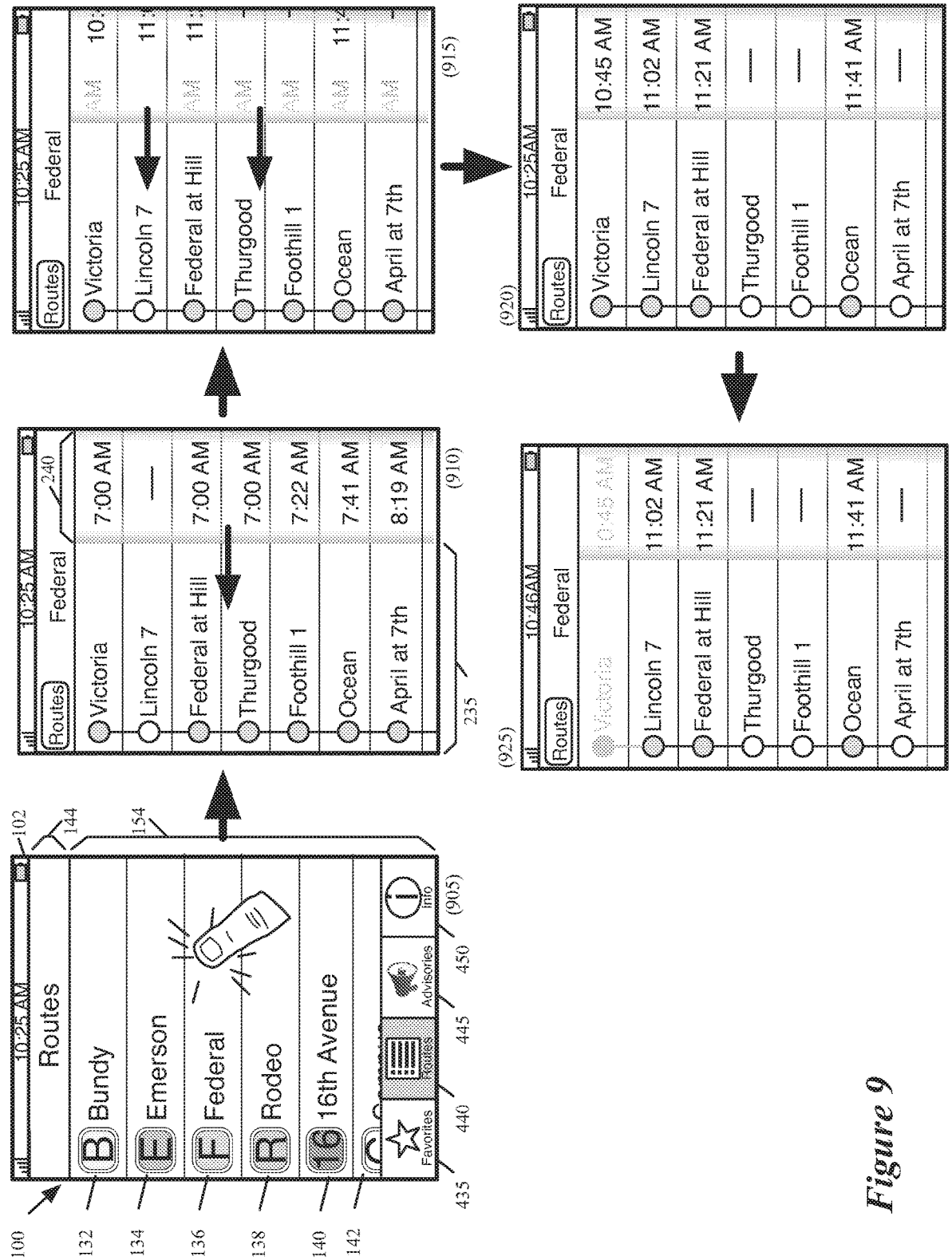
FIG. 9 conceptually illustrates the dynamic focus table of some embodiments automatically performing operations based on the current time of a device.

FIG. 9 conceptually illustrates the dynamic focus table of some embodiments automatically performing operations based on the current time of a device. Specifically, FIG. 9 illustrates the GUI 100 of the commute application of some embodiments at five different stages 905-925 that show the dynamic focus table automatically performing operations based on the current time of the device on which the commute application is operating.

The first stage 905 is the same as the first stage 505 of FIG. 5. That is, the first stage 905 illustrates the GUI 100 displaying a page for viewing different routes and a user selecting the UI item 136 in order to view details of a route labeled Federal.

The second stage 910 is similar to the second stage 510 of FIG. 5 except the dynamic focus table in the second stage 910 is displaying the schedule for a different trip along the Federal route. For this example, the schedule displayed in the dynamic focus table illustrated in the second stage 910 is the schedule for a default trip along the Federal route that the commute application initially displays in the dynamic focus table. In some embodiments, the default trip is defined as the first trip along a particular route scheduled for the current day. The default trip can be defined differently in different embodiments. As shown, the schedule for the default trip along the Federal route in this example is scheduled to start at the Victoria stop at 7:00 AM and follows with stops at Federal at Hill at 7:01 AM, Thurgood at 7:10 AM, Foothill 1 at 7:22 AM, Ocean at 7:41 AM, and April at 7th at 8:19 AM. Accordingly, the status circles illustrated in the second stage 910 for the Lincoln 7 stop is empty and the status circles for the Victoria, Federal at Hill, Thurgood, Foothill 1, Ocean, and April at 7th stops are colored.

After displaying the schedule for the default trip in the dynamic focus table, the commute application of some embodiments automatically shifts to displaying in the dynamic focus table the schedule for a trip that is scheduled to run next based on the current time of the device (10:25 AM in this example). As indicated by an arrow, the second stage 910 also shows the commute application beginning to slide the schedule for the default trip towards the left side of the column 240 and out of view.

The third stage 915 of the GUI 100 illustrates the dynamic focus table in the middle of shifting to the schedule for the trip that is scheduled to run next, as indicated by a pair of arrows. As shown, a portion of a schedule is sliding out of view of the column 240 and a portion of another schedule is sliding into view of the column 240.

The fourth stage 920 of the GUI 100 illustrates the dynamic focus table after the schedule for the trip that is scheduled to run next has shifted into view of the column 240. As illustrated, the schedule for the trip along the Federal route is scheduled to start at the Victoria stop at 10:45 AM and follows with stops at Lincoln 7 at 11:02 AM, Federal at Hill at 11:21 AM, and Ocean at 12:01 PM. Accordingly, the status circles illustrated in the fourth stage 920 for the Thurgood, Foothill 1, and April at 7th stops are empty and the status circles for the Victoria, Lincoln 7, Federal at Hill, and Ocean stops are colored.

The fifth stage 925 of the GUI 100 after the current time of the device has passed the time of a stop in the schedule for the trip displayed in the dynamic focus table. When the commute application of some embodiments detects that the current time of the device has passed a time in the schedule for a trip displayed in the dynamic focus table, the commute application modifies the stop and the stop's status circle in the dynamic focus table to indicate that the stop has been passed and is no longer active. In this example, the commute application detected that the current time of the device (10:46 AM in this example) has passed the time scheduled for the Victoria stop (10:45 Am in this example) and indicates that the stop has been passed and is no longer active by graying out the stop and the stop's status circle in the dynamic focus table.

While FIG. 9 illustrates the dynamic focus table initially displaying the schedule for a default trip and then shifting to the schedule for a trip that is scheduled to run next based on the current time of the device, the commute application of some embodiments does not display the schedule for the default trip and the shift to the schedule for the trip that is scheduled to run next based on the current time of the device. Rather, in some such embodiments, commute application transitions to displaying the dynamic focus table illustrated in the fourth stage 920 when the commute application receives the selection of the UI item 136 the first stage 905.

Figure 10:
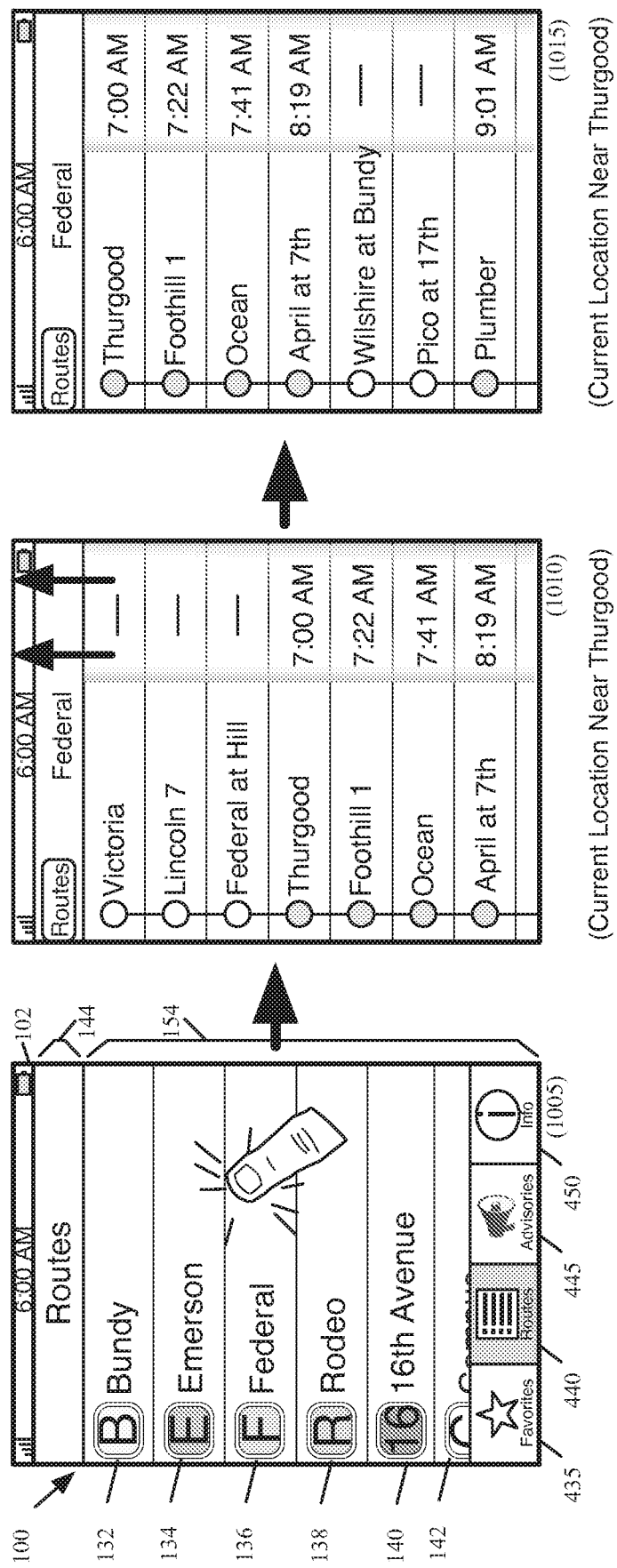
FIG. 10 conceptually illustrates the dynamic focus table of some embodiments automatically performing operations based on the location of a device.

FIG. 10 conceptually illustrates the dynamic focus table of some embodiments automatically performing operations based on the location of a device. In particular, FIG. 10 illustrates the GUI 100 of the commute application at three different stages 1005-1015 that show the dynamic focus table automatically performing operations based on the location of the device on which the commute application is operating.

The first stage 1005 is the same as the first stage 905 of FIG. 9. That is, the first stage 1005 illustrates the GUI 100 displaying a page for viewing different routes and a user selecting the UI item 136 in order to view details of a route labeled Federal.

The second stage 1010 of the GUI 100 illustrates the dynamic focus table showing the same stops and the schedule for the same trip illustrated in the second stage 510 of FIG. 5. In some embodiments, after the commute application displays the dynamic focus table, the commute application determines the location of the device (e.g., via global positioning system (GPS) location data, Wi-Fi-based positioning system location data, cellular tower data, etc.) and automatically moves the dynamic focus table with respect to the display area 154 so that the stop in the current trip nearest to the location of the device shifts to the top of the display area 154. For this example, the commute application has determined that the location of the device is nearest to the Thurgood stop and is starting to shift the dynamic focus table, as indicated by the two arrows.

The third stage 1015 shows the GUI 100 after the commute application finished shifting the stop in the current trip nearest to the location of the device to the top of the display area 154. As noted above, the commute application in this example determined that the stop in the current trip nearest to the location of the device is the Thurgood stop. As shown, the third stage 1015 shows the Thurgood stop positioned at the top of the display area 154.

While FIG. 10 illustrates the dynamic focus table shifting to the top of the display area 154 the stop in the current trip nearest to the location of the device, the commute application of some embodiments instead shifts the first stop in the current trip to the top. Different embodiments of the commute application use additional and/or different criteria to determine the stop in the current trip to automatically shift to the top.

Figure 11:
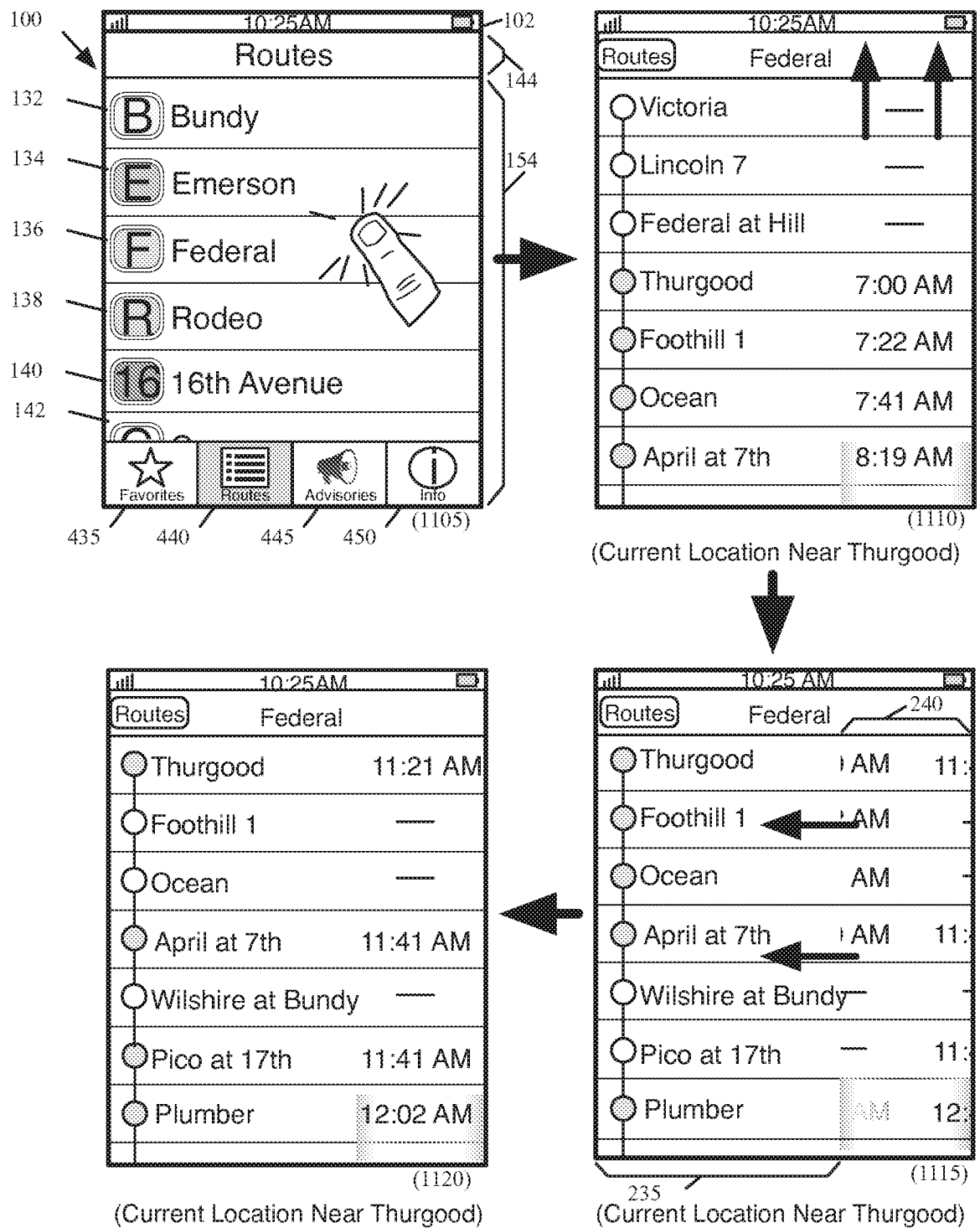
FIG. 11 conceptually illustrates the dynamic focus table of some embodiments automatically performing operations based on the current time of a device and the location of the device.

FIG. 11 conceptually illustrates the dynamic focus table of some embodiments automatically performing operations based on the current time of a device and the location of the device. Specifically, FIG. 11 illustrates the GUI 100 of the commute application at four different stages 1105-1120 that show the dynamic focus table automatically performing operations based on the current time of the device on which the commute application is operating as well as the location of the device.

The first stage 1105 is the same as the first stage 1005 of FIG. 10. That is, the first stage 1105 illustrates the GUI 100 displaying a page for viewing different routes and a user selecting the UI item 136 in order to view details of a route labeled Federal.

The second stage 1110 is similar to the second stage 1010 of FIG. 10 except the current time of the device for this example is 10:25 AM. The GUI 100 illustrates the dynamic focus table showing the same stops along the Federal route and the schedule for the same trip along the Federal route. Additionally, the commute application in this example has determined that the location of the device is nearest to the Thurgood stop and is starting to shift the dynamic focus table in order to display the stop in the current trip nearest to the location of the device at the top of the display area 154. The start of the shifting of the dynamic focus table is indicated in the second stage 1110 by two arrows.

The third stage 1115 shows the GUI 100 after the commute application finished shifting the stop in the current trip nearest to the location of the device shifts to the top of the display area 154. As mentioned above, in this example, the commute application determined that the stop in the current trip nearest to the location of the device is the Thurgood stop. As illustrated in the third stage 1115, the Thurgood stop positioned at the top of the display area 154.

For this example, the schedule displayed in the dynamic focus table is the schedule for a default trip along the Federal route that the commute application initially displays. After displaying the schedule for the default trip in the dynamic focus table and shifting the stop in the current trip nearest to the location of the device shifts to the top of the display area 154, the commute application of some embodiments automatically shifts to displaying in the dynamic focus table the schedule for a trip that is scheduled to run next based on the current time of the device (10:25 AM in this example). As indicated by two arrows, the third stage 1115 illustrates the commute application has started and is in the middle of shifting the dynamic focus table to the schedule for the trip that is scheduled to run next. As shown, a portion of a schedule is sliding out of view of the column 240 and a portion of another schedule is sliding into view of the column 240.

The fourth stage 1120 of the GUI 100 illustrates the dynamic focus table after the schedule for the trip that is scheduled to run next has shifted into view of the column 240. As illustrated, the schedule for the trip along the Federal route is scheduled to start at the Thurgood stop at 11:21 AM and follows with stops at April at 7th at 12:40 PM, Pico at 17th at 12:59 PM, and Plumber at 1:14 PM. Therefore, the status circles illustrated in the fourth stage 1120 for the Foothill 1, Ocean, and Wilshire at Bundy stops are empty and the status circles for the Thurgood, April at 7th, Pico at 17th, and Plumber stops are colored.

While FIG. 11 illustrates the commute application initially displaying in the dynamic focus table the schedule for a default trip, shifting the stop in the default trip nearest to the location of the device to the top of the display area 154, and then shifting to the schedule for a trip that is scheduled to run next based on the current time of the device, the commute application of some embodiments performs these operations differently to achieve the results displayed in the dynamic focus table illustrated in the fourth stage 1120. For instance, the commute application of some embodiments identifies the schedule for a trip that is scheduled to run next based on the current time of the device and then concurrently shifts the stop in that trip nearest to the location of the device to the top of the display area 154 while shifting to the schedule for that trip. In some embodiments, the commute application shifts to the schedule for a trip that is scheduled to run next based on the current time of the device before shifting the stop in such a trip nearest to the location of the device to the top of the display area 154.

The above-described FIGS. 10 and 11 show several features that function based on the location of a device on which the commute application is operating and the time of the device. One of ordinary skill in the art will understand that the commute application of some embodiments can have additional and/or different location-based features. For instance, in some embodiments, the commute application provides information related to a particular stop when the commute application determines that the location of the device on which the commute application is executing is near the particular stop.

Figure 12:
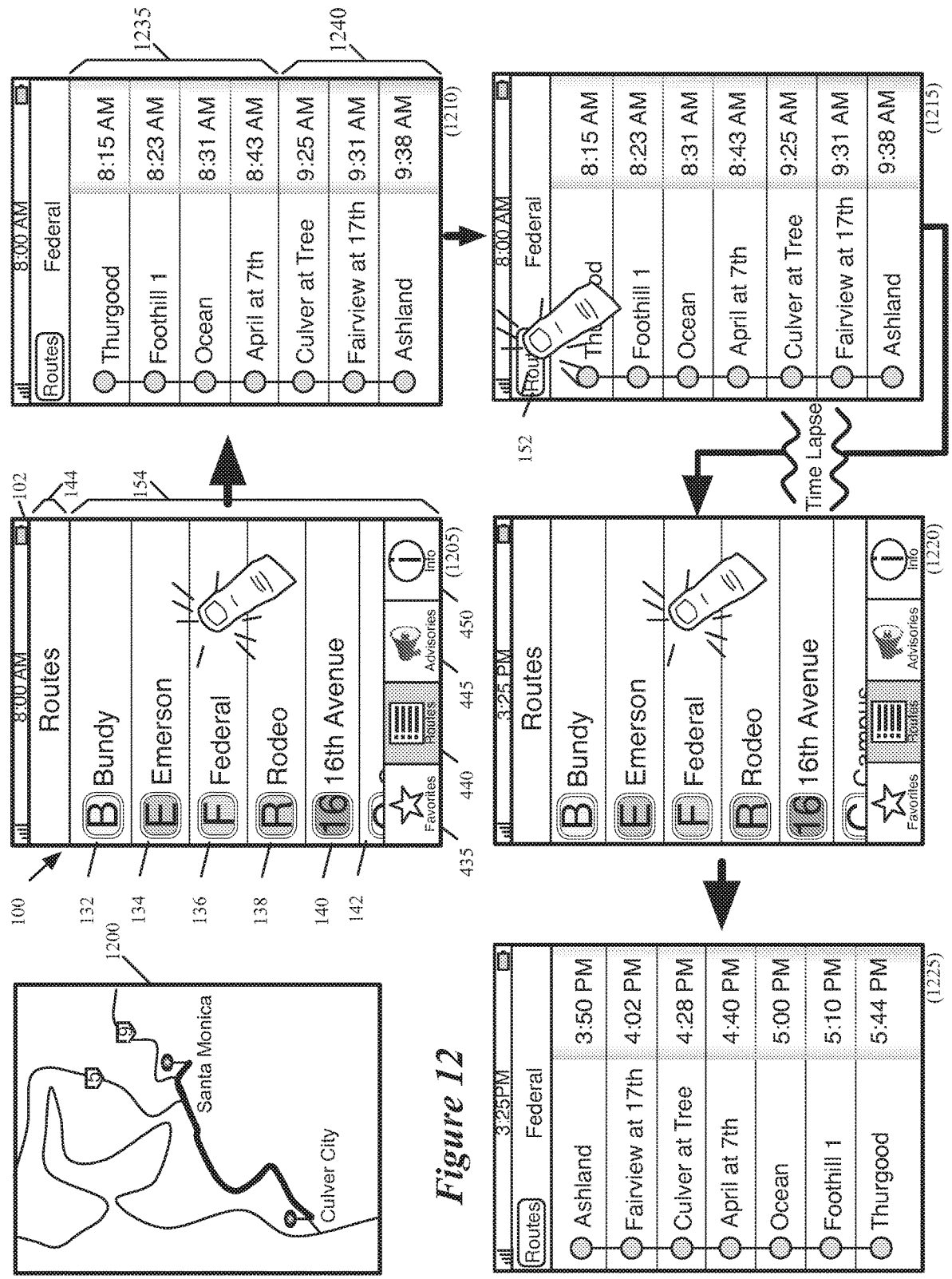
FIG. 12 conceptually illustrates the commute application of some embodiments that provides a feature that dynamically orders stops displayed in the dynamic focus table.

FIG. 12 conceptually illustrates the commute application of some embodiments that provides a feature that dynamically arranges the stops displayed in the dynamic focus table. In particular, FIG. 12 illustrates the GUI 100 at five different stages 1205-1225 that show dynamic reordering of stops along a route displayed in the dynamic focus table. In addition, FIG. 12 illustrates the route in a map 1200.

The first stage 1205 of FIG. 12 is similar to the first stage 505 of FIG. 5 except the current time of the device is 8:00 AM. As shown, the first stage 1205 illustrates the GUI 100 displaying a page for viewing different routes and a user selecting the UI item 136 in order to view details of a route labeled Federal.

The second stage 1210 shows the GUI 100 after the user selected the UI item 136 to view the details of the Federal route. As shown, the second stage 1210 of the GUI 100 shows a page in which the display area 144 is displaying the name of a route for which details are being displayed (the Federal route in this example) and the UI item 152.

At the second stage 1210, the dynamic focus table displayed in the display area 154 includes the stops along the Federal route that starts at a stop named Thurgood followed by stops named Foothill 1, Ocean, April at 7th, Culver at Tree, Fairview at 17th, and Ashland. In this example, a group of the stops 1235 Thurgood, Foothill 1, Ocean, and April at 7th are geographically located at or near the city labeled Santa Monica while a group of the stops 1240 Culver at Tree, Fairview at 17th, and Ashland are geographically located at or near the city labeled Culver City.

In this example, the user is located near Thurgood stop in Santa Monica, therefore the dynamic focus table is displaying a schedule for a trip along the Federal route that is scheduled to start at the Thurgood stop at 8:15 AM and follows with stops at Foothill I at 8:23 AM, Ocean at 8:31 AM, April at 7th at 8:43 AM, Culver at Tree at 9:25: AM, Fairview at 17th at 9:31 AM, and Ashland at 9:38 AM. The longer interval between the April at 7th stop and the Culver at Tree stop compared to the shorter intervals between scheduled times at the Thurgood, Foothill 1, Ocean, and April at 7th stops and between scheduled times at the Culver at Tree, Fairview at 17th, and Ashland stops demonstrates that the group of the stops 1235 and the group of the stops 1240 are geographically far apart and located in different areas.

The third stage 1215 of the GUI 100 shows the user selecting the selectable UI item 152 to view the different routes shown in the first stage 1205. As illustrated in this example, the user is selecting the UI item 152 by using a finger to tap the UI item 152 displayed on the touchscreen in order to return to the page illustrated in the first stage 1205 displaying different routes. When the commute application receives the selection of the UI item 152, the commute application of some embodiments transitions to displaying the page shown in the first stage 1205.

The fourth stage 1220 illustrates the GUI 100 after the user selected the UI item 152 to view the page displaying the different routes illustrated in the first stage 1205. As indicated in FIG. 12, an amount of time lapses between the third and fourth stages 1215 and 1220. Specifically, the current time of the device displayed in the fourth stage 1220 indicates that seven hours and twenty-five minutes has passed between the third and fourth stages 1215 and 1220.

The fourth stage 1220 also shows the user selecting the UI item 136 in the same fashion described above by reference to the first stage 1205. When the commute application receives the selection of the UI item 136, the commute application of some embodiments transitions to displaying a page that shows the details of the Federal route.

The fifth stage 1225 shows the GUI 100 after the user selected the UI item 136 to view the details of the Federal route. In some embodiments, when the commute application receives a selection of a route from a page of the GUI 100 displaying different routes for selection, (e.g., the stages 1205 and 1220) the commute application identifies the current time of the device. The commute application of some embodiments uses the current time of the device and/or other heuristics to anticipate the context in which the user is using the commute application and display the order of a particular route accordingly.

For instance, the commute application in this example uses the fact that the user selected the Federal route in the AM and in the same day selected the Federal route in the PM to determine that the user wishes to travel along the Federal route in the opposite direction. As shown in the fifth stage 1225, the dynamic focus table is displaying the stops along the Federal route in an order that is the reverse of the order of the stops illustrated in the second stage 1210. Different embodiments of the commute application use additional and/or different heuristics to determine the order in which to display stops in the dynamic focus table.

Figure 13:
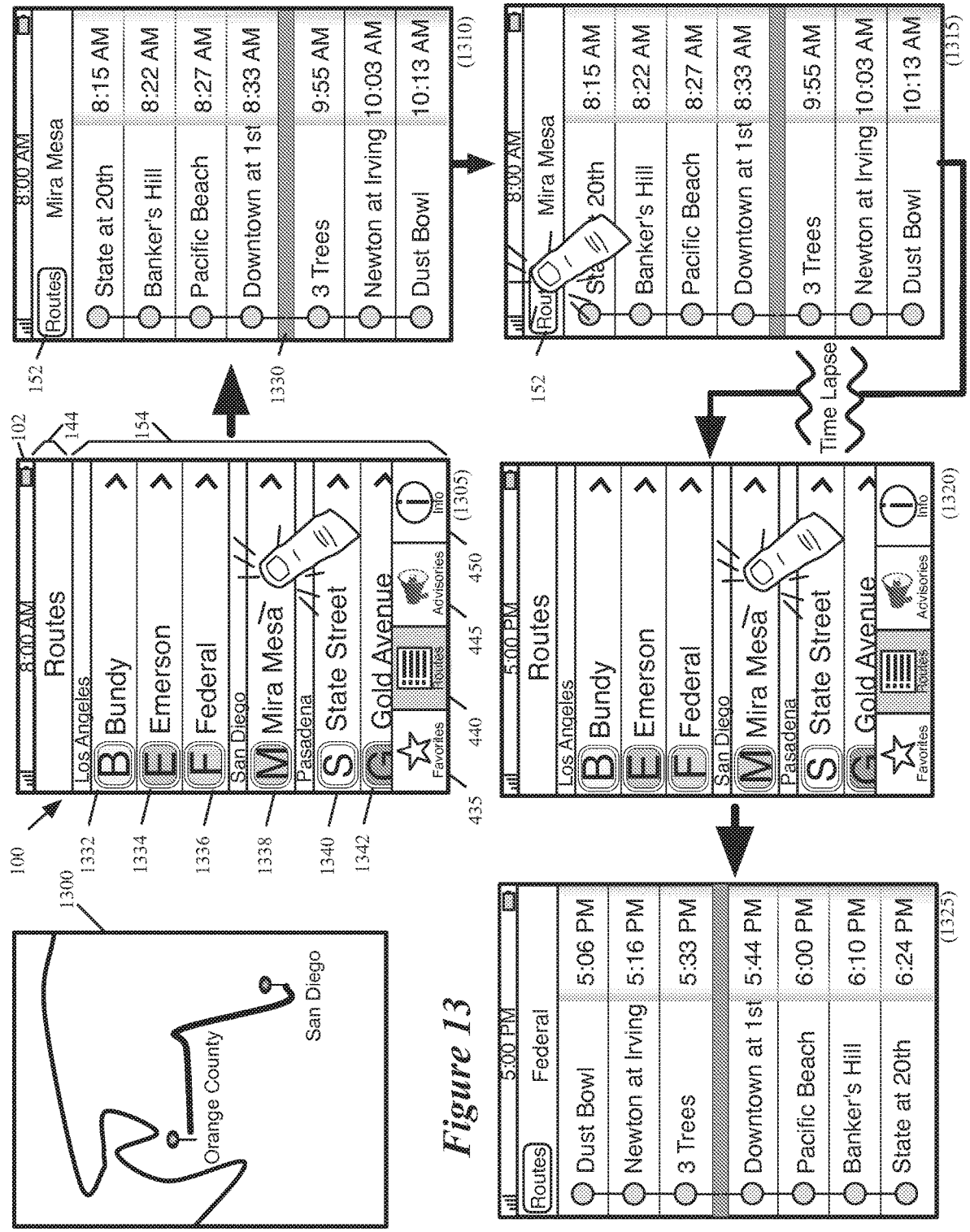
FIG. 13 conceptually illustrates the commute application of some embodiments implemented for transit to and from work that provides a feature that dynamically orders stops displayed in the dynamic focus table.

FIG. 13 conceptually illustrates the commute application of some embodiments implemented for transit to and from work that provides a feature that dynamically reorders the stops displayed in the dynamic focus table. In particular, FIG. 13 illustrates the GUI 100 at five different stages 1305-1325 that show dynamic reordering of stops along a route displayed in the dynamic focus table. Additionally, FIG. 13 illustrates the route in a map 1300. In this example, the location of work is in Orange County.

The first stage 1305 illustrates the GUI 100 displaying a page for viewing different routes. As shown, the display area 144 is displaying a label "Routes" to indicate that the currently displayed page of the GUI 100 is displaying different routes. Also in the first stage 1305, the display area 154 is displaying several selectable user interface (UI) items 1332-1342. Each UI item 1332-1342 is for transitioning to displaying a page of the GUI 100 that shows details of a particular route. As illustrated, each UI item 1332-1342 includes a graphical indicator (e.g., an icon) that represents the particular route.

As shown, the GUI 100 displays the routes in the first stage 1305 in a similar manner to the routes displayed in the GUI 100 described above by reference to FIG. 6. That is, the routes displayed in the first stage 1305 are organized according to the geographical area to which the routes belong. In some embodiments, the routes are organized according to the geographical area from which the routes start and/or at which the routes end.

For this example, the routes Bundy, Emerson, and Federal are arranged under a banner labeled "Los Angeles" to indicate that these routes belong to the Los Angeles area. The Mira Mesa route is arranged under a banner labeled "San Diego" to indicate that the Rodeo route belongs to the San Diego area. Lastly, the routes State Street and Gold Avenue are arranged under a banner labeled "Pasadena" to indicate that these routes belong to the Pasadena area.

In addition, the first stage 1305 of the GUI 100 shows a user selecting the UI item 1338 by using a finger to tap on the UI item 1338 displayed on the touchscreen in order to view details of a route labeled Mira Mesa. When the commute application receives the selection of the UI item 1338, the commute application of some embodiments transitions to displaying a page that shows the details of the Mira Mesa route.

The second stage 1310 shows the GUI 100 after the user selected the UI item 1338 to view the details of the Mira Mesa route. As shown, the second stage 1310 of the GUI 100 shows a page in which the display area 144 is displaying the name of a route for which details are being displayed (the Mira Mesa route in this example) and the UI item 152.

At the second stage 1310, the dynamic focus table displayed in the display area 154 includes the stops along the Mira Mesa route that starts at a stop named State at 20th followed by stops named Banker's Hill, Pacific Beach, Downtown at 1st, 3 Trees, Newton at Irving, and Dust Bowl. In this example, the dynamic focus table is also displaying a region separator 1330 for indicating that stops above the region separator 1330 are geographically located at or near a first geographic region (San Diego in this example) and stops below the region separator 1330 are geographically located at or near a second geographic region (Orange County in this example).

In addition, the dynamic focus table is displaying a schedule for a trip along the Federal route that is scheduled to start at the State at 20th stop at 8:15 AM and follows with stops at Banker's Hill at 8:22 AM, Pacific Beach at 8:27 AM, Downtown at 1st at 8:33 AM, 3 Trees at 9:55: AM, Newton at Irving at 10:03 AM, and Dust Bowl at 10:13 AM. The longer interval between the Downtown at 1st stop and the 3 Trees stop compared to the shorter intervals between scheduled times at the State at 20th, Banker's Hill, Pacific Beach, and Downtown at 1st stops and between scheduled times at the 3 Trees, Newton at Irving, and Dust Bowl stops show that the stops above the region separator 1330 and the stops below the region separator 1330 are geographically far apart and located in different areas.

The third stage 1315 of the GUI 100 shows the user selecting the selectable UI item 152 to view the different routes shown in the first stage 1305. The user in this example is selecting the UI item 152 by using a finger to tap the UI item 152 displayed on the touchscreen in order to return to the page illustrated in the first stage 1305 displaying different routes. Upon receiving the selection of the UI item 152, the commute application of some embodiments transitions to displaying the page illustrated in the first stage 1305.

The fourth stage 1320 illustrates the GUI 100 after the user selected the UI item 152 to view the page displaying the different routes illustrated in the first stage 1305. As indicated in FIG. 13, an amount of time lapses between the third and fourth stages 1315 and 1320. In particular, the current time of the device displayed in the fourth stage 1320 indicates that nine hours has passed between the third and fourth stages 1315 and 1320.

The fourth stage 1320 also shows the user selecting the UI item 1338 in the same manner described above by reference to the first stage 1305. When the commute application receives the selection of the UI item 1338, the commute application of some embodiments transitions to displaying a page that shows the details of the Mira Mesa route.

The fifth stage 1325 shows the GUI 100 after the user selected the UI item 1338 to view the details of the Mira Mesa route. As described above, when the commute application of some embodiments receives a selection of a route from a page of the GUI 100 displaying different routes for selection, (e.g., the stages 1305 and 1320) the commute application identifies the current time of the device. In some embodiments, the commute application uses the current time of the device and/or other heuristics to anticipate the context in which the user is using the commute application and display the order of a particular route accordingly.

For instance, the commute application in this example is implemented for transit to and from work, which is located in Orange County in this example. As such, when the identified current time is before midday (i.e., AM), commute application of some embodiments displays routes according to a first order that ends in Orange County. When the identified current time is after midday (i.e., PM), commute application of some embodiments displays routes according to a second order starting in Orange County and finishing in San Diego, i.e., the reverse of the first order.

As such, the commute application for this example uses the fact that the user selected the Mira Mesa route in the AM in the first stage 1305 to display the order of the stops starting in San Diego and ending in Orange County. Similarly, the commute application uses the fact that the user selected the Mira Mesa route in the PM in the fourth stage 1320 to display the order of the stops starting in Orange County and ending in San Diego. As illustrated in the fifth stage 1325, the dynamic focus table is displaying the stops along the Mira Mesa route ordered from San Diego to Orange County.

III. Favorites Feature

As explained above, in some embodiments the commute application provides several different features. The following section will describe details, examples, and embodiments of Favorite features provided by the commute application in some embodiments.

Figure 14:
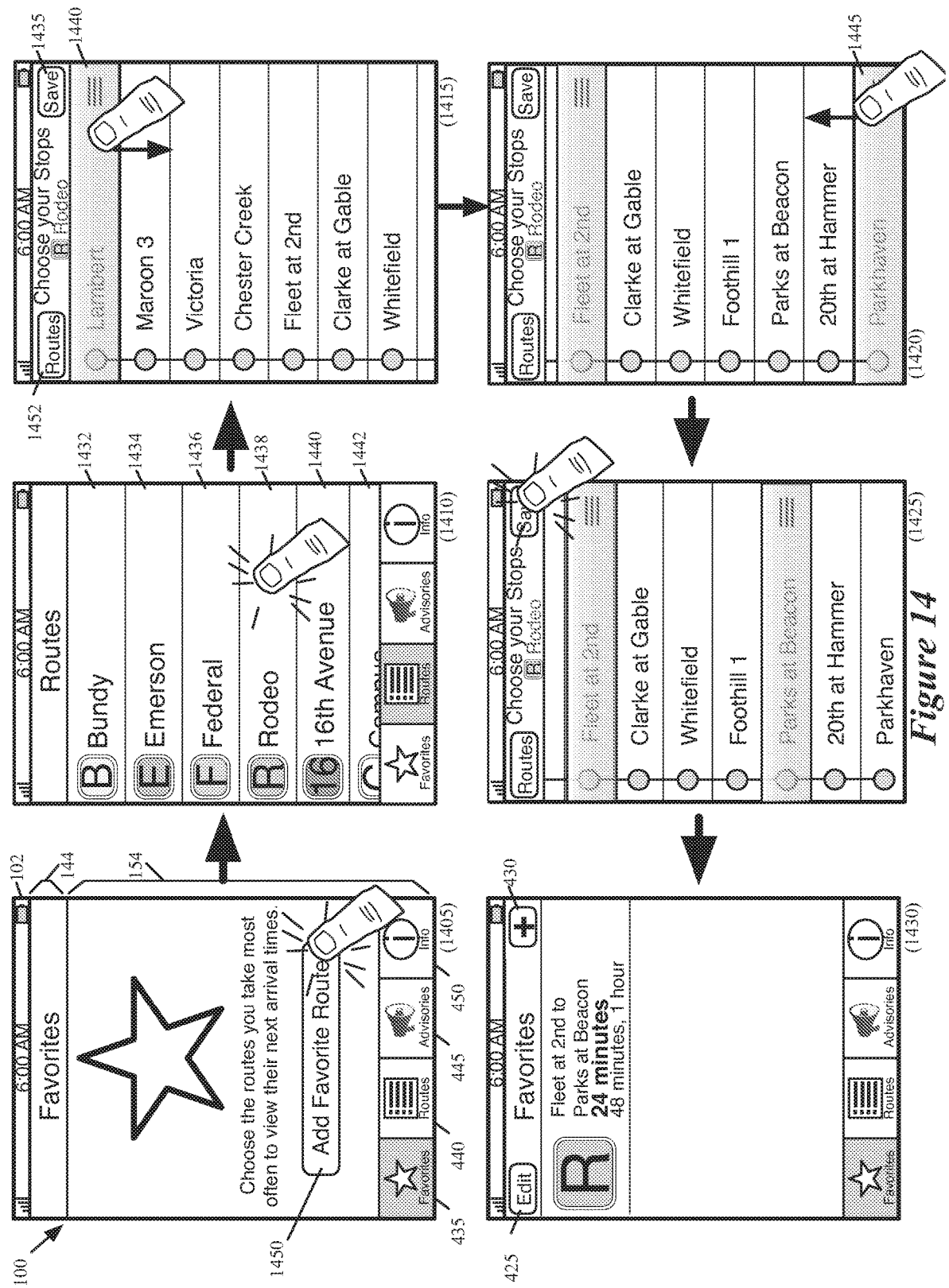
FIG. 14 conceptually illustrates the commute application of some embodiments that provides a feature for saving a route.

FIG. 14 conceptually illustrates the commute application of some embodiments that provides a feature for saving a route. Specifically, FIG. 14 illustrates the GUI 100 of the commute application at six different stages 1405-1430 of creating a saved route. In some embodiments, a saved route, as described above, includes a portion of a defined route (e.g., the routes displayed in the first stage 105 of FIG. 1). In some embodiments, the portion of the defined route includes some but not all of the stops in the defined route. The portion of the defined route of some embodiments includes all the stops in the defined route.

The first stage 1405 illustrates the GUI 100 displaying a page for creating a saved route. As illustrated, the display areas 144 is displaying a label "Favorites" to indicate that the currently displayed page of the GUI 100 is for the Favorites feature. The display area 154 is displaying the selectable UI items 435-450 and a selectable UI item 1450 for navigating to a page of the GUI 100 displaying different routes from which to create a saved route.

The first stage 1405 of the GUI 100 also shows a user selecting the UI item 1450 to start creating a saved route. In this example, the user is selecting the UI item 1450 by using a finger to tap on the UI item 1450 displayed on the touchscreen of the device on which the commute application is operating in order to initiate the creation of a route. When the commute application receives the selection of the UI item 1450, the commute application of some embodiments transitions to displaying a page for displaying different routes.

The second stage 1410 shows the GUI 100 after the user selected the UI item 1450 to view the page for displaying different routes. As shown, the second stage 1410 is similar to the first stage 505 described above by reference to FIG. 5. Specifically, the second stage 1410 shows the display area 144 displaying the label "Routes" to indicate that the currently displayed page of the GUI 100 is displaying different routes. The display area 154 in the second stage 1410 is displaying selectable UI items 1432-1442 as well as the selectable UI items 435-450 at the bottom of the display area 154. Each UI item 1432-1442 is for transitioning to displaying a page of the GUI 100 for selecting stops for a saved route along a particular route. As illustrated, each UI item 1432-1442 includes a graphical indicator (e.g., an icon) that represents the particular route.

In addition, the second stage 1410 of the GUI 100 shows the user selecting the selectable UI item 1438 to create a saved route along a route labeled Rodeo. The user in this example is selecting the UI item 1438 by using a finger to tap on the UI item 1438 displayed on the touchscreen. Upon receiving the selection of the UI item 1438, the commute application of some embodiments transitions to displaying a page that shows the stops along the Rodeo route and stop pickers for selecting stops along the Rodeo for a saved route.

The third stage 1415 illustrates the GUI 100 displaying a page for creating a saved route from the Rodeo route. As shown, the display area 144 in the third stage 1415 displays a label Rodeo to indicate that the information currently displayed on page of the GUI 100 is for the Rodeo route, a selectable UI item 1452 for transitioning back to the page of the GUI 100 displaying different routes illustrated in the second stage 1410, and a selectable UI item 1435 for storing a saved route.

The display area 154 in this example is for displaying a table that includes the stops along the Rodeo route, a movable UI control 1440 for selecting a stop in the Rodeo route as a starting point stop of a saved route, and a movable UI control 1445 (not shown in the third stage 1415) for selecting a stop in the Rodeo route as an ending point stop of the saved route. For this example, the UI control 1440 is positioned at a default location at the top of the table and the UI control 1445 is positioned at a default location at the bottom of the table (not shown at this stage). The UI controls 1440 and 1445 of some embodiments are referred to as stop pickers.

In addition, the third stage 1415 of the GUI 100 shows the user moving the UI control 1440 to select a starting point stop in the Rodeo route for a saved route. In particular, the user in this example moves the UI control 1440 by using a finger to touch the UI control 1440 displayed on the touchscreen and dragging the finger along the touchscreen in a downward direction relative to the GUI 100 to a stop in the table in order to select the stop as the starting point stop of the saved route. When the commute application of some embodiments receives the described gesture input to select a stop in the table, the commute application moves the UI control 1440 downwards with respect to the display area 154 and over the stop in the table. In some embodiments, the commute application also shifts the table with respect to the display area 154 so that the UI control 1445 at the bottom of the table is displayed in the display area 154.

The fourth stage 1420 illustrates the GUI 100 after the user moved the UI control 1440 to select a stop in the Rodeo route as the starting point stop of the saved route. As shown, the user in this example moved the UI control 1440 over the Fleet at 2nd stop in the table to select that stop as the starting point stop of the saved route. In addition, the fourth stage 1420 shows the GUI 100 after the commute application shifted the table with respect to the display area 154 so that the UI control 1445 at the bottom of the table is displayed in the display area 154.

The fourth stage 1420 of the GUI 100 also illustrates the user moving the UI control 1445 to select an ending point stop in the Rodeo route for the saved route. For this example, the user moves the UI control 1445 by using a finger to touch the UI control 1445 displayed on the touchscreen and dragging the finger along the touchscreen in an upward direction relative to the GUI 100 to a stop in the table in order to select the stop as the ending point stop of the saved route. When the commute application receives the described gesture input to select a stop in the table, the commute application of some embodiments moves the UI control 1445 upwards along the display area 154 and over the stop in the table.

The fifth stage 1425 illustrates the GUI 100 after the user moved the UI control 1445 to select a stop in the Rodeo route as the ending point stop of the saved route. As illustrated, the user in this example moved the UI control 1445 over the Parks at Beacon stop in the table to select that stop as the ending point stop of the saved route. The fifth stage 1425 also shows the user selecting the UI item 1435 to store the saved route according to the stops selected by the UI controls 1440 and 1445. In this example, the user is selecting the UI item 1435 by using a finger to tap the UI item 1435 displayed on the touchscreen in order store the saved route. When the commute application receives the selection of the UI item 1435, the commute application of some embodiments stores (e.g., in a storage of the device) the saved route specifying the Fleet at 2nd stop in the Rodeo route as the starting point stop of the saved route and the Parks at Beacon stop in the Rodeo route as the ending point stop of the saved route. In some embodiments, the commute application transitions to displaying a page that displays a list of saved routes after storing the saved route.

The sixth stage 1430 illustrates the GUI 100 after the user selected the UI item 1435 to store the saved route and the commute application transitioned to a page displaying a list of saved routes. As shown, the display area 144 in the sixth stage 1430 is displaying a label "Favorites" to indicate that the currently displayed page of the GUI 100 is for the Favorites feature, the selectable UI item 425 for editing (e.g., modifying, deleting, etc.) saved routes displayed in the display area 154, and the selectable UI item 430 for transitioning to a page of the GUI 100 for creating a new saved route (e.g., the page illustrated in the second stage 1410).

As shown, the display area 154 in the sixth stage 1430 is displaying in different selectable rows information describing different saved routes stored on the device. In this example, the saved route stored in the fifth stage 1425 is the only saved route stored on the device. As such, the display area 154 is displaying in a selectable row information describing that saved route. The information used to describe the saved route in the sixth stage 1430 is similar the information used to describe the saved route in the sixth stage 330 described above by reference to FIG. 3. That is, the information describing the saved route includes an icon indicating the route from which the saved route was created (the Rodeo route in this example), the starting and ending point stops of the saved route, and different countdown times for different trips along the saved route. In some embodiments, as shown in this example, the countdown times for the next three trips along the saved route are displayed. As shown, the countdown times for the saved route in this example indicate that transit vehicles will arrive at the Fleet at 2nd stop in 24 minutes, 48 minutes, and 1 hour. In some embodiments, the commute application constantly, or at defined intervals, updates the countdown times displayed in the display area 154 based on the current time of the device executing the commute application.

Figure 15:
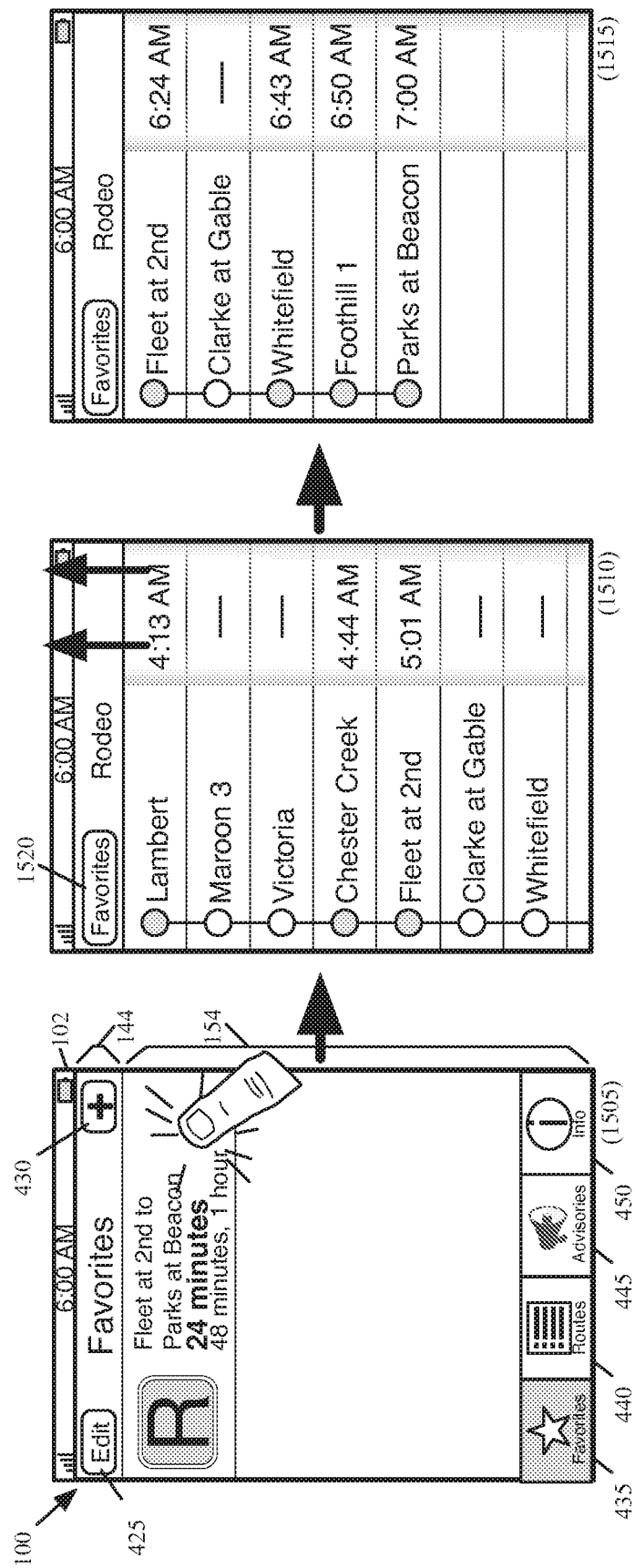
FIG. 15 conceptually illustrates the dynamic focus table of some embodiments displaying trips a saved route stored on a device.

FIG. 15 conceptually illustrates the dynamic focus table of some embodiments displaying trips for a saved route stored on a device. In particular, FIG. 15 illustrates the GUI 100 of the commute application at three different stages 1505-1515 that show the dynamic focus table displaying a saved routed stored on the device on which the commute application is operating.

The first stage 1505 is similar to the sixth stage 1430 described above by reference to FIG. 14. That is, the first stage 1505 illustrates the display area 144 displaying the label "Favorites", the selectable UI item 425, and the selectable UI item 430 and the display area 154 displaying in a selectable row information describing the saved route stored on the device at the fifth stage 1425 of FIG. 14. The first stage 1505 also illustrates a user selecting the selectable row displaying information regarding the saved route in order to view schedules for trips along the saved route.

The user in this example is selecting the row by using a finger to tap on the row displayed on the touchscreen in order to view schedules for trips along the saved route. In some embodiments, when the commute application receives the selection of the row, the commute application transitions to displaying a page for displaying schedules for trips along the saved route.

The second stage 1510 of the GUI 100 illustrates the dynamic focus table showing the same stops for the Rodeo route illustrated in the third stage 1415 of FIG. 14 as well as a schedule for a trip along the Rodeo route. In some embodiments, after the commute application displays the dynamic focus table, the commute application automatically moves the dynamic focus table with respect to the display area 154 so that the starting point stop specified in the saved route selected in the first stage 1505 shifts to the top of the display area 154 and then removes from the dynamic focus table the stops after the ending point stop specified in the saved route. For this example, the commute application is starting to shift the dynamic focus table, as indicated by the two arrows, so that the Fleet at 2nd stop will be displayed at the top of the display area 154. Additionally, the display area 144 in the second stage 1510 is displaying a selectable UI item 1520 for transitioning back to the page of the GUI 100 displaying the saved routes stored on the device illustrated in the first stage 1505.

For this example, the schedule displayed in the dynamic focus table is the schedule for a default trip along the Rodeo route that the commute application initially displays. After displaying the schedule for the default trip in the dynamic focus table, shifting the starting point stop specified in the saved route to the top of the display area 154, and removing from the dynamic focus table the stops after the ending point stop specified in the saved route, the commute application of some embodiments automatically shifts to displaying in the dynamic focus table the schedule for a trip that is scheduled to run next based on the current time of the device (6:00 AM in this example). In some embodiments, the commute application concurrently shifts the dynamic focus table so that the starting point stop specified in the saved route is displayed at the top of the display area 154, removes from the dynamic focus table the stops after the ending point stop specified in the saved route, and shifts to the schedule for the trip that is scheduled to run next. In some embodiments, the commute application shifts to the schedule for the trip that is scheduled to run next before shifting the starting point stop to the top of the display area 154 and removing from the dynamic focus table the stops after the ending point stop specified in the saved route.

The third stage 1515 shows the GUI 100 after the commute application finished shifting the starting point stop specified in the saved route, removing from the dynamic focus table the stops after the ending point stop specified in the saved route, and shifts to the schedule for the trip that is scheduled to run next. As shown, the dynamic focus table in the third stage 1515 shows a schedule for a trip that is scheduled to run next based on the current time of the device and for the stops in the saved route.

Figure 16:
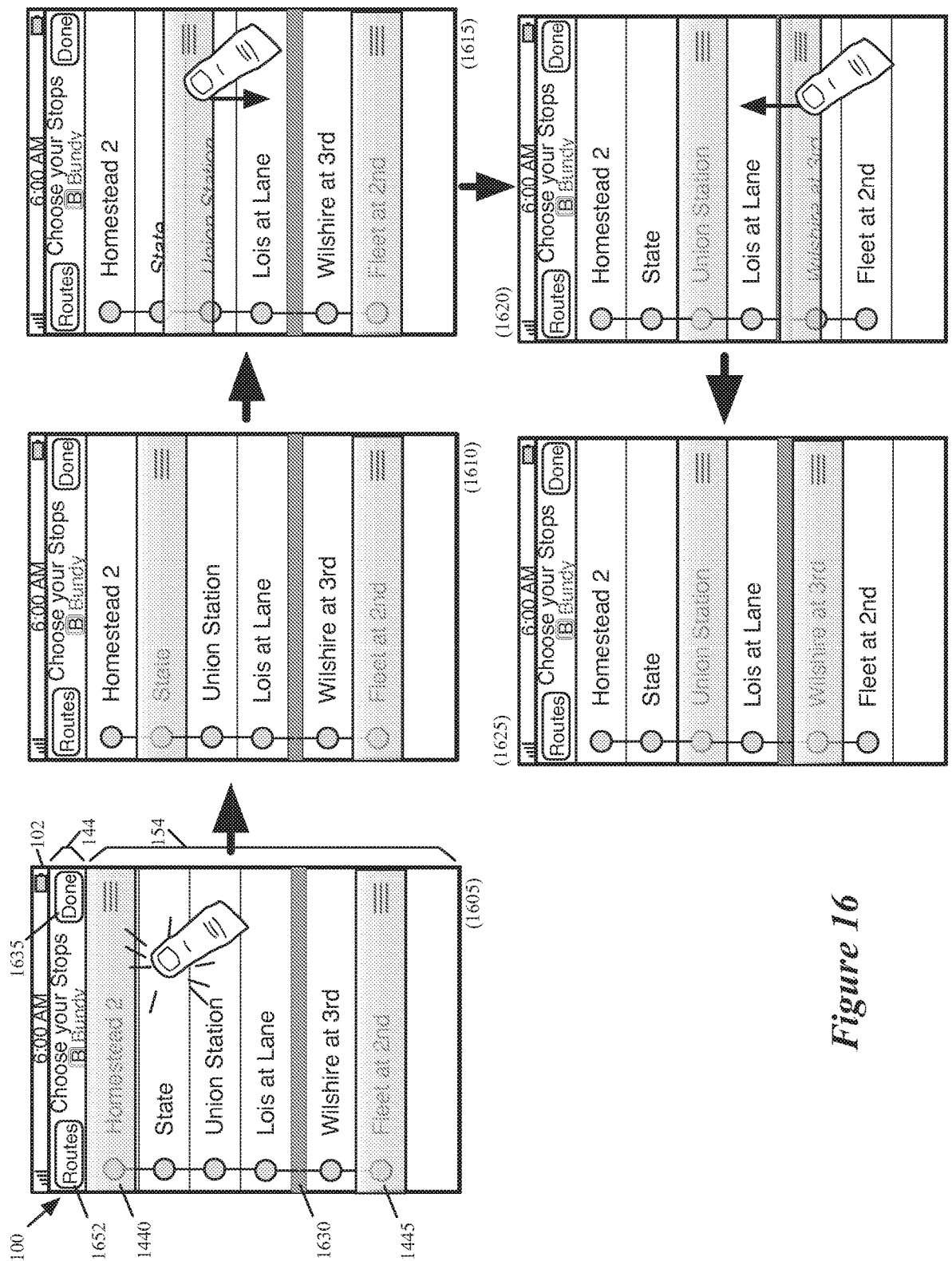
FIG. 16 conceptually illustrates the commute application of some embodiments providing several different techniques for selecting stops for a saved route.

FIG. 16 conceptually illustrates the commute application of some embodiments providing several techniques for selecting stops for a saved route. Specifically, FIG. 16 illustrates the GUI 100 of the commute application at five different stages 1605-1625 that show different techniques for selecting stops for a saved route.

The first stage 1605 illustrates the GUI 100 displaying a page for creating a saved route. As shown in the first stage 1605, the display area 144 is displaying a label Bundy to indicate that the information currently displayed on page of the GUI 100 is for the Bundy route, a selectable UI item 1652 for transitioning back to a page of the GUI 100 displaying different routes (e.g., the page of the GUI 100 illustrated in the second stage of FIG. 14), and a selectable UI item 1635 for storing a saved route.

In this example, the display area 154 is displaying a table that includes stops of a route, the movable UI control 1440 for selecting a stop in the route as a starting point stop of a saved route, and the movable UI control 1445 for selecting a stop in the route as an ending point stop of the saved route. In addition, the display area 154 in this example is displaying a region separator 1630 for indicating that stops above the region separator 1630 are geographically located at or near a first geographic region and stops below the region separator 1630 are geographically located at or near a second geographic region. As shown, the UI controls 1440 and 1445 in this example are positioned at default locations at the top and bottom of the table, respectively.

In some embodiments, the commute application allows a user to select a starting point stop or an ending point stop for a saved route by selecting a stop in the table. In particular, when the commute application of some embodiments receives a selection of a stop in the table above the region separate 1630, the commute application identifies the selected stop as the starting point stop for the saved route and moves the UI control 1440 over the selected stop. Similarly, when the commute application of some embodiments receives a selection of a stop in the table below the region separate 1630, the commute application identifies the selected stop as the ending point stop for the saved route and moves the UI control 1445 over the selected stop.

The first stage 1605 of the GUI 100 also illustrates the user selecting a stop in the table above the region separate 1630 to select a starting point stop for a saved route. In particular, the user in this example is selecting the State stop by using a finger to tap the State stop displayed on the touchscreen in order to select the State stop as the starting point stop for the saved route. Upon receiving the selection of the State stop, the commute application of some embodiments identifies the State stop as the starting point stop for the saved route and moves the UI control 1440 over the selected stop.

The second stage 1610 illustrates the GUI 100 after the user selected the State stop in the table and the commute application moved the UI control 1440 over the State stop in the table. As shown, the UI control 1440 is now displayed over the State stop in the table.

As described above, the commute application of some embodiments allows a user to select a stop for a saved route by selecting and moving a stop picker over the stop that the user wishes to select. In some embodiments, the commute application provides a sliding glass emulation feature that generates an effect where any object or element that is overlaid by the stop picker appears like the object or element is underneath a sliding glass.

The third stage 1615 of the GUI 100 illustrates an example of such a sliding glass emulation feature. As shown, the user in the third stage 1615 is moving the UI control 1440 to select a different starting point stop for the saved route. For this example, the user is moving the UI control 1440 by using a finger to touch the UI control 1440 displayed on the touchscreen and dragging the finger along the touchscreen in a downward direction relative to the GUI 100 to select a different stop in the table as the starting point stop for the saved route. As shown, the portion of the status circle and text for the Union Station stop over which the UI control 1440 is superimposed appears as if they are underneath a sliding glass.

The fourth stage 1620 shows the GUI 100 after the user moved the UI control 1440 to select a different starting point stop for the saved route. As illustrated, the user in this example moved the UI control 1440 over the Union Station stop in the table to select that stop as the starting point stop for the saved route. The fourth stage 1620 also shows the user moving the UI control 1445 to select an ending point stop for the saved route. The user in this example is moving the UI control 1445 by using a finger to touch the UI control 1445 displayed on the touchscreen and dragging the finger along the touchscreen in an upward direction relative to the GUI 100 to select a stop in the table as an ending point stop for the saved route. As shown, the portion of the status circle and text for the Wilshire at 3rd stop over which the UI control 1445 is superimposed appears as if they are underneath a sliding glass.

The fifth stage 1625 illustrates the GUI 100 after the user moved the UI control 1445 to select an ending point stop for the saved route. For this example, the user moved the UI control 1445 over the Wilshire at 3rd stop in the table to select that stop as the ending point stop for the saved route.

A. Detailed View

Figure 17:
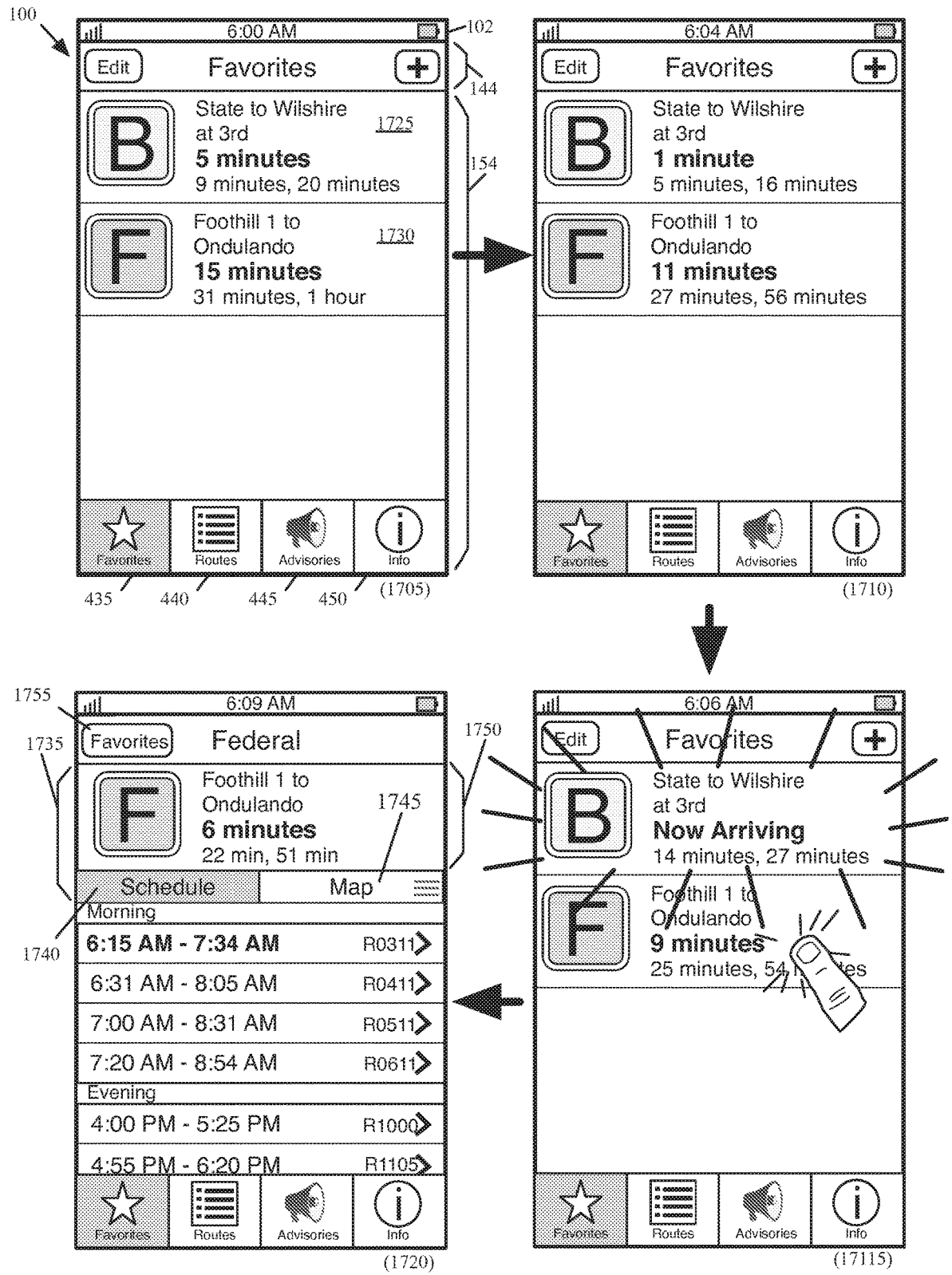
FIG. 17 conceptually illustrates the commute application of some embodiments providing trip information for saved routes stored on a device.

FIG. 17 conceptually illustrates the commute application of some embodiments providing trip information for saved routes stored on a device. In particular, FIG. 17 illustrates the GUI 100 of the commute application at four different stages 1705-1720 of providing different trip information for saved routes stored on the device on which the commute application is operating.

The first stage 1705 is similar to the sixth stage 1430 described above by reference to FIG. 14 except the first stage 1705 illustrates the display area 154 displaying in separate selectable rows 1725 and 1730 information describing the saved route stored on the device in this example. As shown, the saved route shown in the selectable rows 1725 starts at State stop and ends at Wilshire at 3rd and the saved route shown in the selectable rows 1730 starts at Foothill I and ends at Ondulando.

As shown in the first stage 1705, the countdown times for the saved route shown in the selectable rows 1725 indicate that transit vehicles will arrive at the State stop in 5 minutes, 9 minutes, and 20 minutes. Also, the countdown times for the saved route shown in the selectable rows 1730 indicate that transit vehicles will arrive at the Foothill 1 stop in 15 minutes, 31 minutes, and 1 hour.

The second stage 1710 illustrates the GUI 100 after an amount of time has passed on the current time of the device with respect to the current time of the device illustrated in the first stage 1705. As shown, the current time on the device illustrated in the second stage 1710 is four minutes later than the current time on the device illustrated in the first stage 1705. As noted above, in some embodiments, the commute application constantly, or at defined intervals, updates the countdown times displayed in the display area 154. For instance, the commute application of some such embodiments constantly, or at defined intervals, monitors the current time of the device and updates the countdown times for the saved routes displayed in the display area 154.

As illustrated in the second stage 1710, the countdown times for the saved route shown in the selectable rows 1725 have been updated based on the current time of the device and now indicate that transit vehicles will arrive at the State stop in 1 minutes, 5 minutes, and 16 minutes. Also, the countdown times for the saved route shown in the selectable rows 1730 are similarly updated and now indicate that transit vehicles will arrive at the Foothill 1 stop in 11 minutes, 27 minutes, and 56 minutes. In some embodiments, the commute application updates the countdown times for the saved route based on both the location of the device and the location of the transit vehicle traversing the saved route. For instance, the commute application of some embodiments receives updates to the arrival and departure time of transit vehicles at each stop along a route from a set of servers operated by a transit operator or from one or more third parties that collect this information from the transit operator or from equipment that these parties install on the transit vehicles.

The third stage 1715 illustrates the GUI 100 after another amount of time has passed with respect to the current time of the device illustrated in the second stage 1710. As shown, the current time on the device illustrated in the third stage 1715 is two minutes later than the current time on the device illustrated in the second stage 1710. Accordingly, the countdown times illustrated in the third stage 1715 for the saved routes shown in the selectable rows 1725 and 1730 have been decreased by two minutes.

Instead of displaying a countdown time, the commute application of some embodiments provides a warning indicator for a saved route that a transit vehicle is arriving soon when the countdown time for a trip passes a threshold amount of time (e.g., 1 minute, 2 minutes, 5 minutes, etc.). In this example, the commute application uses a five-minute threshold amount of time. Since the countdown time for the first trip along the saved route displayed in the selectable row 1725 has passed the threshold amount of time, the third stage 1715 is displaying a "Now Arriving" warning indicator.

The third stage 1715 of the GUI 100 also shows a user selecting the selectable row 1730 to display a detailed view for the saved route. In this example, the user is selecting selectable row 1730 by using a finger to tap on selectable row 1730 displayed on the touchscreen of the device on which the commute application is operating in order to view the detailed view for the saved route. When the commute application receives the selection of selectable row 1730, the commute application of some embodiments transitions to displaying a page displaying a detailed view for the saved route.

The fourth stage 1720 shows the GUI 100 after the user selected the selectable row 1730 to view the detailed view for the saved route. As shown, the display area 154 in the fourth stage 1720 shows a schedule view table that includes a list of all the trips along the saved route for the entire day and an adjustable header 1735 that is displayed over the schedule view table. The adjustable header 1735 includes selectable UI items 1740 and 1745 and a display area 1750 for displaying information regarding the saved route, which includes countdown times for the next three scheduled trips along the saved route that the commute application of some embodiments updates constantly or at defined intervals. The UI item 1740 is for displaying a list view (i.e., schedule view) in the detailed view for a saved route shown in the fourth stage 1720 while the UI item 1745 is for displaying a map view in the detailed view for the saved route, which is described below. The fourth stage 1720 also shows a selectable UI item 1755 for transitioning back to the page of the GUI 100 displaying the saved routes stored on the device illustrated in the first, second, and third stages 1705-1715.

B. Schedule View

Figure 18:
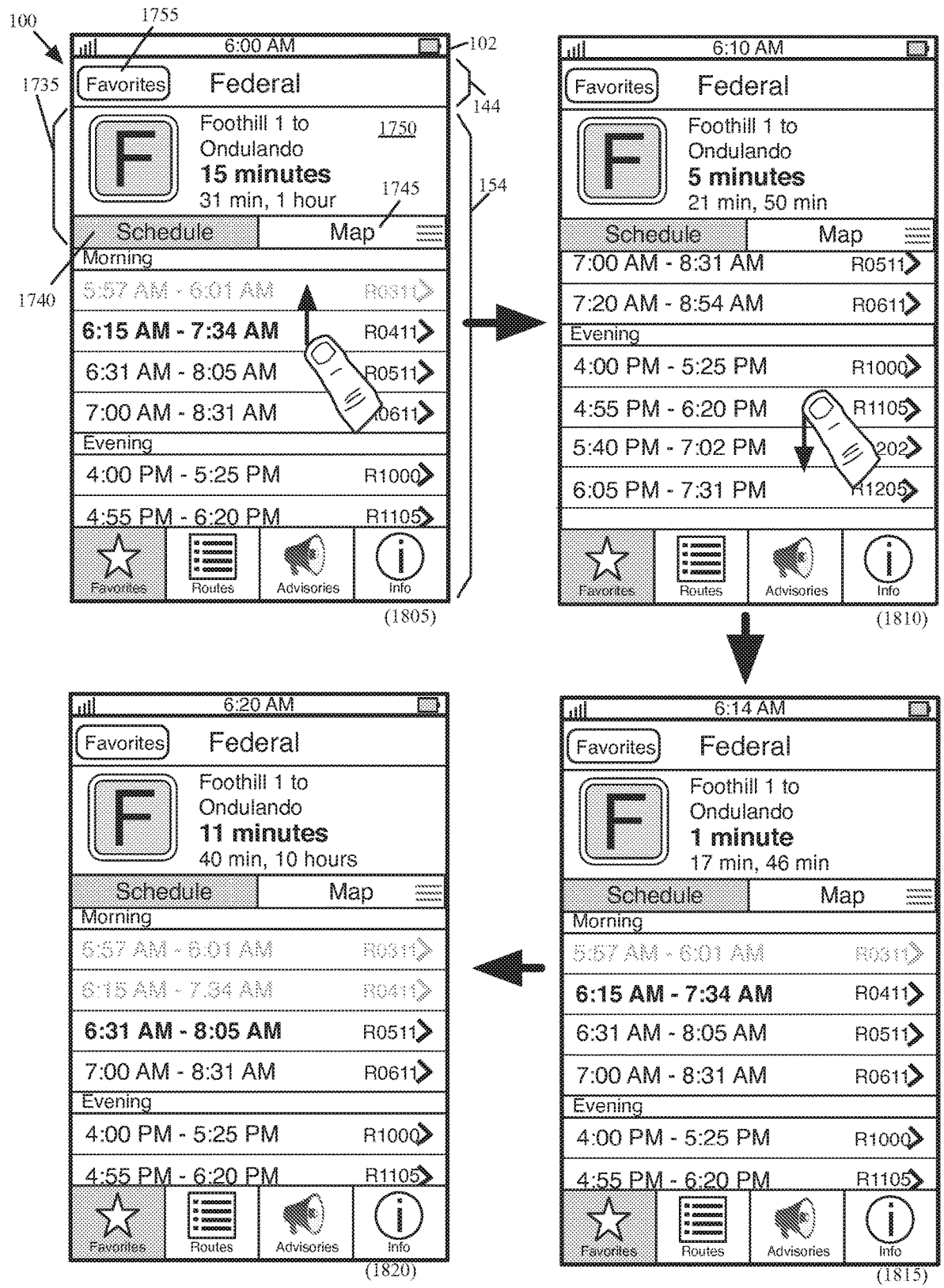
FIG. 18 conceptually illustrates the commute application of some embodiments providing a schedule view for a saved route.

FIG. 18 conceptually illustrates the commute application of some embodiments providing a schedule view for a saved route. In particular, FIG. 18 illustrates the GUI 100 of the commute application at four different stages 1805-1820 of providing a schedule view for saved route stored on the device on which the commute application is operating.

The first stage 1805 is similar to the fourth stage 1720 described above by reference to FIG. 17 except the next three scheduled trips for the saved route are different. For each of the trips listed in the schedule view table, when the commute application detects that the current time of the device passes the arrival time of the first stop of the trip (i.e., the starting point stop), the commute application grays out the trip in the schedule view table. As shown in the first stage 1805, the first trip is grayed out because the current time of the device (6:00 AM in this example) has passed the arrival time (5:57 AM in this example) of the first stop of the first trip along the saved route. In addition, the commute application of some embodiments highlights the trip in the schedule view table that is schedule to run next. The second trip displayed in the schedule view table in the first stage 1805, which is the trip in the schedule view table that is schedule to run next, is highlighted by bolding the start and end times of the stops in the trip.

The first stage 1805 of the GUI 100 shows the user performing a scroll operation on the schedule view table in order to view a different portion of the schedule view table. As shown in this example, the user is performing the scroll operation by using a finger to touch a location in the schedule view table displayed on the touchscreen and dragging the finger along the touchscreen in an upwards direction relative to the GUI 100 in order to scroll to the schedule view table downwards and view the bottom of the schedule view table. When the commute application of some embodiments receives the described gesture input for scrolling the schedule view table, the commute application scrolls the schedule view table upwards with respect to the display area 154 to display the bottom portion of the schedule view table.

The second stage 1810 illustrates the GUI 100 after the user performed the scrolling operation on the schedule view table to view the bottom portion of the schedule view table. In the second stage 1810, the display area 154 is displaying the bottom portion of the schedule view table, which shows trips along the saved route scheduled to run in the evening. In addition, the commute application has updated the countdown times displayed in the display area 1750 based on the current time of the device.

The second stage 1810 of the GUI 100 also shows the user performing a scroll operation on the schedule view table in order to view another portion of the schedule view table. The user in this example is performing the scroll operation by using a finger to touch a location in the schedule view table displayed on the touchscreen and dragging the finger along the touchscreen in a downwards direction relative to the GUI 100 in order to scroll to the schedule view table upwards and view the top of the schedule view table. When the commute application of some embodiments receives the described gesture input for scrolling the schedule view table, the commute application scrolls the schedule view table downwards with respect to the display area 154 to display the top portion of the schedule view table.

The third stage 1815 illustrates the GUI 100 after the user performed the scrolling operation on the schedule view table to view the top portion of the schedule view table. The trips in the schedule view table shown in the third stage 1815 is the same as the trips in the schedule view table shown in the first stage 1805. As shown, the countdown times displayed in the display area 1750 have been updated based on the current time of the device.

The fourth stage 1820 illustrates the GUI 100 after more time has passed with respect to the current time of the device illustrated in the third stage 1815. As shown, the current time on the device illustrated in the fourth stage 1820 is six minutes later than the current time on the device illustrated in the third stage 1815. The countdown times displayed in the display area 1750 have been updated accordingly based on the current time of the device.

As noted above, when the commute application detects that the current time of the device passes the arrival time of the first stop of a trip, the commute application grays out the trip in the schedule view table. The fourth stage 1820 shows that the second trip in the schedule view table is grayed out because the current time of the device (6:20 AM in this example) has passed the arrival time (6:15 AM in this example) of the first stop of the second trip along the saved route. In addition, in some embodiments, the commute application highlights the trip in the schedule view table that is schedule to run next. As shown, the third trip displayed in the schedule view table in the fourth stage 1820 is now highlighted by bolding the start and end times of the stops in the trip.

Figure 19:
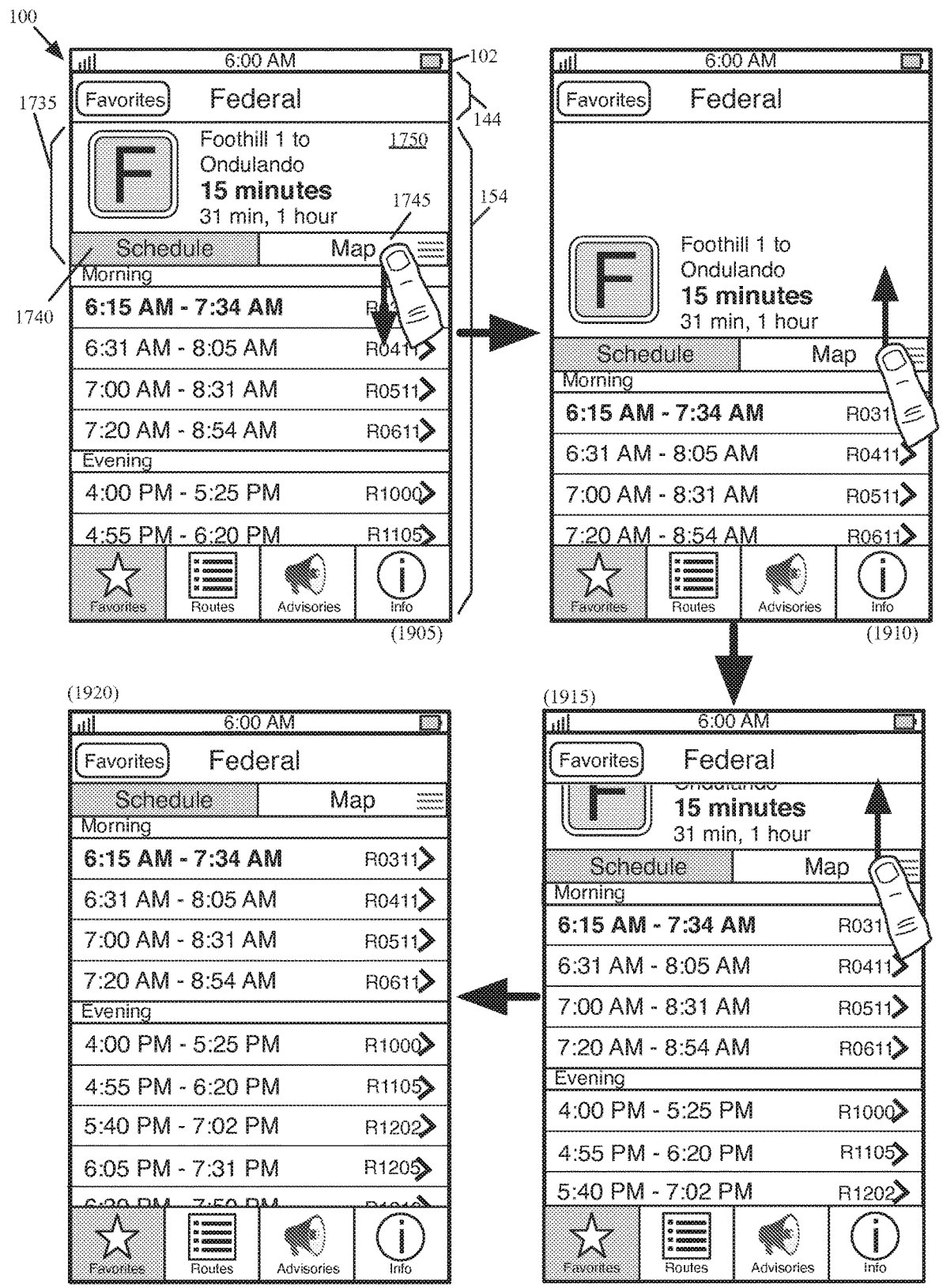
FIG. 19 conceptually illustrates adjusting the header of the schedule view according to some embodiments of the invention.

FIG. 19 conceptually illustrates adjusting the header of the schedule view according to some embodiments of the invention. Specifically, FIG. 19 illustrates the GUI 100 of the commute application at four different stages 1905-1920 of performing several adjustments to the header of the schedule view.

The first stage 1905 is similar to the fourth stage 1720 described above by reference to FIG. 17 except the first stage 1905 shows a user performing an adjustment to the header 1735. The user in this example adjusts the header 1735 by using a finger to touch the header 1735 displayed on the touchscreen and dragging the finger along the touchscreen in a downward direction relative to the GUI 100 to expand the header 1735. By providing this type of direct manipulation of the header 1735 (as opposed to indirect manipulation of the header 1735, such as inertia-based manipulation or rubber-banding-based manipulation) to adjust the header 1735, the user is able to specifically specify the amount of space that the header 1735 occupies in the display area 154. When the commute application of some embodiments receives the described gesture input to adjust the header 1735, the commute application moves the header 1735 and the schedule view table downwards relative to the GUI 100 while expanding the top portion of the header 1735.

The second stage 1910 shows the GUI 100 after the user adjusted the header 1735 to expand the top portion of the header 1735. As shown, the header 1735 and the schedule view table are shifted downwards to make room for the expanded top portion of the header 1735. While the second stage 1910 in this example shows a blank area in the expanded top portion of the header 1735, the commute application of some embodiments displays different information in expanded top portion of the header 1735 differently in different embodiments. For instance, in some embodiments, the commute application displays a map that illustrates scheduled trips along the saved route (e.g., any of the illustrated maps below in FIGS. 21-32).

The second stage 1910 additionally shows the user performing another adjustment to the header 1735. For this example, the user adjusts the header 1735 by using a finger to touch the header 1735 displayed on the touchscreen and dragging the finger along the touchscreen in an upwards direction relative to the GUI 100 to contract the header 1735. Upon receiving the described gesture input to adjust the header 1735, the commute application of some embodiments moves the header 1735 and the schedule view table upwards relative to the GUI 100 while contracting the top portion of the header 1735.

The third stage 1915 shows the GUI 100 after the user adjusted the header 1735 to contract the top portion of the header 1735. As shown, the header 1735 and the schedule view table are shifted upwards to fill the extra room created due to the contraction of the top portion of the header 1735. The third stage 1915 of the GUI 100 also illustrates the user continuing to perform the adjustment to the header 1735 described above by reference to the second stage 1910 to continue to contract the top portion of the header 1735. As explained above, the user is able to specifically specify the amount of space that the header 1735 occupies in the display area 154 through the type of direct manipulation of the header 1735 illustrated in the second and third stages 1910 and 1915 to adjust the header 1735.

The fourth stage 1920 shows the GUI 100 after the user has finished adjusting the header 1735 to contract the top portion of the header 1735. The header 1735 and the schedule view table in the fourth stage 1920 are shifted upwards to fill the extra room created by the contraction of the top portion of the header 1735. Specifically, the fourth stage 1920 illustrates that only the UI elements 1740 and 1745 of the header 1735 are displayed in the display area 154.

Figure 20:
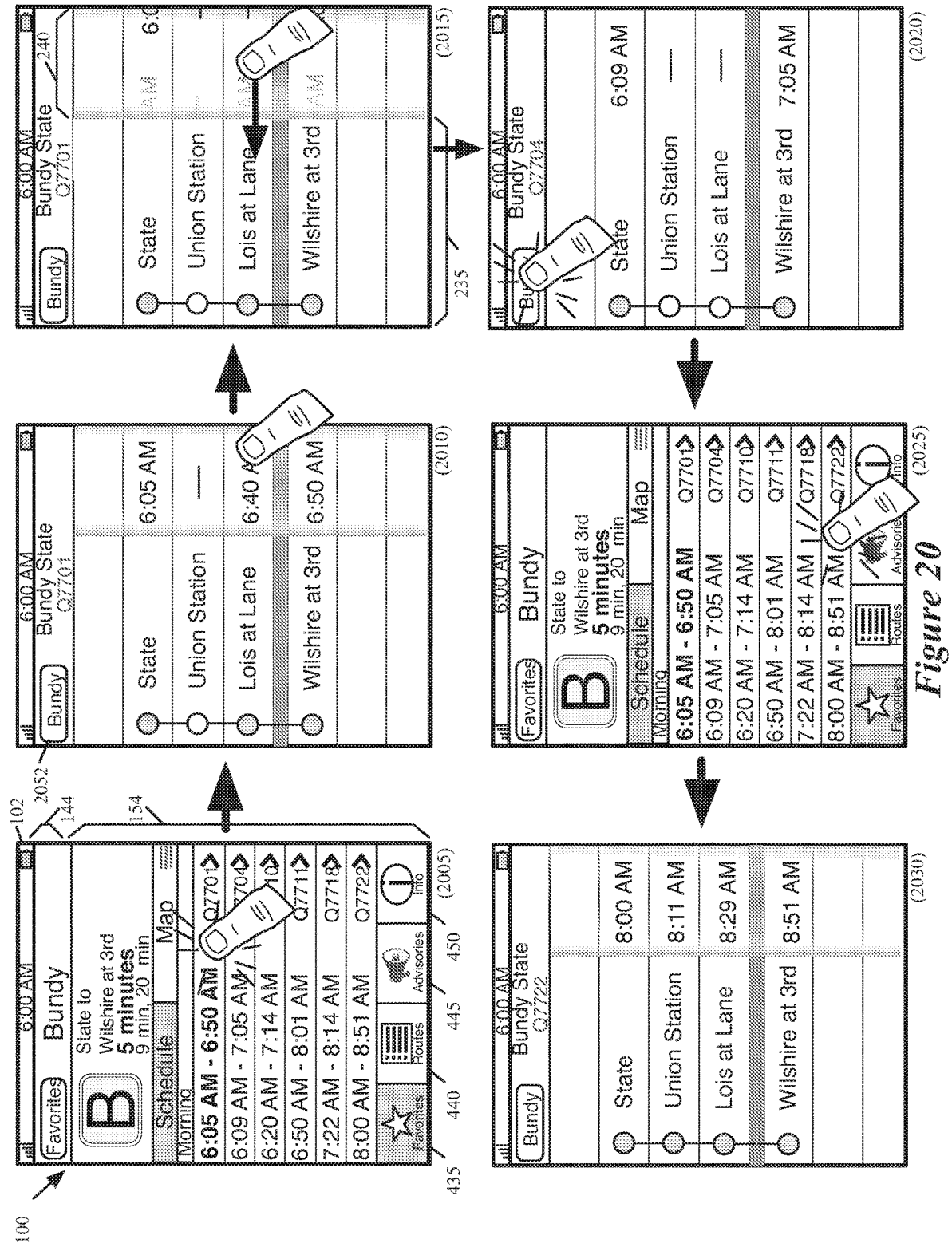
FIG. 20 conceptually illustrates the commute application of some embodiments displaying trips along a saved route selected from a schedule view table.

FIG. 20 conceptually illustrates the commute application of some embodiments displaying trips along a saved route selected from a schedule view table. Specifically, FIG. 20 illustrates the GUI 100 of the commute application at six different stages 2005-2030 of displaying several trips along the saved route.

The first stage 2005 is similar to the fourth stage 1720 described above by reference to FIG. 17 except the first stage 2005 of FIG. 20 shows the schedule view for the saved route illustrated in the row 1725. In addition, the first stage 2005 of the GUI 100 illustrates a user selecting a schedule for a trip that is scheduled next to run along the saved route, as indicated by the highlighting of the trip in the schedule view table. In particular, the user in this example is selecting the schedule for the trip that is scheduled next to run along the saved route by using a finger to tap the trip in the schedule view table that is displayed on the touchscreen in order to view the schedule for the trip. When the commute application of some embodiments receives the selection of the trip in the schedule view table, the commute application transitions to displaying a page that shows the stops along the saved route and the schedule for the selected trip.

The second stage 2010 shows the GUI 100 after the user selected the trip in the schedule view table in order to view the schedule for the trip along the saved route. As illustrated, the second stage 2010 of the GUI 100 shows a page in which the display area 144 is displaying the name of a route from which the saved route was created (the Bundy route in this example), a name of the trip along the saved route, and a selectable UI item 2052 for transitioning back to the page of the GUI 100 displaying the schedule view for the saved route illustrated in the first stage 2005.

In the second stage 2010, the display area 154 is displaying a dynamic focus table that includes the stops along the saved route and the schedule for the selected trip. As shown, the dynamic focus table displays only the starting and ending point stops specified in the saved route and all the intermediate stops between the starting and ending point stops. As noted above, the commute application of some embodiments displays in the dynamic focus table automatic operations being performed (e.g., initially displaying the schedule for a default trip and then automatically shifting to displaying the schedule for a trip that is scheduled to run next and/or automatically shifting to the top, the first stop of the displayed schedule) to achieve the desired results in the dynamic focus table. However, the commute application in the examples illustrated in FIG. 20 does not perform such automatic operations in order to display the selected trip in the dynamic focus table. Rather, in some embodiments, the commute application directly displays the dynamic focus table with the stops along the saved route and the schedule for the selected trip.

The third stage 2015 shows the user performing a scroll operation on the dynamic focus table in order to view a schedule for a trip that is scheduled to run along the saved route after the schedule for the trip displayed in the second stage 2010. For this example, the user is performing the scroll operation by using a finger to touch a location in the column 240 of the dynamic focus table displayed on the touchscreen and dragging the finger along the touchscreen in a leftwards direction relative to the GUI 100 in order to scroll a schedule for a different trip into view in the column 240.

In some embodiments, when the commute application receives the described gesture input for scrolling to the schedule for a different trip, the commute application slides the schedule for the current trip displayed in the column 240 out of view while sliding a schedule for a different trip along the saved route into view. For this example, the commute application slides the schedules into and out of view such that the schedule for the current trip displayed in the column 240 appears to slide underneath the column 235 while the schedule for the different trip along the saved route appears to slide out from the right side of the column 240 towards the left side of the column 240.

The fourth stage 2020 shows the GUI 100 after the user performed the scrolling operation to view a scheduled time for a different trip along the saved route. The GUI 100 of the fourth stage 220 additionally shows the user selecting the selectable UI item 2052 to transitioning back to the page of the GUI 100 illustrated in the first stage 2005. When the commute application of some embodiments receives the selection of the UI item 2052, the commute application transitions to displaying the page shown in the first stage 2005.

The fifth stage 2025 illustrates the GUI 100 after the user selected the UI item 2052 to view the schedule view for the saved route. The GUI 100 of the fifth stage 2025 shows the user selecting a different trip in the schedule view table. The user in this example is selecting the different trip by using a finger to tap on the trip in the schedule view table that is displayed on the touchscreen in order to view the schedule for the trip. Upon receiving selection of the trip in the schedule view table, the commute application of some embodiments transitions to displaying a page that shows the stops along the saved route and the schedule for the selected trip.

Finally, the sixth stage 2030 shows the GUI 100 after the user selected the trip in the schedule view table in order to view the schedule for a different trip along the saved route. The GUI 100 illustrated in the sixth stage 2010 is similar to the GUI 100 illustrated in the second stage 2010 except the dynamic focus table shown in the sixth stage 2030 is displaying the schedule for the trip selected in the fifth stage 2025.

C. Map View

Figure 21:
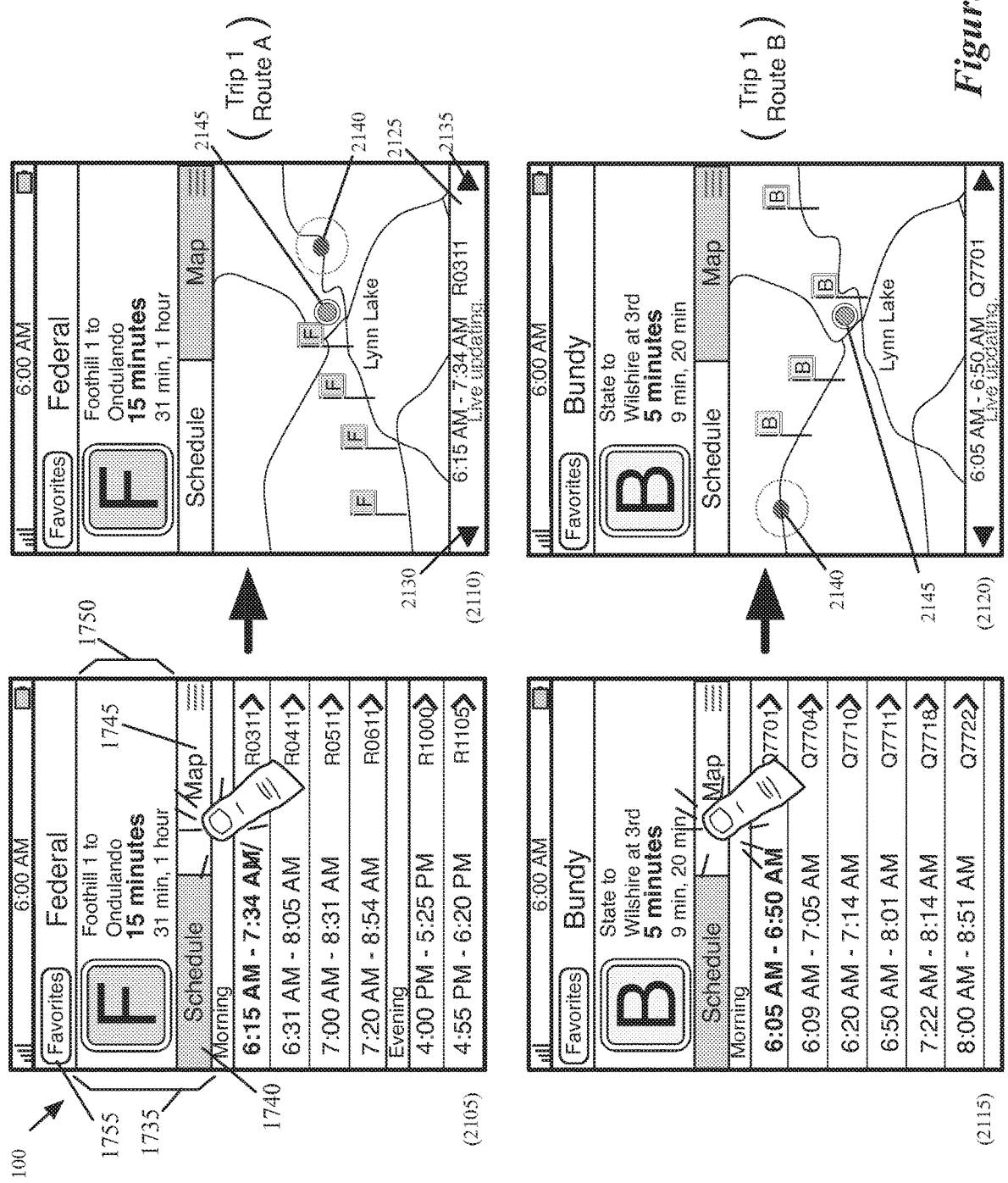
FIG. 21 conceptually illustrates the commute application of some embodiments providing a map view for a saved route.

FIG. 21 conceptually illustrates the commute application of some embodiments providing a map view for a saved route. In particular, FIG. 21 illustrates the GUI 100 of the commute application at two stages 2105 and 2110 of providing a map view for a first saved route (e.g., Trip 1 along Route A) and at two stages 2115 and 2120 of providing a map view for a second saved route (e.g., Trip 1 along Route B).

The first stage 2105 is similar to the fourth stage 1720 described above by reference to FIG. 17 except the first stage 2105 of FIG. 21 shows a user selecting the UI item 1745 to switch from displaying the schedule view for the saved route to displaying a map view for the saved route. In this example, the user is selecting the UI item 1745 by using a finger to tap the UI item 1745 displayed on the touchscreen in order to display the map view for the saved route. When the commute application of some embodiments receives the selection of the UI item 1745, the commute application transitions to displaying a page that shows a map illustrating the stops in the saved route in the map and a schedule for a trip along the saved route.

The second stage 2110 shows the GUI 100 after the user selected the UI item 1745 in order to view the map view for the saved route. As shown in the second stage 2110, the map view for the saved route includes a map for displaying the saved route along with a schedule banner 2125 and the adjustable header 1735 that are displayed over the map. As shown, the map is displaying the stops in the saved route, which are represented by flags that have icons representing the route from which the saved route was created on the flags, the current location in the map of a transit vehicle, represented by a dot 2140 encompassed by a circle, used for traveling along the scheduled trip shown in the schedule banner 2125, and the current location of the device on which the commute application is operating. The current location of the device is represented by a circle 2145 with a white border.

The schedule banner 2125 in the second stage 2110 is displaying a schedule for a trip that is scheduled to run next along the saved route and selectable UI items 2130 and 2135. The UI item 2130 is for displaying in the schedule banner 2125 a schedule for a trip that is scheduled to run before the schedule for the currently displayed trip and the UI item 2135 is for displaying in the schedule banner 2125 a schedule for a trip that is scheduled to run after the schedule for the currently displayed trip.

The third stage 2115 is similar to the fourth stage 1720 described above by reference to FIG. 17 except the third stage 2115 of FIG. 21 shows the schedule view for the saved route illustrated in the row 1730. Similarly to the first stage 2005, the third stage 2115 of the GUI 100 illustrates the user selecting the UI item 1745 to switch from displaying the schedule view for the saved route to displaying a map view for the saved route. The user for this example is selecting the UI item 1745 by using a finger to tap the UI item 1745 displayed on the touchscreen in order to display the map view for the saved route. When the commute application of some embodiments receives the selection of the UI item 1745, the commute application transitions to displaying a page that shows a map illustrating the stops in the saved route in the map and a schedule for a trip along the saved route.

The fourth stage 2120 shows the GUI 100 after the user selected the UI item 1745 in the third stage 2115 to view the map view for the saved route. The fourth stage 2120 shows the map view for the saved route that includes a map for displaying the saved route along with the schedule banner 2125 and the adjustable header 1735 that are displayed over the map. The map in the fourth stage 2120 is displaying the stops in the saved route, which are represented by flags that have icons representing the route from which the saved route was created on the flags, the current location in the map of a transit vehicle (represented by the dot 2140) used for traveling along the scheduled trip shown in the schedule banner 2125, and the current location of the device, which is represented by the circle 2145. The schedule banner 2125 in the fourth stage 2120 is displaying a schedule for a trip that is scheduled to run next along the saved route and selectable UI items 2130 and 2135, which are for displaying a schedule for a trip that is scheduled to run before the schedule for the currently displayed trip in the schedule banner 2125 and displaying a schedule for a trip that is scheduled to run after the schedule for the currently displayed trip in the schedule banner 2125, respectively.

In some embodiments, the commute application receives the current location of the transit vehicle automatically from the transit system operator or third party vendors periodically in order to display the location 2140 on the map. Also, in some embodiments the icons that represent the routes (e.g., flags "F" and "B" in the illustrated example) are graphical representations that the commute application uses to present the transit data (e.g., routes, trips, stops, etc.) in a particular locality (e.g., city, state, etc.), in the same manner that the operator of the transit system presents those transit data in that particular locality.

Figure 22:
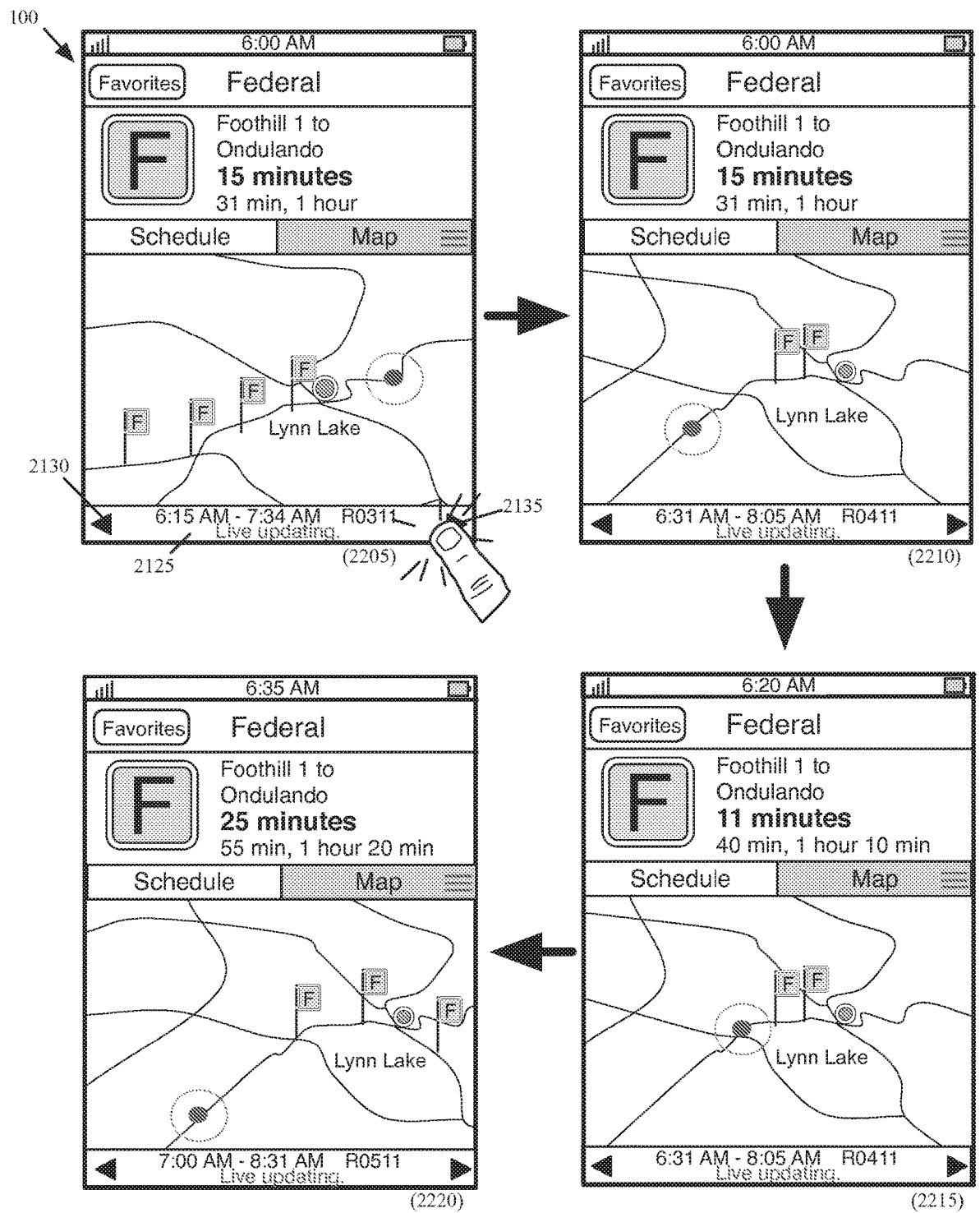
FIG. 22 conceptually illustrates the commute application of some embodiments displaying trips in a map view for a saved route.

FIG. 22 conceptually illustrates the commute application of some embodiments displaying trips in a map view for a saved route. Specifically, FIG. 22 illustrates the GUI 100 of the commute application at four different stages 2205-2220 of displaying different trips in a map view for a saved route.

The first stage 2205 is similar to the fourth stage 2120 described above by reference to FIG. 21 except the first stage 2205 of FIG. 22 additionally illustrates manually changing the trip displayed in the map view. Specifically, the first stage 2205 shows a user selecting the UI item 2135 to display in the schedule banner 2125 a schedule for a trip that is scheduled to run after the schedule for the currently displayed trip. For this example, the user is selecting the UI item 2135 by using a finger to tap the UI item 2135 displayed on the touchscreen in order to display the map view for the saved route. When the commute application of some embodiments receives the selection of the UI item 2135, the commute application displays in the schedule banner 2125 the next schedule for a trip that is scheduled to run after the schedule for the currently displayed trip.

The second stage 2210 shows the GUI 100 after the user selected the UI item 2135 in order to display the next scheduled trip in the schedule banner 2125, which includes different stops along the trip for this example. As shown, the schedule banner 2225 in the second stage 2210 is displaying a schedule for a trip that is scheduled to run after the schedule for the trip displayed in the first stage 2205. Also, the map is displaying different stops as well as a different number of trips compared to the stops for the scheduled trip illustrated in the first stage 2205.

The third stage 2215 illustrates the GUI 100 after an amount of time has passed on the current time of the device with respect to the current time of the device illustrated in the second stage 2210. As shown, the current time on the device illustrated in the third stage 2215 is twenty minutes later than the current time of the device illustrated in the second stage 2210. Accordingly, the countdown times displayed in the third stage 2215 have been updated based on the current time of the device and the current location of the transit vehicle, used for traveling along the scheduled trip shown in the schedule banner 2125, has also been updated in the map.

In some embodiments, when the commute application detects that that current time of the device passes the arrival time of the first stop of the trip displayed in the map view, the commute application automatically transitions to displaying the next trip scheduled to run. The fourth stage 2220 of FIG. 22 illustrates an example of such an automatic change of the trip displayed in the map view. In the fourth stage 2220, the current time of the device has passed the arrival time of the first stop of the trip shown in the third stage 2215. When the commute application detects that the current time of the device has passed the arrival time of the first stop of the trip shown in the third stage 2215, the commute application of some embodiments automatically changes the trip displayed in the map view to the next scheduled trip with the first stop's arrival that the current time of the device has not passed. As shown in the fourth stage 2220, the map view of the saved route is displaying a scheduled trip with the first stop's arrival time that the current time of the device has not passed.

Figure 23:
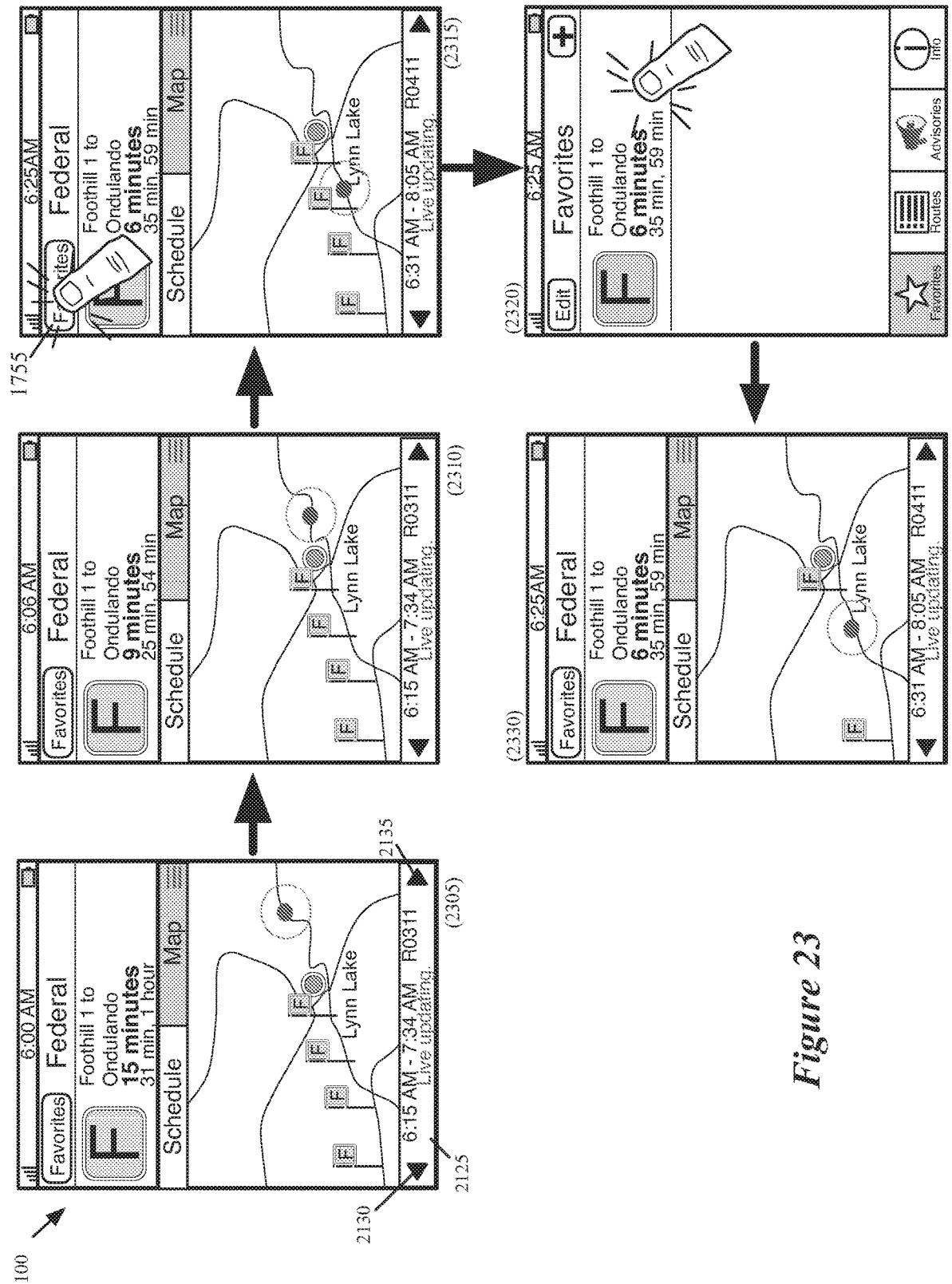
FIG. 23 conceptually illustrates the commute application of some embodiments displaying trips in a map view for a saved route.

FIG. 23 conceptually illustrates the commute application of some embodiments displaying trips in a map view for a saved route. Specifically, FIG. 23 illustrates the GUI 100 of the commute application at four different stages 2305-2320 of displaying different trips in a map view for a saved route.

The first stage 2305 is similar to the first stage 2205 described above by reference to FIG. 22 except the first stage 2305 of FIG. 23 does not show a user selecting the UI item 2135. The second stage 2310 shows the GUI 100 after an amount of time has passed on the current time of the device with respect to the current time of the device illustrated in the first stage 2305. As shown, the current time on the device illustrated in the second stage 2310 is six minutes later than the current time on the device illustrated in the first stage 2305. Since the current time of the device has not passed the arrival time of the first stop of the trip shown in the first stage 2315, the trip shown in the first stage 2315 is still displayed in the schedule banner 2125. In addition, the countdown times displayed in the first stage 2305 have been updated based on the current time of the device and the current location of the transit vehicle used for traveling along the scheduled trip shown in the schedule banner 2125 has also been updated in the map.

In some embodiments, when the commute application detects that current time of the device passes the arrival time of the first stop of the trip displayed in the map view, the commute application transitions to displaying the next trip scheduled to run in the schedule banner 2125 but does not update the map or the countdown times with the trip displayed in the schedule banner 2125. The commute application of some embodiments only updates the map and countdown times in the map view with the next scheduled trip when the commute application initially enters the map view. This way, the commute application prevents any large context changes in the map that would potentially confuse the user if the user was not looking at the map when the map is updated. In some embodiments, the commute application still updates the map and the countdown times for the saved route that is displayed in the map view.

The third stage 2315 shows the GUI 100 after an amount of time has passed on the current time of the device with respect to the current time of the device illustrated in the second stage 2310. As shown, the current time on the device illustrated in the third stage 2315 is nineteen minutes later than the current time on the device illustrated in the second stage 2310. As the current time of the device has passed the arrival time of the first stop of the trip shown in the second stage 2310, the schedule banner 2125 in the third stage 2315 has been updated with the next scheduled trip with the first stop's arrival that the current time of the device has not passed. In some embodiments, the commute application does not update the schedule banner 2125 and continues to display the trip in the schedule banner 2125 shown in the first and second stages 2305 and 2310.

Additionally, the commute application in this example does not update the map view with the countdown times of the next scheduled trip displayed in the schedule banner 2125. Instead, the commute application continues to display the countdown times for the trip displayed in the map view shown in the first and second stages 2305 and 2210 and updates the countdown times for that trip. Also, the commute application does not update the map to display the scheduled trip displayed in the schedule banner 2125. The commute application similarly updates the map for the trip displayed in the map in the first and second stages 2305 and 2210.

The third stage 2315 of the GUI 100 also illustrates the user selecting the UI item 1755 to return to the page of the GUI 100 displaying the saved routes stored on the device (e.g., the page illustrated in the first, second, and third stages 1705-1715 of FIG. 17). In this example, the user is selecting the UI item 1755 by using a finger to tap the UI item 1755 displayed on the touchscreen in order to displaying the saved routes stored on the device. When the commute application of some embodiments receives the selection of the UI item 1755, the commute application transitions to displaying a page that displays the saved routes stored on the device.

The fourth stage 2320 shows the GUI 100 after the user selected the UI item 1755 in order to view a page that displays the saved routes stored on the device. As shown in the fourth stage 2320, information regarding the saved routes stores on the device is displayed. In this example, the saved route illustrated in the stages 2305-2315 is the only saved route stored on the device. The fourth stage 2320 also shows the user selecting the saved route to view the map view for the saved route. The user in this example is selecting the saved route by using a finger to tap the saved route displayed on the touchscreen in order to display the map view for the saved route. When the commute application of some embodiments receives the selection the saved route, the commute application transitions to displaying the map view for the saved route.

The fifth stage 2325 shows the GUI 100 after the user selected the saved route to view the map view for the saved route. As explained above, in some embodiments, the commute application only updates the map and countdown times in the map view with the next scheduled trip when the commute application initially enters the map view. In this example, the commute application is entering the map view for the saved route. As such, the map view in the fifth stage 2325 displays the countdown times of the next scheduled trip (i.e., the trip displayed in the schedule banner 2125 in the third stage 2315) and displays the next scheduled trip in the map.

Figure 24:
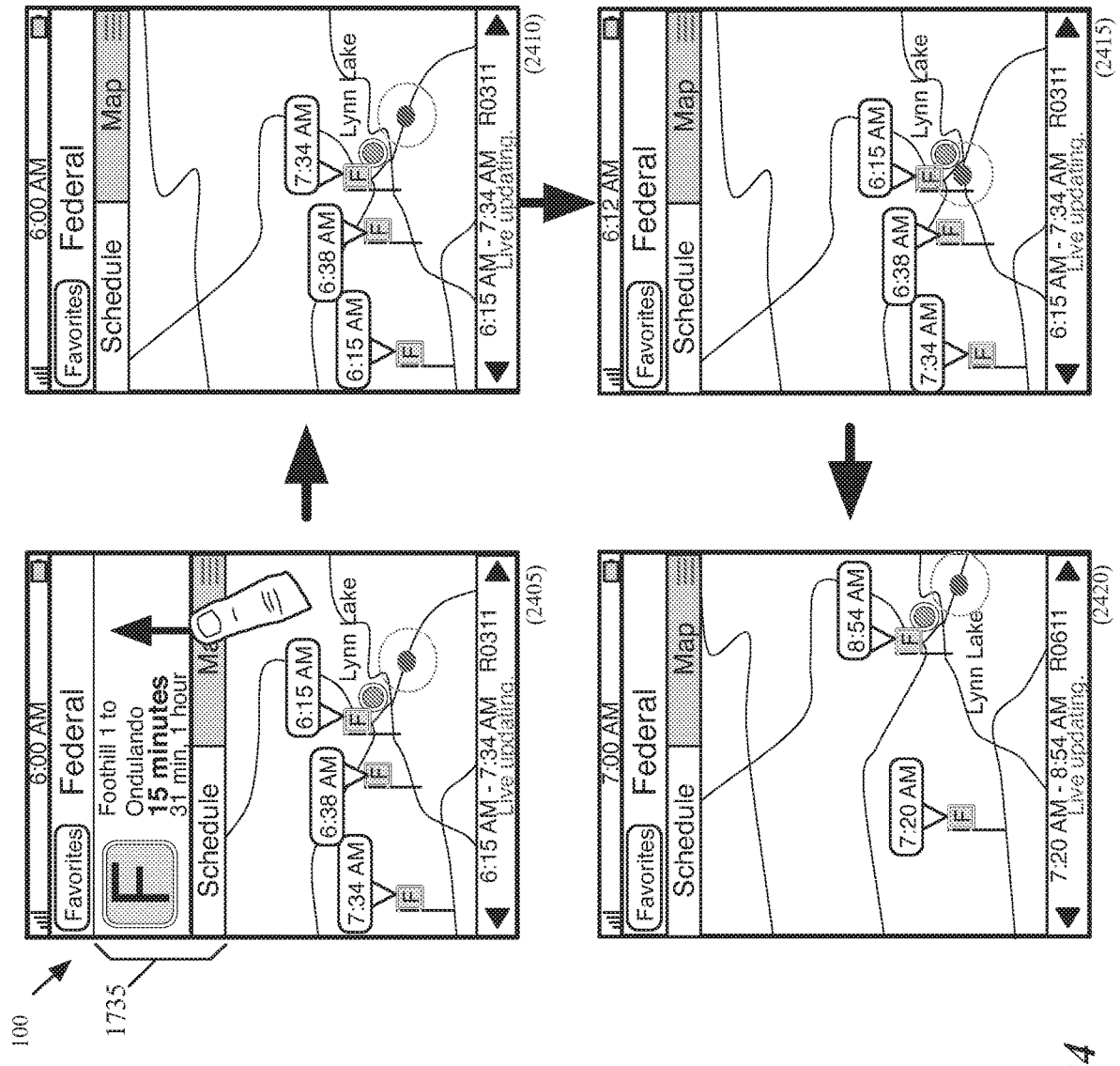
FIG. 24 conceptually illustrates the commute application of some embodiments displaying details of a trip in a map view for a saved route.

FIG. 24 conceptually illustrates the commute application of some embodiments displaying details of a trip in a map view for a saved route. In particular, FIG. 24 illustrates the GUI 100 of the commute application at four different stages 2405-2420 of displaying details of stops in a trip along a saved route.

The first stage 2405 is similar to the first stage 2305 described above by reference to FIG. 23 except the first stage 2405 of FIG. 24 illustrates the map in the map view displaying additional information regarding the trip along the saved route. As shown, the map in the first stage 2405 is displaying a banner above each of the flags that represent the stops in the trip along the saved route. Each banner indicates the arrival time of a transit vehicle used for the trip along the saved route.

Additionally, the first stage 2405 of the GUI 100 illustrates a user moving the header 1735 in a map view for the saved route. As shown, the user in this example moves the header 1735 by using a finger to touch the header 1735 displayed on the touchscreen and dragging the finger along the touchscreen in an upwards direction relative to the GUI 100 to directly manipulate the header 1735 out of view. The second stage 2410 shows the GUI 100 after the user moved the header 1735 out of view. As shown, moving the header 1735 out of view allows a larger portion of the map to be displayed.

The third stage 2415 illustrates the GUI 100 after an amount of time has passed on the current time of the device with respect to the current time of the device illustrated in the second stage 2410. As shown, the current time on the device illustrated in the third stage 2415 is twelve minutes later than the current time on the device illustrated in the second stage 2410. In addition, the third stage 2415 shows that the current location of the transit vehicle is closer to the first stop in the trip.

As mentioned above, when the commute application of some embodiments detects that the current time of the device passes the arrival time of the first stop of the trip displayed in the map view, the commute application automatically transitions to displaying the next trip scheduled to run. The fourth stage 2420 of FIG. 24 illustrates another example of such an automatic change of the trip displayed in the map view. The fourth stage 2420 shows that the current time of the device has passed the arrival time of the first stop of the trip shown in the third stage 2415. When the commute application detects that the current time of the device has passed the arrival time of the first stop of the trip shown in the third stage 2415, the commute application of some embodiments automatically changes the trip displayed in the map to the next scheduled trip with the first stop's arrival time that the current time of the device has not passed. As shown in the fourth stage 2420, the map is displaying a scheduled trip with the first stop's arrival time that the current time of the device has not passed.

Figure 25:
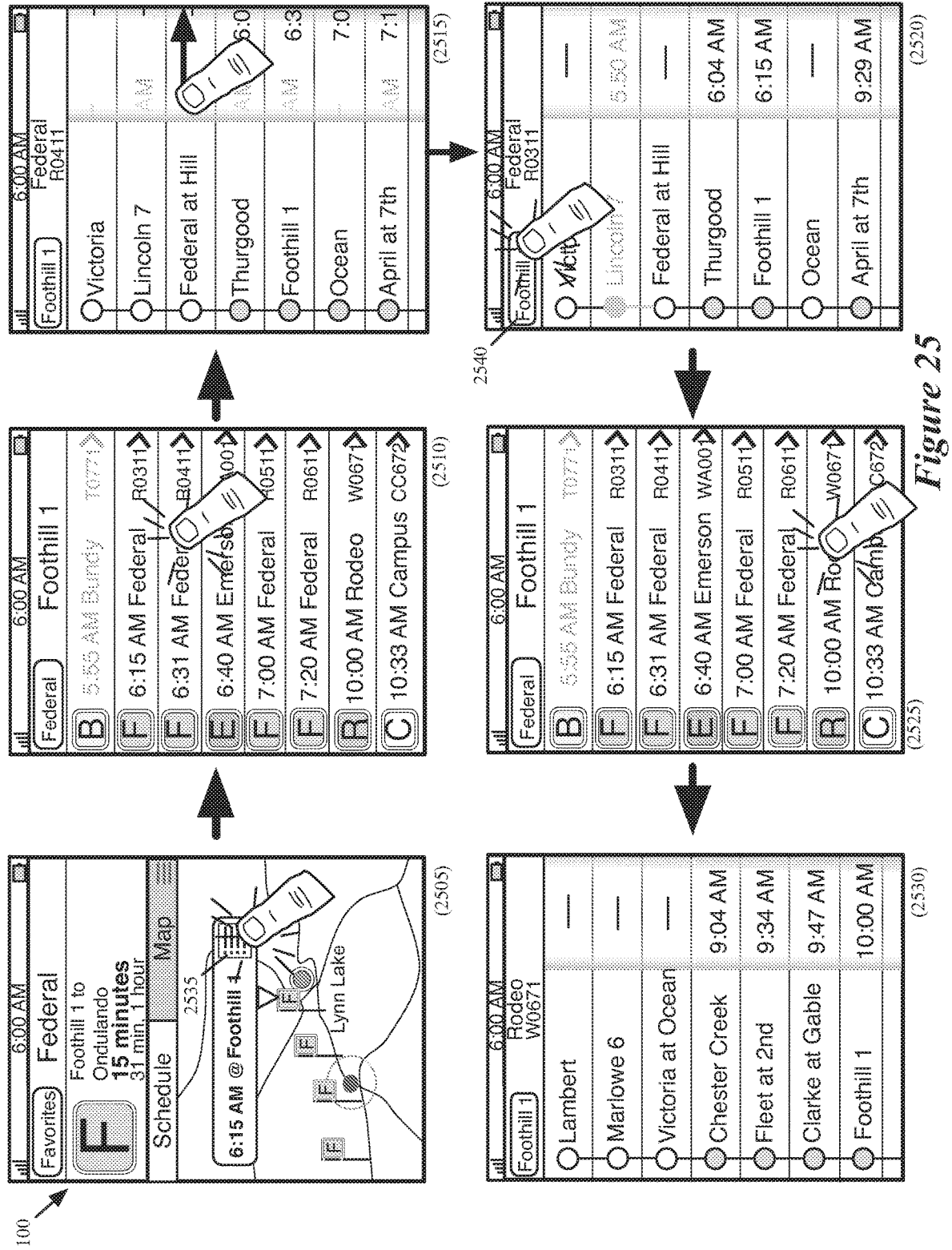
FIG. 25 conceptually illustrates the commute application of some embodiments that provides a feature for viewing different trips along different routes that stop at a particular stop.

FIG. 25 conceptually illustrates the commute application of some embodiments that provides a feature for viewing different trips along different routes that stop at a particular stop. Specifically, FIG. 25 illustrates the GUI 100 of the commute application at six different stages 2505-2530 of displaying different trips along different routes that stop at a particular stop.

The first stage 2505 is similar to the first stage 2305 described above by reference to FIG. 23 except the first stage 2505 of FIG. 25 illustrates the map in the map view displaying additional information regarding a stop in the trip along the saved route. As shown, the map in the first stage 2505 is displaying a banner above the Foothill 1 stop that shows the name of the stop and the arrival time of a transit vehicle used for the trip along the saved route. The banner also includes a selectable UI item 2535 for displaying different trips along different routes that stop at the Foothill I stop. In some embodiments, the banner is displayed when the user selects in the map the flag that represents the Foothill 1 stop (e.g., by tapping on the flag that represents the Foothill 1 stop in the map). In addition, the first stage 2505 of the GUI 100 illustrates a user selecting the UI item 2535 by using a finger to tap on the UI item 2535 displayed on the touchscreen in order to view different trips along different routes that stop at the Foothill 1 stop.

The second stage 2510 shows the GUI 100 after the user selected the UI item 2535. As shown, the GUI 100 in this example is displaying a list of trips along different routes that stop at the Foothill 1 stop. In this example, the times displayed for each trip is the time at which the trip stops at the Foothill 1 stop. Also, the T0771 trip displayed in the list is grayed out because the current time of the device is past the scheduled arrival time at the Foothill 1 stop in the T0771 trip. The second stage 2510 also shows the user selecting a trip R0411 that travels along the Federal route by using a finger to tap on the trip R0411 displayed on the touchscreen to view the schedule for the R0411 trip.

The third stage 2515 illustrates the GUI 100 after the user selected the R0411 trip. As illustrated, the GUI 100 is displaying the dynamic focus table that includes the schedule of the stops in the R0411 trip, which includes the Foothill 1 stop, along the Federal route. The third stage 2515 also shows the user performing a scroll operation on the dynamic focus table in order to view the schedule for a different trip listed in the second stage 2510. As shown in this example, the user is performing the scroll operation by using a finger to touch a location in the dynamic focus table displayed on the touchscreen and dragging the finger along the touchscreen in a rightwards direction relative to the GUI 100 in order to view the schedule for a trip along a route that is scheduled to stop at the Foothill 1 stop before the R0411 trip is scheduled to stop at the Foothill 1 stop.

The fourth stage 2520 illustrates the GUI 100 after the user performed the scrolling operation on the dynamic focus table. In the fourth stage 2520, the dynamic focus table is displaying the schedule for the R0311 trip along the Federal route, which is the trip that is scheduled to stop at the Foothill 1 stop before the R0411 trip is scheduled to stop at the Foothill 1 stop. In addition, the Lincoln stop in the R0311 trip is grayed out because the current time of the device is past the scheduled arrival time at the Lincoln stop in the R0311 trip.

The fourth stage 2520 also shows the user selecting a selectable UI item 2540 for transitioning back to the page of the GUI 100 illustrated in the second stager 2510. For this example, the user selects the UI item 2540 by using a finger to tap on the UI item 2540 displayed on the touchscreen in order to view different trips along different routes that stop at the Foothill 1 stop.

The fifth stage 2525 illustrates the GUI 100 after the user selected the UI item 2540. As shown, the fifth stage 2525 is similar to the second stage 2510 except in the fifth stage 2525 the user is selecting the W0671 trip along the Rodeo route by using a finger to tap on the W0671 trip displayed on the touchscreen to view the schedule for the W0671 trip.

Finally, the sixth stage 2530 shows the GUI 100 after the user selected the W0671 trip. The GUI 100 in the sixth stage 2530 is similar to the GUI 100 illustrated in the third stage 2515 except that here the dynamic focus table is displaying the schedule of the stops in the W0671 trip, which includes the Foothill I stop, along the Rodeo route.

FIG. 25 illustrates a feature of the map view of some embodiments that allows a user to select a particular stop and view different trips along different routes that stop at the particular stop. In other words, the feature allows the user to pivot through different trips along different routes that stop at the particular stop. In addition, FIG. 25 illustrates a user using the dynamic focus table to pivot through the schedules of different trips along different routes that stop at a particular stop. In some embodiments, the commute application does not allow a user to pivot through the schedules of different trips along different routes that stop at a particular stop. Rather, when the user is at the stage of the GUI 100 shown in the third and sixth stages 2515 and 2530, the commute application allows the user to scroll through the schedules for different trips along the route for which the schedule of the trip is currently displayed. For instance, in some such embodiments, the commute application allows the user in the third stage 2515 to scroll through the schedules for different trips along the Federal route.

Figure 26:
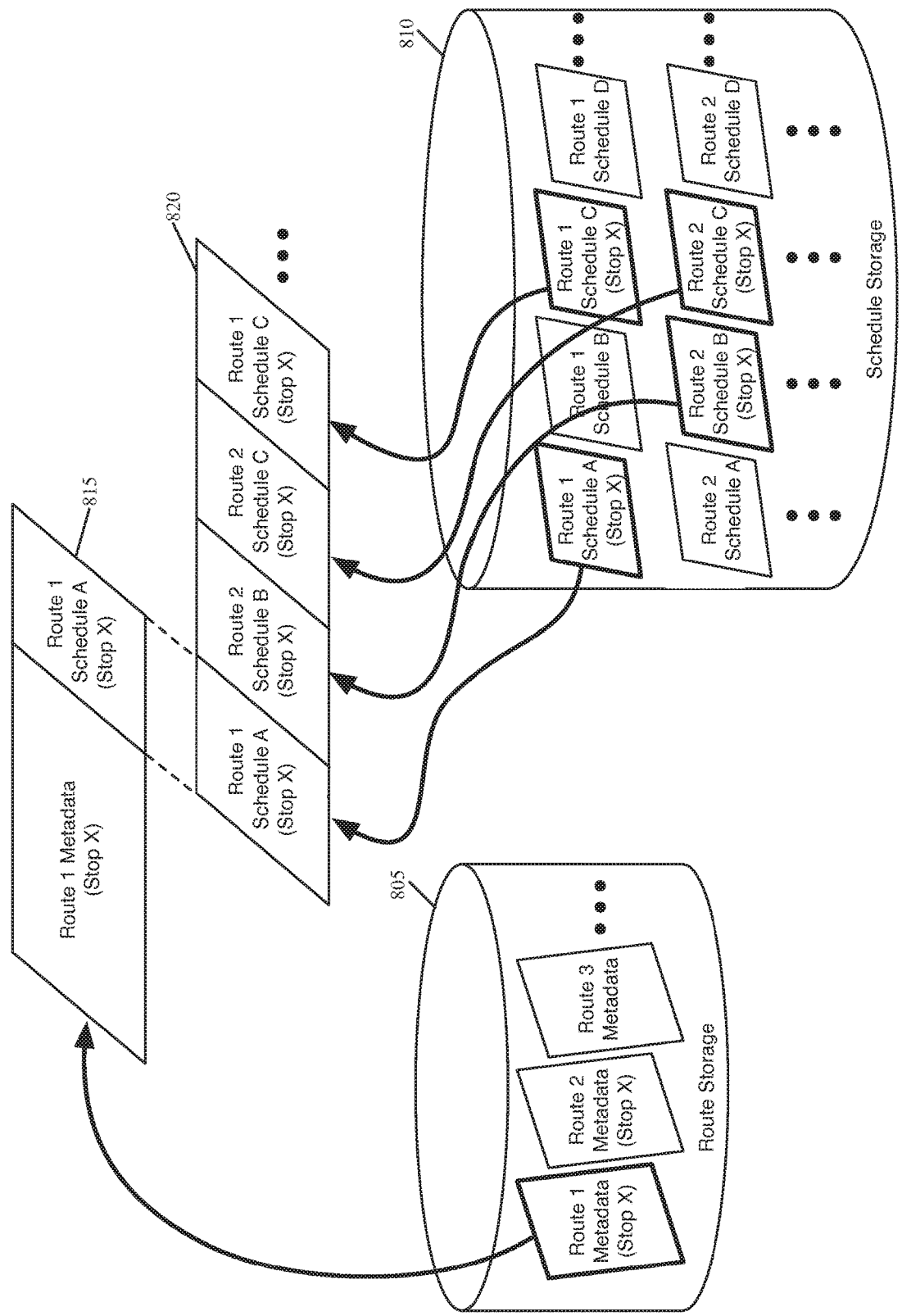
FIG. 26 conceptually illustrates an example of identifying data for the dynamic focus table of some embodiments for pivoting through trips along different routes that stop at a particular stop based on the data illustrated in FIG. 8.

FIG. 26 conceptually illustrates an example of identifying data for the dynamic focus table of some embodiments for pivoting through trips along different routes that stop at a particular stop based on the data illustrated in FIG. 8.

In some embodiments, when the commute application receives a selection of a stop through which to pivot trips along routes that stop at the selected stop (e.g., the examples described above and below by reference to FIGS. 25 and 28), the commute application accesses the route storage 805 to identify routes that include the selected stop and accesses the schedule storage 810 to identify the schedules for trips along the identified routes that stop at the selected stop.

FIG. 26 shows the routes in the route storage 805 that the commute application has identified as including the selected stop, Stop X As shown, for this example, Route 1 and Route 2 include Stop X and Route 2 does not include Stop X. In addition, FIG. 26 illustrates schedules for trips in the schedule storage 810 that the commute application has identified as stopping at Stop X As illustrated, while a route may include a particular stop, a trip along the route may or may not stop at the particular stop. FIG. 26 shows that the following schedules stop at Stop X: Schedule A for Route 1, Schedule B for Route 2, Schedule C for Route 2, and Schedule C for Route 1.

Once the commute application of some embodiments identifies the schedules for trips that stop at the selected stop, the commute application generates and/or populates the panel 820 of the dynamic focus table with the identified schedules, as illustrated in FIG. 26. The commute application also populates and/or generates the panel 815 with the metadata of the route that is used for the schedule of the trip in the panel 820 which is being displayed through the right side of the panel 815. In this example, the Schedule A for a trip along Route 1 in the panel 820 is displayed through the right side of the panel 815 and, thus, the metadata for Route 1 is displayed on the left side of the panel 815.

Figure 27:
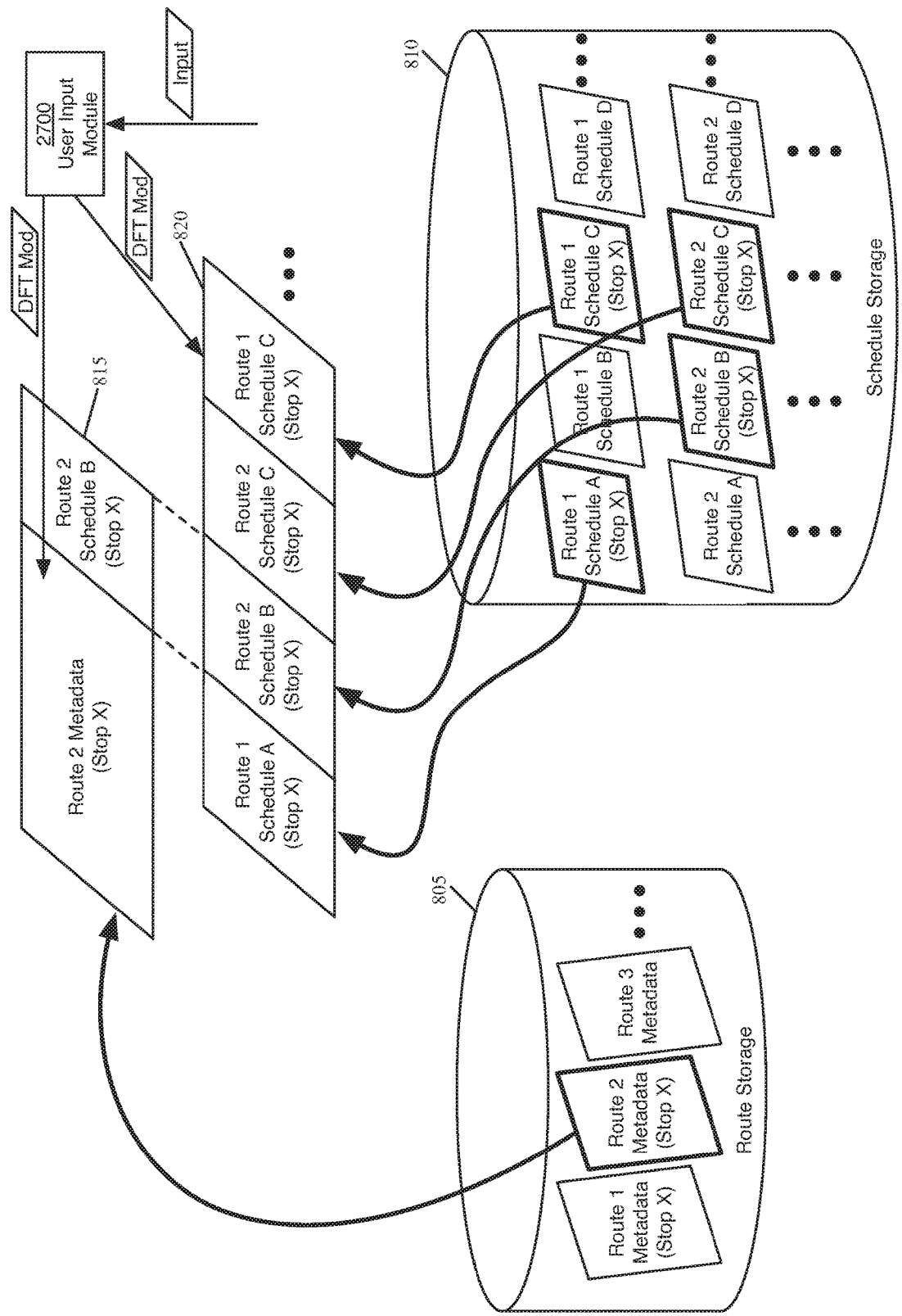
FIG. 27 conceptually illustrates an example of identifying data for the dynamic focus table of some embodiments for pivoting through trips along different routes that stop at a particular stop based on the data illustrated in FIG. 8.

FIG. 27 conceptually illustrates an example of identifying data for the dynamic focus table of some embodiments for pivoting through trips along different routes that stop at a particular stop based on the data illustrated in FIG. 8. In particular, FIG. 27 continues with the example described above by reference to FIG. 26. FIG. 27 illustrates a user input module 2700 of the commute application of some embodiments that modifies the dynamic focus table based on received user input. In some embodiments, when the user input module 2700 receives input for modifying the dynamic focus table, the user input module 2700 (1) modifies the panel 820 so that the appropriate schedule is displayed through the right side of the panel 815 and (2) updates the metadata that is displayed on the left side of the panel 815. In this example, the panel 820 of the dynamic focus table has moved to the right to display Schedule B for a trip along Route 2 in response to input to scroll the dynamic focus table (e.g., the input described above by reference to FIG. 25). As such, the commute application in this example displays in the panel 815 the metadata for Route 2 and displays it on the left side of the panel 815.

Figure 28:
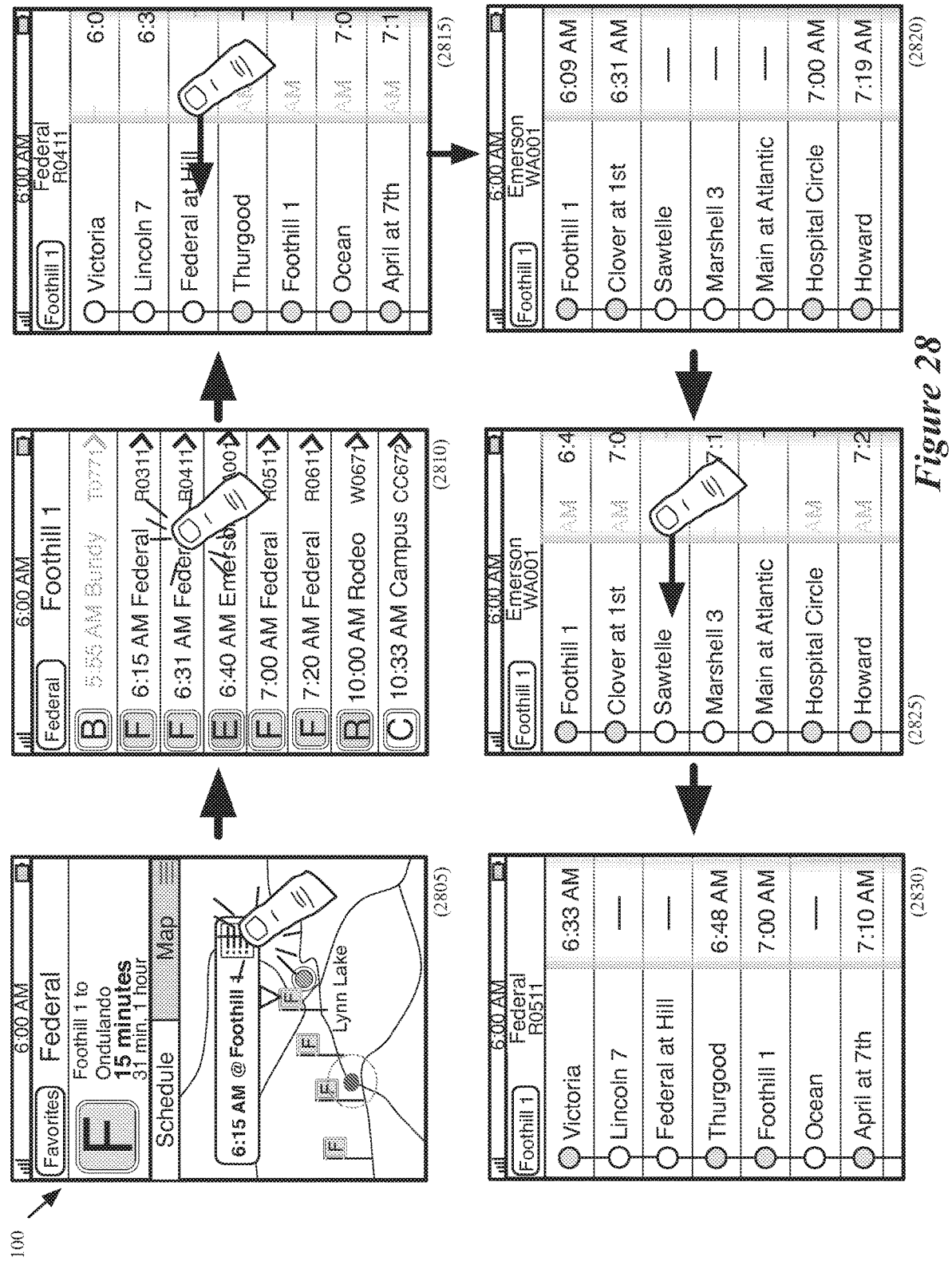
FIG. 28 conceptually illustrates the commute application of some embodiments that provides a feature for viewing different trips along different routes that stop at a particular stop.

FIG. 28 conceptually illustrates the commute application of some embodiments that provides a feature for viewing different trips along different routes that stop at a particular stop. Specifically, FIG. 28 illustrates the GUI 100 of the commute application at six different stages 2805-2830 of displaying different trips along different routes that stop at a particular stop.

The first and second stages 2805 and 2810 are the same as the first and second stages 2505 and 2510 described above by reference to FIG. 25. The third stage 2815 is similar to the third stage 2515 described above by reference to FIG. 25 but the third stage 2815 of FIG. 28 illustrates the user performing a scroll operation on the dynamic focus table in order to view the schedule for a different trip listed in the second stage 2810. The user in this example is performing the scroll operation by using a finger to touch a location in the dynamic focus table displayed on the touchscreen and dragging the finger along the touchscreen in a leftwards direction relative to the GUI 100 in order to view the schedule for a trip along a route that is scheduled to stop at the Foothill 1 stop after the R0411 trip is scheduled to stop at the Foothill 1 stop.

The fourth stage 2820 illustrates the GUI 100 after the user performed the scrolling operation on the dynamic focus table. The fourth stage 2820 shows the dynamic focus table displaying the schedule for the WA00 1 trip along a route (the Emerson route in this example) that is different than the route illustrated in the third stage 2815. As shown, the WA00 1 trip is scheduled to stop at the Foothill 1 stop after the R0411 trip is scheduled to stop at the Foothill 1 stop.

The fifth stage 2825 shows the user performing a scroll operation on the dynamic focus table in order to view the schedule for a different trip listed in the second stage 2810. For this example, the user is performing the scroll operation by using a finger to touch a location in the dynamic focus table displayed on the touchscreen and dragging the finger along the touchscreen in a leftwards direction relative to the GUI 100 in order to view the schedule for a trip along a route that is scheduled to stop at the Foothill 1 stop after the WA00I trip is scheduled to stop at the Foothill I stop.

The sixth stage 2830 illustrates the GUI 100 after the user performed the scrolling operation on the dynamic focus table in the fifth stage 2825. In the sixth stage 2830, the dynamic focus table is displaying the schedule for the R0501 trip along the Federal route, which is the trip that is scheduled to stop at the Foothill 1 stop after the WA001 trip is scheduled to stop at the Foothill 1 stop.

Figure 29:
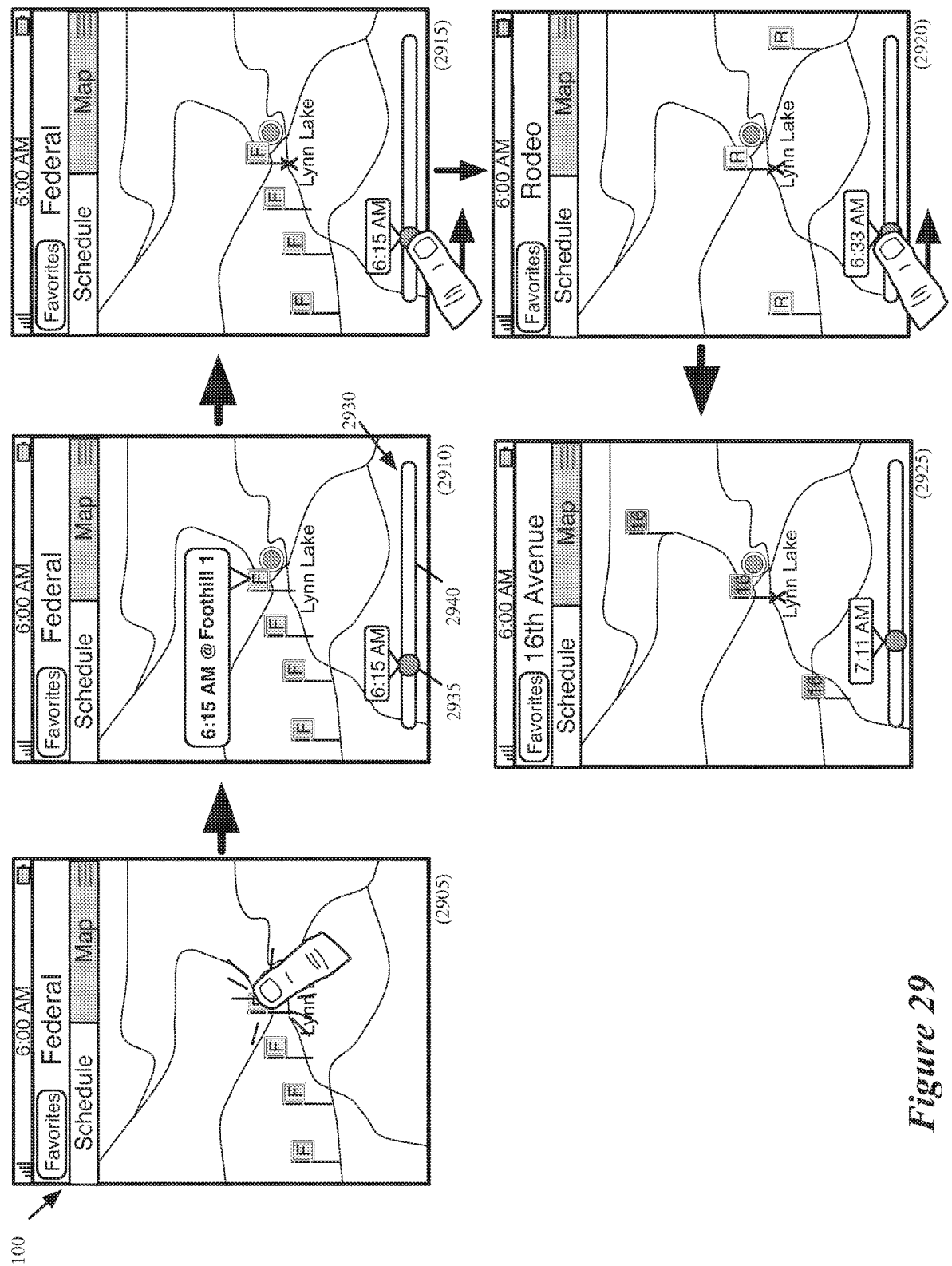
FIG. 29 conceptually illustrates the commute application of some embodiments that provides a feature for viewing different trips along different routes that stop at a particular stop.

FIG. 29 conceptually illustrates the commute application of some embodiments that provides a feature for viewing different trips along different routes that stop at a particular stop. In particular, FIG. 29 illustrates the GUI 100 of the commute application at five different stages 2905-2925 of displaying different trips along different routes that stop at a particular stop.

The first stage 2905 is similar to the first stage 2205 described above by reference to FIG. 22 except the first stage 2905 of FIG. 29 does not include the schedule banner 2125, the header 1735 has been moved out of view, and the map does not show the current location of the transit vehicle used for traveling along the trip displayed in the map view. The first stage 2905 also illustrates a user selecting a flag in the map that represents a stop in a trip along a saved route. For this example, the user is selecting the flag by using a finger to tap on the flag displayed on the touchscreen in order to view different trips along different routes that stop at stop represented by the selected flag.

The second stage 2910 shows the GUI 100 after the user selected the flag in the map. As shown, the map in this example is displaying a banner above the selected flag that shows the arrival time at the Foothill 1 stop for a trip that is scheduled next to stop at the Foothill 1 stop. The second stage 2910 also shows an adjustable slider control 2930 displayed in the map. The adjustable slider control 2930 includes a slider 2935, a sliding region 2940 along which the slider moves, and a banner that displays the time value indicated by the position of the slider 2935 in the sliding region 2940. The positions along the sliding region 2940, from left to right, represent increasing time values in a defined range of time (e.g., 6 AM-8 PM). For this example, the commute application displays a trip that is scheduled next to stop at the Foothill 1 stop and moved the slider 2935 along the sliding region 2940 to the time value of the arrival time at the Foothill I stop for the trip, which is 6:15 AM.

The third stage 2915 illustrates the user starting to move the slider 2935 along the sliding region 2940 by using a finger to touch the slider 2935 displayed on the touchscreen and dragging the finger along the touchscreen in a rightwards direction relative to the GUI 100. In some embodiments, the commute application displays in the map the next trip that is scheduled to stop at the Foothill I at the time indicated by the slider 2935 in the sliding region 2940.

The fourth stage 2920 shows the GUI 100 after the user adjusted the slider 2935 in the sliding region 2940 to a different time value. As shown, the map in the fourth stage 2920 shows the stops for a different trip along a different route (the Rodeo route in this example) that is scheduled to stop at the Foothill 1 stop at 6:33 AM. The fourth stage 2920 also illustrates the user continuing to move the slider 2935 along the sliding region 2940 by continuing to drag the finger along the touchscreen in a rightwards direction relative to the GUI 100.

The fifth stage 2925 shows the GUI 100 after the user adjusted the slider 2935 in the sliding region 2940 to another different time value. In the fifth stage 2925, the map is displaying the stops for another different trip along another different route (the 16th Avenue route in this example) that is scheduled to stop at the Foothill 1 stop at 7:11 AM. The different time values displayed by the commute application of some embodiments are predefined scheduled times that different transit vehicles of different routes are scheduled to stop at the selected stop on the map. In other words, in some such embodiments, the time values of the slider control do not change incrementally. Rather, the application, as the slider moves along the sliding region, displays the next or previous (depending on the direction of the movement) scheduled stop of a trip that includes the selected stop.

In some other embodiments, the time values for the slider control changes incrementally as the slider moves along the sliding region. In some such embodiments, the trip with the closest scheduled stop to the value of the slider that includes the selected stop will be displayed on the map. Still, in some other embodiments, the time values of the slider control change irrespective of the schedule of the trips when the slider moves along the sliding region. In some such embodiments, as the time value changes, if there is a trip that has the slider's time value scheduled for the selected stop, that trip will be displayed by the commute application. On the other hand, if there is no trip scheduled to stop at the selected stop at the slider's time value, no trip will be displayed on the map for that particular time.

Figure 30:
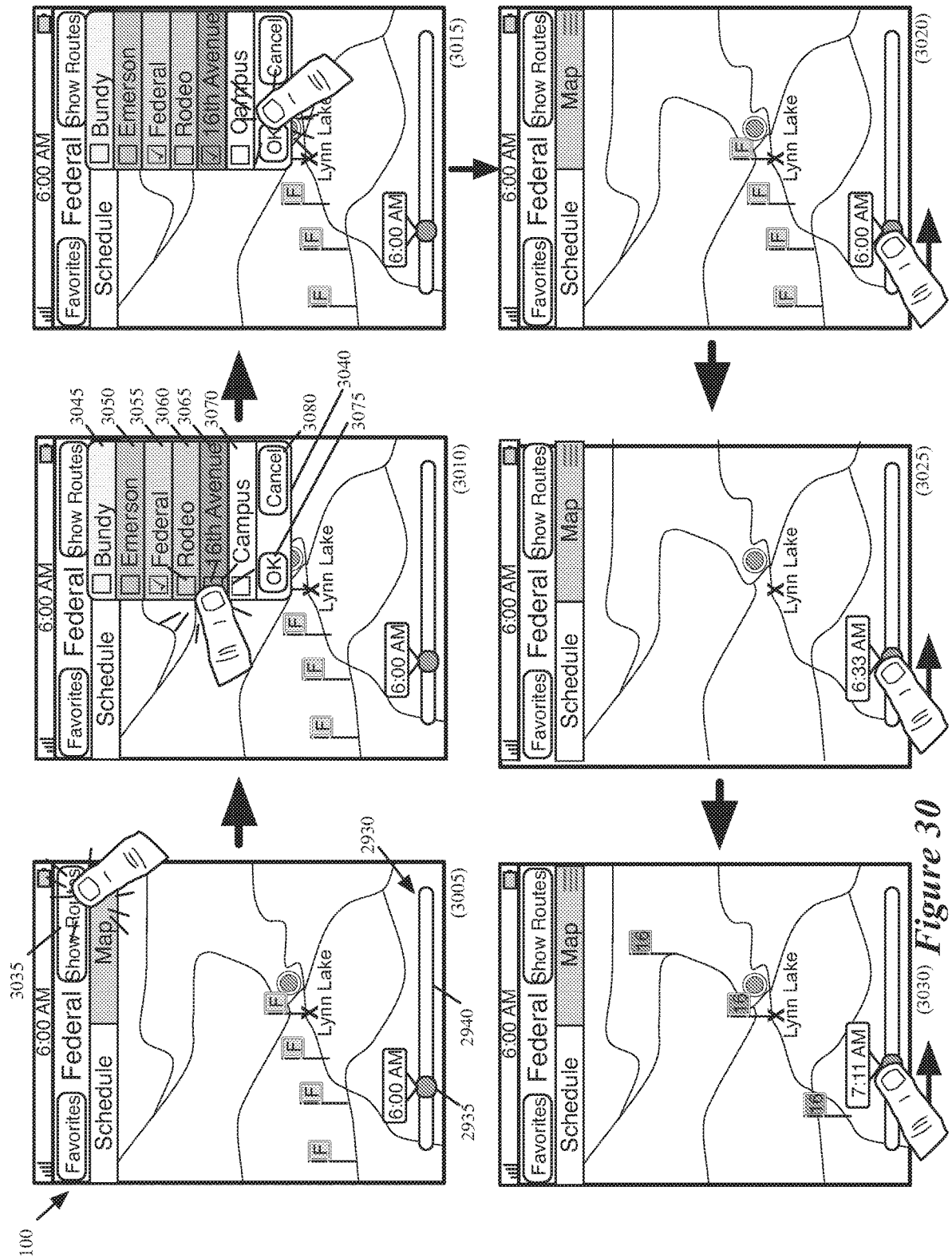
FIG. 30 conceptually illustrates the commute application of some embodiments that provides a filtering feature for viewing different trips along different routes that stop at a particular stop.

FIG. 30 conceptually illustrates the commute application of some embodiments that provides a filtering feature for viewing different trips along different routes that stop at a particular stop. In particular, FIG. 30 illustrates the GUI 100 of the commute application at six different stages 3005-3030 of displaying different trips along different routes that stop at a particular stop.

The first stage 3005 is similar to the first stage 2905 described above by reference to FIG. 29 except the first stage 3005 of FIG. 30 includes the slider control 2930 and a selectable UI item 3035 for activating a filtering feature for the map view. In addition, the first stage 3005 shows a user is selecting the UI item 3035 by using a finger to tap on the UI item 3035 displayed on the touchscreen to activate the filtering feature for the map view.

The second stage 3010 shows the GUI 100 after the user selected the UI item 3035. As illustrated, the second stage 3010 illustrates a filtering control 3040 that includes several selectable UI items 3045-3070 for selecting routes, a selectable UI item 3075 for setting a filter based on the UI items 3045-3070 that are selected, and a selectable UI item 3080 for canceling the filtering feature. In this example, the filter is for filtering trips along routes that stop at the Foothill 1 stop that is illustrated in the map of the second stage 2910 of FIG. 29. The second stage 3010 shows that the user has selected the UI item 3055 to specify the Federal route to be included in the filter. In addition, the second stage 3010 illustrates the user selecting the UI item 3065 to specify the 16th Avenue route to be included in the filter by using a finger to tap on the UI item 3065 displayed on the touchscreen.

The third stage 3015 shows the GUI 100 after the user selected the UI item 3065. In addition, the third stage 3015 illustrates the user selecting the UI item 3075 to set the filter, which includes the Federal route and the 16th Avenue route. When the filter is set, the commute application of some embodiments only displays trips along routes that stop at the Foothill 1 stop and that are included in the filter (the Federal route and the 16th Avenue route in this example).

Next, the fourth stage 3020 shows the GUI 100 after the user selected the UI item 3075 to set the filter. As shown, the map in fourth stage 3020 still shows the trip illustrated in the stages 3005-3015 since the Federal route is included in the filter and the trip stops at the Foothill 1 stop. The fourth stage 3020 also illustrates the user starting to move the slider 2935 along the sliding region 2940 by using a finger to touch the slider 2935 displayed on the touchscreen and dragging the finger along the touchscreen in a rightwards direction relative to the GUI 100.

The fifth stage 3025 shows the GUI 100 after the user adjusted the slider 2935 in the sliding region 2940 to a different time value. As illustrated, the map in the fifth stage 3025 does not show a trip because for this example no trip along a route is scheduled to stop at the Foothill 1 stop at 6:33 AM. Additionally, the fifth stage 3025 illustrates the user continuing to move the slider 2935 along the sliding region 2940 by continuing to drag the finger along the touchscreen in a rightwards direction relative to the GUI 100.

The sixth stage 3030 shows the GUI 100 after the user adjusted the slider 2935 in the sliding region 2940 to another different time value. The sixth stage 3030 illustrates the map displaying the stops for a trip along the 16th Avenue route, which is included in the filter in this example, that is scheduled to stop at the Foothill I stop at 7:11 AM.

Figure 31:
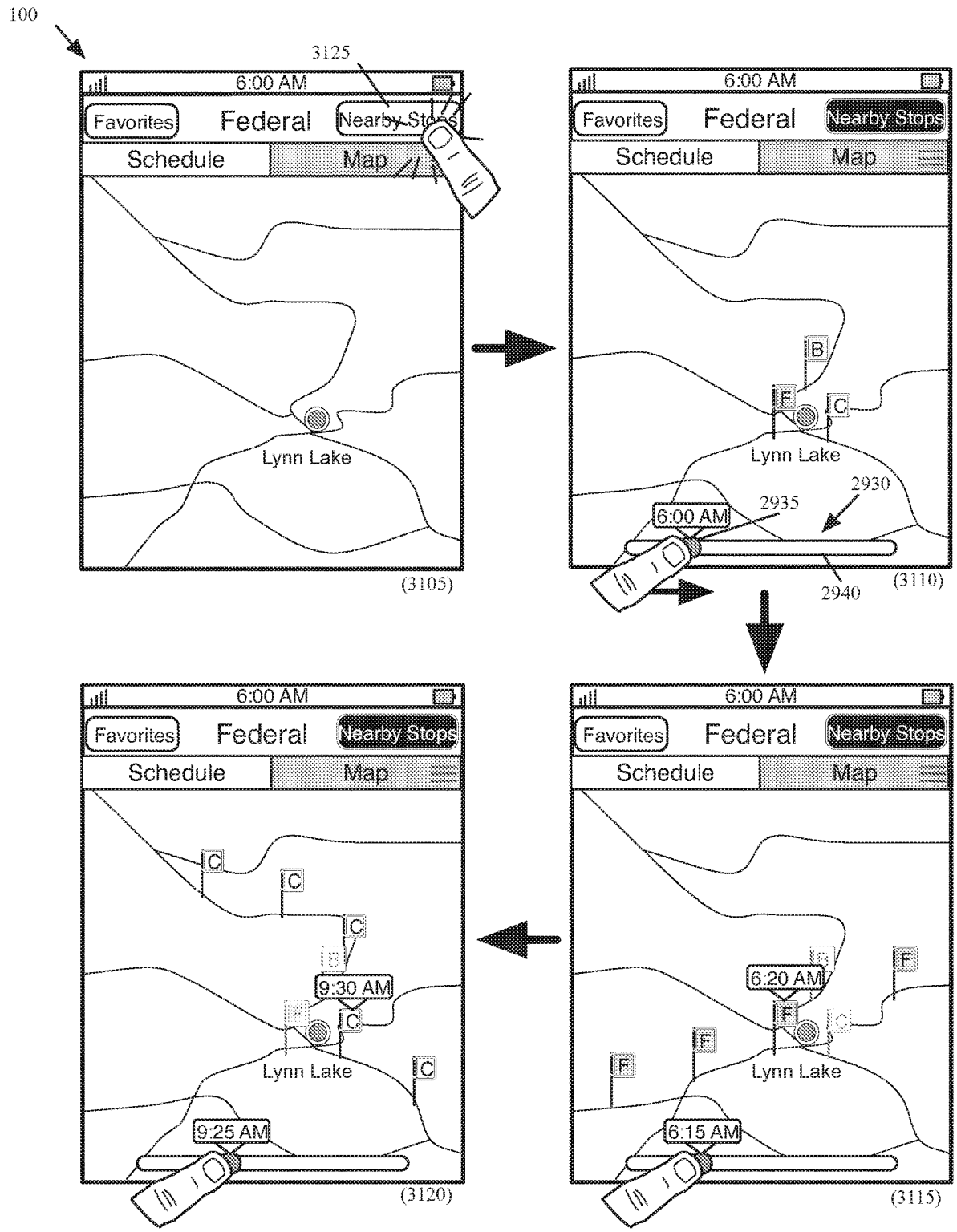
FIG. 31 conceptually illustrates the commute application of some embodiments that provides a feature for viewing in a map trips along routes that stop near the location of the device on which the commute application is operating.

FIG. 31 conceptually illustrates the commute application of some embodiments that provides a feature for viewing in a map trips along routes that stop near the location of the device on which the commute application is operating. In particular, FIG. 31 illustrates the GUI 100 of the commute application at four different stages 3105-3120 of displaying different trips along different routes that stop at a stop near the location of the device.

The first stage 3105 is similar to the first stage 2905 described above by reference to FIG. 29 except the first stage 3105 of FIG. 31 includes a selectable UI item 3125 for displaying stops in the map that are near the location of the device. As shown, the map in the first stag 3105 is not showing a trip. The first stage 3105 also shows a user is selecting the UI item 3125 by using a finger to tap on the UI item 3125 displayed on the touchscreen to displaying stops in the map that are near the location of the device.

The second stage 3110 shows the GUI 100 after the user selected the UI item 3125. As shown, the map in the second stage 3110 is displaying three stops that the commute application determined are close to the current location of the device, which is represented by a dot in the map. Additionally, the second stage 3110 illustrates the user starting to move the slider 2935 along the sliding region 2940 by using a finger to touch the slider 2935 displayed on the touchscreen and dragging the finger along the touchscreen in a rightwards direction relative to the GUI 100.

The third stage 3115 shows the GUI 100 after the user adjusted the slider 2935 in the sliding region 2940 to a different time value. As shown, the map in the third stage 3115 is displaying the stops for a trip along a route that is next scheduled to stop at one of the stops shown in the map in the second stage 3110 at or after 6:15 AM. The map also is displaying a banner over the stop that is close to the location of the device and is included in the trip, indicating the arrival time at that near stop. In addition, the third stage 3115 illustrates the user continuing to move the slider 2935 along the sliding region 2940 by continuing to drag the finger along the touchscreen in a rightwards direction relative to the GUI 100.

The fourth stage 3120 shows the GUI 100 after the user adjusted the slider 2935 in the sliding region 2940 to another different time value. As illustrated, the map in the third stage 3115 shows the stops for a trip along a route that is next scheduled to stop at another one of the stops shown in the map in the second stage 3110 at or after 9:25 AM. In the fourth stage 3120, the map is also displaying a banner over the stop that is close to the location of the device and is included in the trip, indicating the arrival time at that near stop.

As described above, FIG. 30 illustrates a feature of the map view of some embodiments that allows a user to view different trips along different routes that stop at any stop that the commute application determines as being close to the location of the device. That is, the feature allows the user to pivot through different trips along different routes that stop at one of the stops that are near the location of the device.

Figure 32:
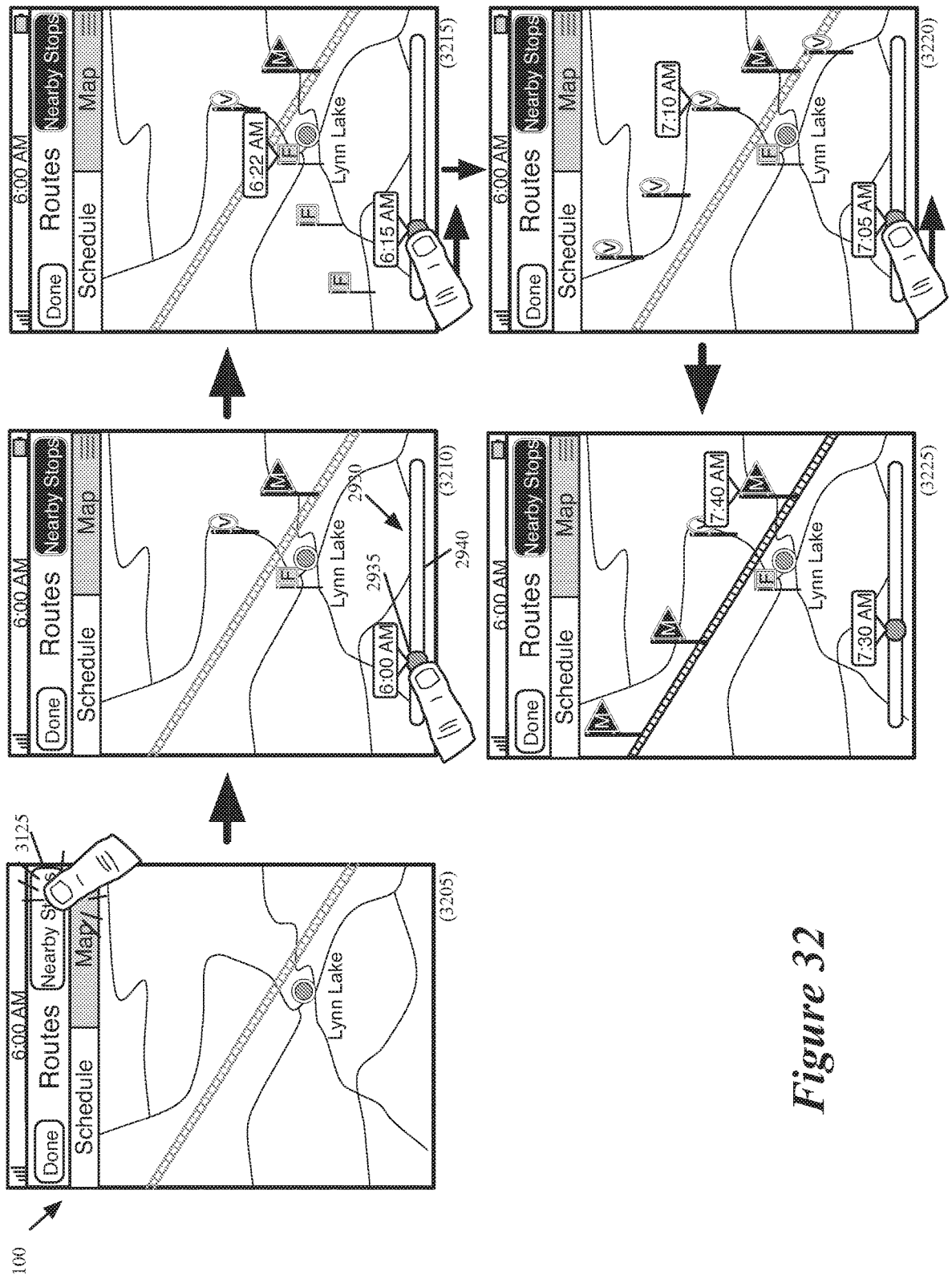
FIG. 32 conceptually illustrates the commute application of some embodiments that provides a feature for viewing different trips along different routes of different transit systems that stop near the location of the device on which the commute application is operating.

FIG. 32 conceptually illustrates the commute application of some embodiments that provides a feature for viewing different trips along different routes of different transit systems that stop near the location of the device on which the commute application is operating. Specifically, FIG. 32 illustrates the GUI 100 of the commute application at five different stages 3205-3225 of displaying different trips along different routes of different transit systems that stop at a stop near the location of the device.

The first stage 3205 is similar to the first stage 3105 described above by reference to FIG. 31 except the map in the first stage 3205 of FIG. 32 shows tracks for a railway transit system. For this example, the user in the first stage 3205 is selecting the UI item 3125 by using a finger to tap on the UI item 3125 displayed on the touchscreen to display stops in the map that are near the location of the device.

The second stage 3210 shows the GUI 100 after the user selected the UI item 3125. As shown, the map in the second stage 3210 is displaying three stops that the commute application determined are close to the current location of the device which is represented by a dot in the map. For this example, the three near stops are part of three different transit systems, as indicated by different icons that represent the stops, that each operates using different modes of transit. Additionally, the second stage 3210 illustrates the user starting to move the slider 2935 along the sliding region 2940 by using a finger to touch the slider 2935 displayed on the touchscreen and dragging the finger along the touchscreen in a rightwards direction relative to the GUI 100.

The third stage 3215 shows the GUI 100 after the user adjusted the slider 2935 in the sliding region 2940 to a different time value. As illustrated, the map in the third stage 3215 is displaying the stops for a trip along a route that is next scheduled to stop at one of the stops shown in the map in the second stage 3210 at or after 6:15 AM. In this example, the trip is along a route that is part of a bus transit system. The map also is displaying a banner over the stop that is close to the location of the device and is included in the trip, indicating the arrival time at that near stop. In addition, the third stage 3215 illustrates the user continuing to move the slider 2935 along the sliding region 2940 by continuing to drag the finger along the touchscreen in a rightwards direction relative to the GUI 100.

The fourth stage 3220 shows the GUI 100 after the user adjusted the slider 2935 in the sliding region 2940 to another different time value. As illustrated, the map in the fourth stage 3220 shows the stops for a trip along a route that is next scheduled to stop at another one of the stops shown in the map in the second stage 3210 at or after 7:05 AM. The trip in this example is along a route that is part of a subway transit system. In the fourth stage 3220, the map is also displaying a banner over the stop that is close to the location of the device and is included in the trip, indicating the arrival time at that near stop. Additionally, the fourth stage 3220 illustrates the user continuing to move the slider 2935 along the sliding region 2940 by continuing to drag the finger along the touchscreen in a rightwards direction relative to the GUI 100.

The fifth stage 3225 shows the GUI 100 after the user adjusted the slider 2935 in the sliding region 2940 to another different time value. The map in the fifth stage 3225 is displaying the stops for a trip along a route that is next scheduled to stop at yet another one of the stops shown in the map in the second stage 3210 at or after 7:30 AM. For this example, the trip is along a route that is part of a railway transit system. In the fourth stage 3225, the map is also displaying a banner over the stop that is close to the location of the device and is included in the trip, indicating the arrival time at that near stop.

The above-described FIG. 32 illustrates a feature of the map view of some embodiments that allows a user to view different trips along different routes that stop at any stop that the commute application determines is close to the location of the device. That is, the feature allows the user to pivot through different trips along different routes of different transit systems that stop at one of the stops that are near the location of the device.

Figure 33:
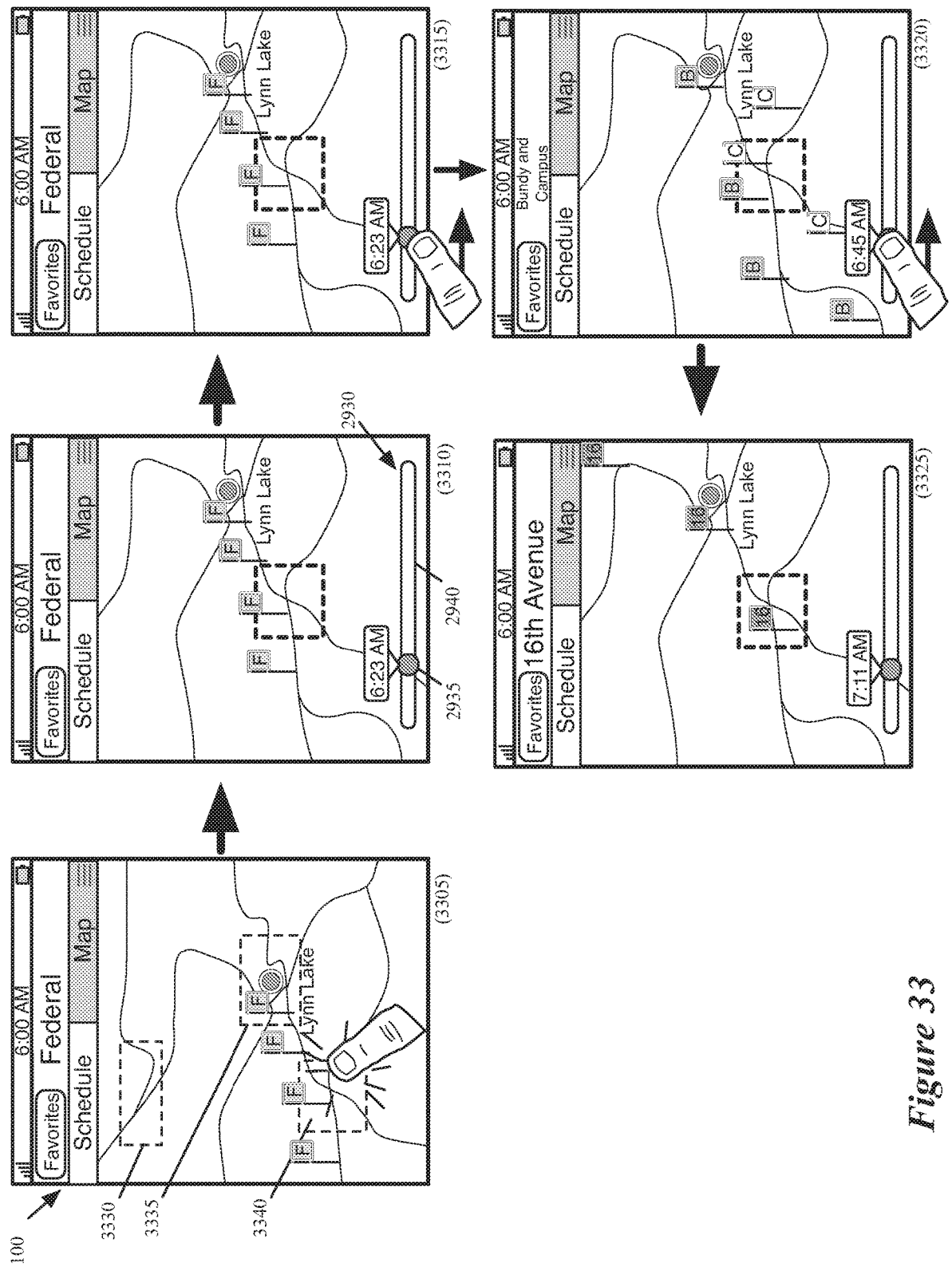
FIG. 33 conceptually illustrates the commute application of some embodiments that provides a feature for viewing different trips along different routes that stop within a predefined region.
Figure 34:
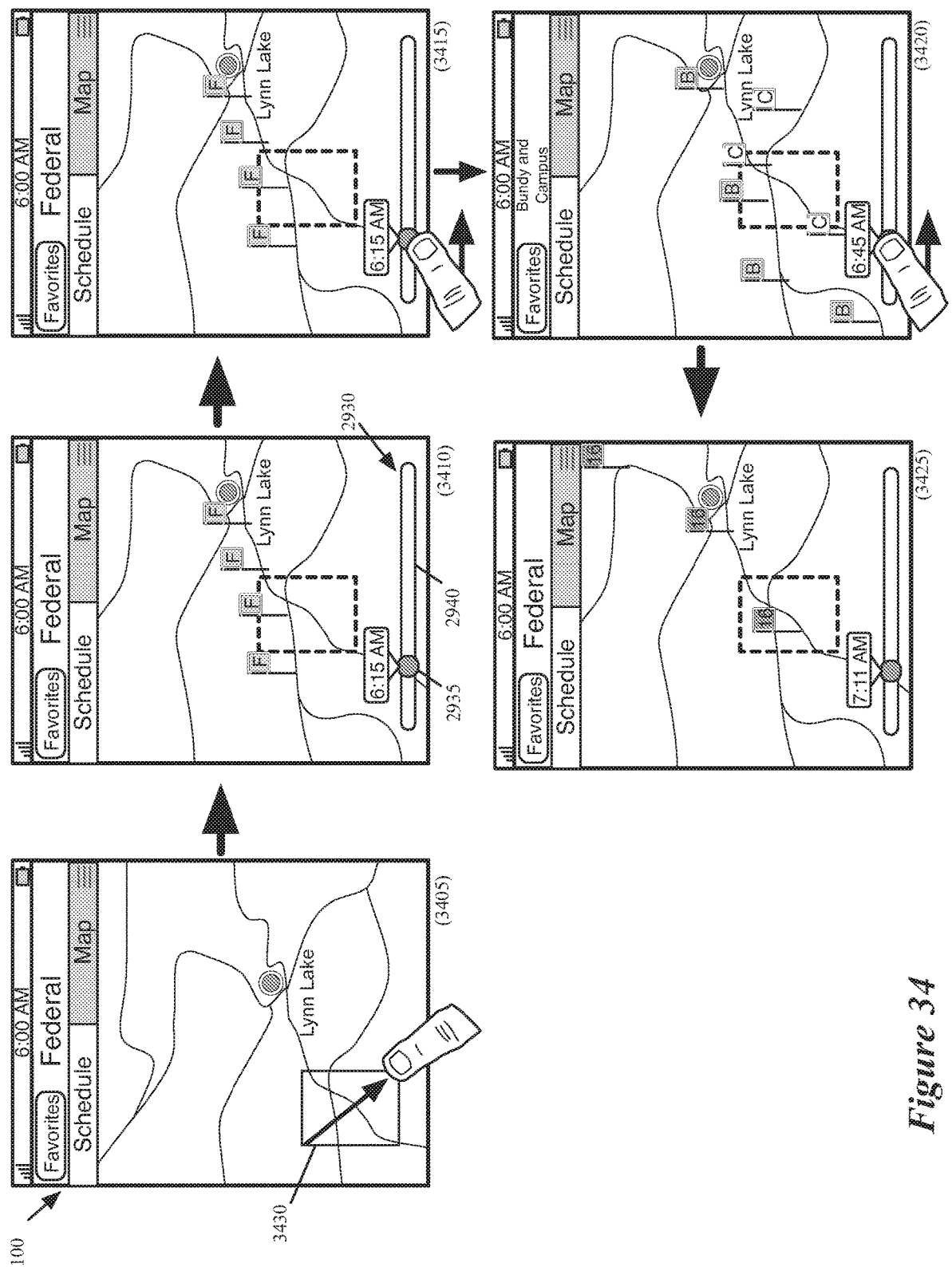
FIG. 34 conceptually illustrates the commute application of some embodiments that provides a feature for viewing different trips along different routes that stop within a user-specified region.
Figure 35:
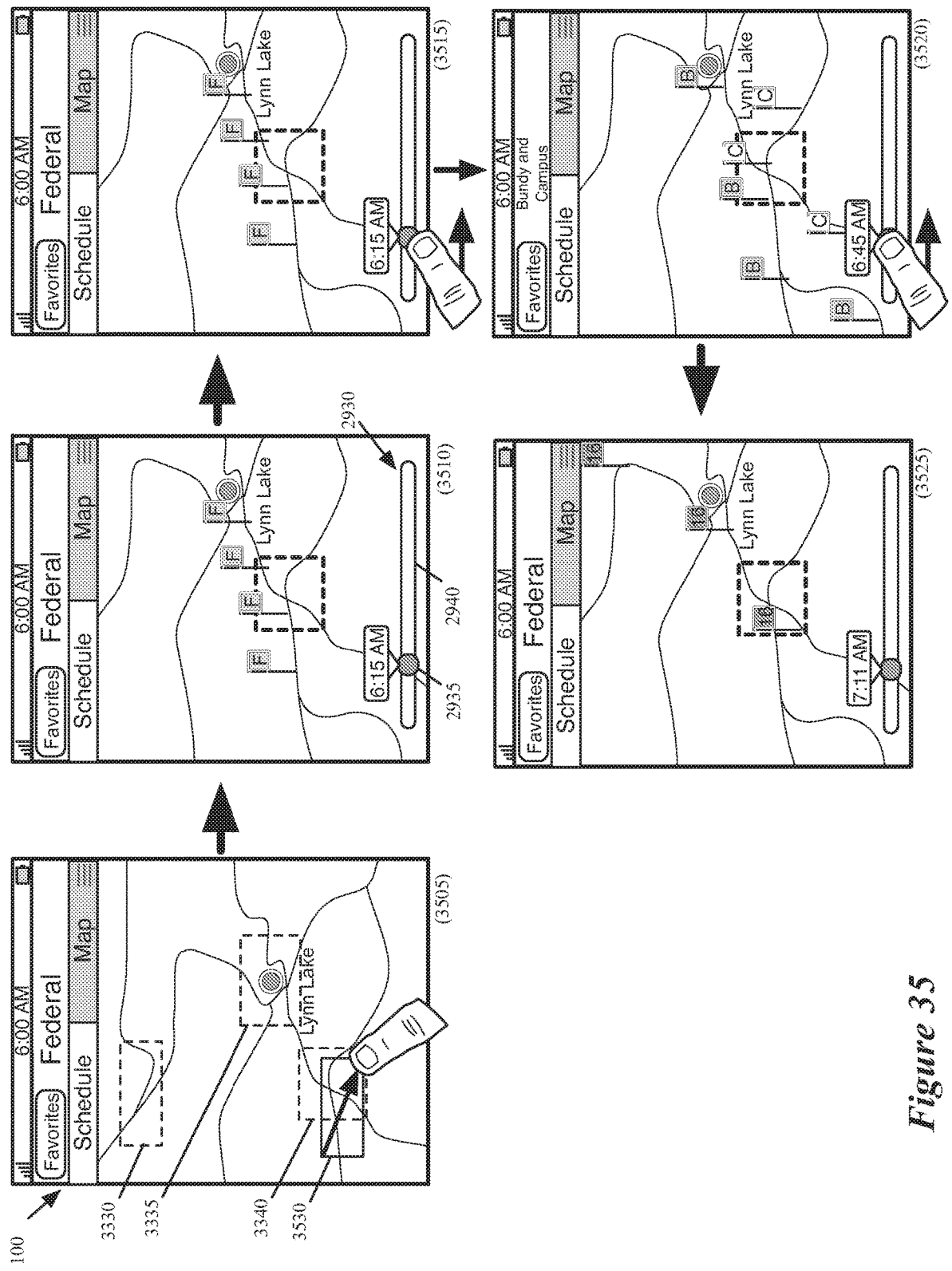
FIG. 35 conceptually illustrates the commute application of some embodiments that provides a feature for viewing different trips along different routes that stop within a predefined region based on a user-specified region.

The following FIGS. 33-35 will describe a feature of the map view of some embodiments that allows a user to view different trips along different routes that stop within a region in a map. In other words, the feature allows the user to pivot through different trips along different routes that stop within the region in the map.

FIG. 33 conceptually illustrates the commute application of some embodiments that provides a feature for viewing different trips along different routes that stop within a predefined region. Specifically, FIG. 33 illustrates the GUI 100 of the commute application at five different stages 3305-3325 of displaying different trips along different routes that stop within a predefined region.

The first stage 3305 continues from the first stage 2905 described above by reference to FIG. 29. For this example, the commute application transitions to the first stage 3305 when the commute application receives the selection of the flag in the map that represents the Foothill 1 stop. While the commute application in this example transitions to the first stage 3305 in response to the selection of a stop in the map, the commute application of some embodiments provides additional and/or other methods to transition to the first stage 3305. For instance, in some embodiments, the commute application provides a selectable UI item in the display area 144 at the first stage 2905 that when selected transitions to the first stage 3305.

As shown, the map in the first stage 3305 is displaying several selectable predefined regions 3330-3340 indicated by dashed rectangles. Each of the predefined regions 3330-3340 is for viewing different trips along different routes that stop within the predefined the region. The user in this example is selecting the predefined region 3340 by using a finger to tap on the predefined region 3340 displayed on the touchscreen.

The second stage 3310 illustrates the GUI 100 after the user selected the predefined region 3340. In response to the selection of the predefined region 3340, the commute application displayed the adjustable slider control 2930, panned the map so that the predefined region 3340 is at or near the center of the map, and bolded the predefined region 3340. In addition, the commute application in this example identified trips along routes that have stops that stop within the predefined region 3340. As shown in the second stage 3310, a trip that is scheduled to stop within the predefined region 3340 is displayed in the map and the slider 2935 is moved along the sliding region 3340 to the time value of the arrival time at the stop within the predefined region 3340.

The third stage 3315 illustrates the user starting to move the slider 2935 along the sliding region 2940 by using a finger to touch the slider 2935 displayed on the touchscreen and dragging the finger along the touchscreen in a rightwards direction relative to the GUI 100. The commute application of some embodiments displays in the map any trips that are scheduled to stop within the predefined region 3340 at the time indicated by the slider 2935 in the sliding region 2940.

The fourth stage 3320 shows the GUI 100 after the user adjusted the slider 2935 in the sliding region 2940 to a different time value. As shown, the map in the fourth stage 3320 shows two different trips along two different routes (the Bundy route and the Campus route in this example). Each of the two trips includes a stop that is scheduled to stop within the predefined region 3340 at 6:45 AM. In addition, the fourth stage 3320 illustrates the user continuing to move the slider 2935 along the sliding region 2940 by continuing to drag the finger along the touchscreen in a rightwards direction relative to the GUI 100.

The fifth stage 3325 illustrates the GUI 100 after the user adjusted the slider 2935 in the sliding region 2940 to another different time value. In the fifth stage 2925, the map is displaying the stops for another trip along another route (the 16th Avenue route in this example) that is scheduled to stop within the predefined region 3340 at 7:11 AM.

FIG. 34 conceptually illustrates the commute application of some embodiments that provides a feature for viewing different trips along different routes that stop within a user-specified region. Specifically, FIG. 34 illustrates the GUI 100 of the commute application at five different stages 3405-3425 of displaying different trips along different routes that stop within a user-specified region.

The first stage 3405 is similar to the first stage 3305 described above by reference to FIG. 33 except the first stage 3405 of FIG. 34 illustrates a user specifying a region 3430 in the map by using a finger to touch a location on the touchscreen of the top left corner of the region 3430 and dragging the finger along the touchscreen in a down and right direction, as indicated by an arrow.

The second stage 3410 illustrates the GUI 100 after the user specified a region in the map. When the commute application of some embodiments receives a specified region in the map, the commute application identifies trips along routes that stop within the specified region for display in the map view. For this example, the user-specified region 3430 covers a similar area of the map as the region 3340 shown in FIG. 33. As such, the second stage 3410 shows the same trip that is scheduled next to stop within the region 3430 as the trip illustrated in the second stage 3310 of FIG. 33 and the remaining stages 3415-3425 are the same as the corresponding stages 3315-3325 described above by reference to FIG. 33.

FIG. 35 conceptually illustrates the commute application of some embodiments that provides a feature for viewing different trips along different routes that stop within a predefined region based on a user-specified region. Specifically, FIG. 35 illustrates the GUI 100 of the commute application at five different stages 3505-3525 of displaying different trips along different routes that stop within a predefined region based on a user-specified region.

The first stage 3505 is similar to the first stage 3305 described above by reference to FIG. 33 except the first stage 3505 of FIG. 35 illustrates a user specifying a region 3530 in the map by using a finger to touch a location on the touchscreen of the top left corner of the region 3530 and dragging the finger along the touchscreen in a right and down direction, as indicated by an arrow.

Upon receiving a specified region in the map, the commute application of some embodiments identifies a predefined region closest to the specified region that touches and/or overlaps the specified region. If a predefined region does not touch nor overlap the specified region, in some embodiments, commute application identifies a predefined region closest to the specified region that is within a threshold distance of the specified region.

The second stage 3510 illustrates the GUI 100 after the user specified a region in the map and the commute application used the predefined region 3340 to identify trips along routes that have stops that stop within the predefined region 3340 for display in the map of the map view. The second stage 3510 shows the same trip that is scheduled next to stop within the predefined region 3340 as the trip illustrated in the second stage 3310 of FIG. 33. The remaining stages 3515-3525 are the same as the corresponding stages 3315-3325 described above by reference to FIG. 33.

Many of the examples and embodiments illustrated above show in a map the current location of the device on which the commute application is operating. However, one of ordinary skill in the art will understand that the commute application of some embodiments actually does not display the current location of the device in the map and that the current location of the device is displayed in the map for the purposes of simplicity and explanation in these examples and embodiments.

IV. Other Features

As explained above, in some embodiments the commute application provides several different features. The following section will describe details, examples, and embodiments of various other features provided by the commute application of some embodiments.

Figure 36:
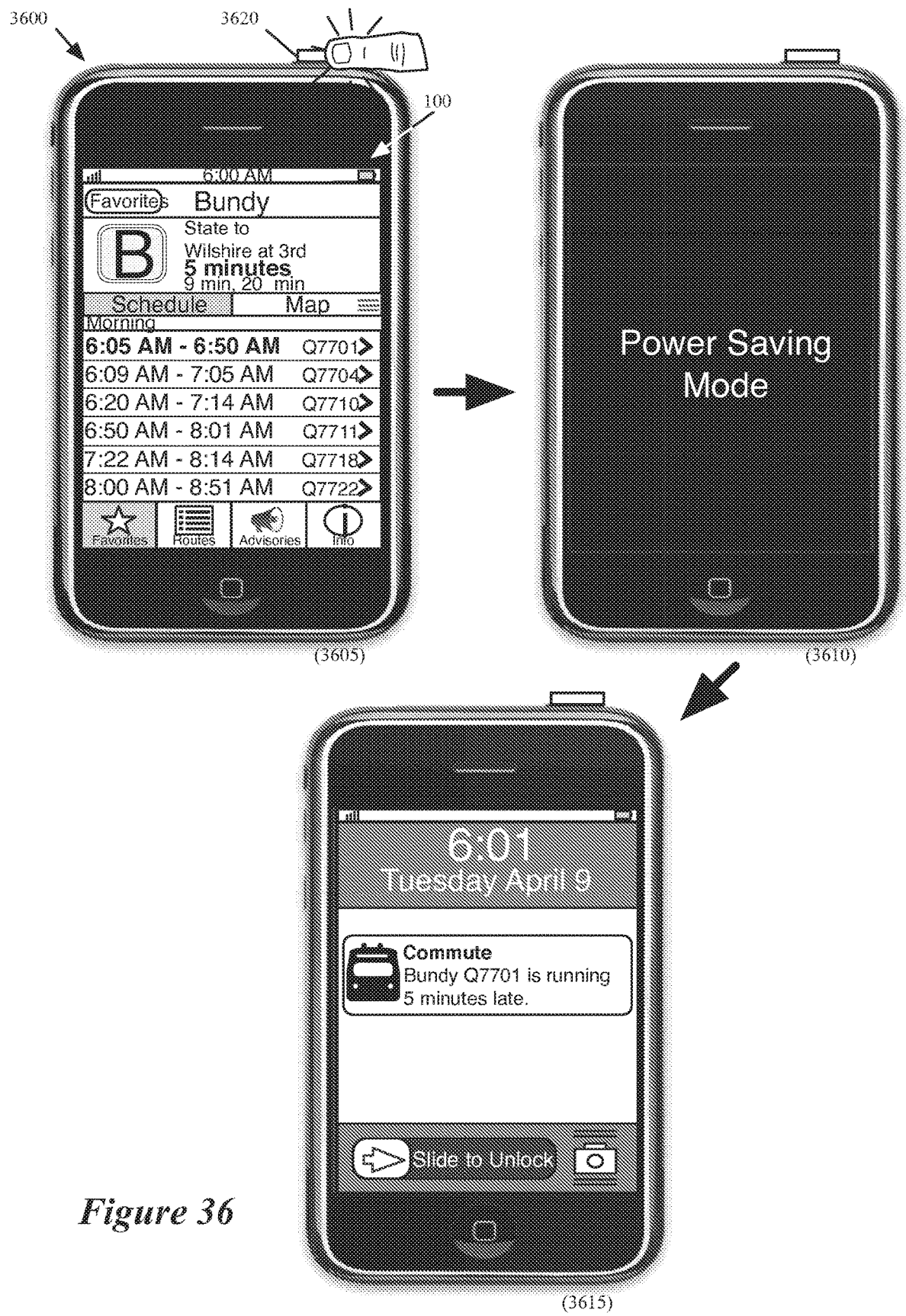
FIG. 36 conceptually illustrates providing a notification for the commute application of some embodiments when a device is in a power saving mode.

FIG. 36 conceptually illustrates providing a notification for the commute application of some embodiments when a device 3600 is in a power saving mode. Specifically, FIG. 36 illustrates the commute application at three different stages 3605-3615 of providing a notification when the device 3600 on which the commute application is operating is in power saving mode.

The GUI 100 in the first stage 3605 is similar to the GUI 100 in the first stage 2005 described above by reference to FIG. 20 except the first stage 3605 of FIG. 36 does not show a user selecting a trip in the scheduled view table. Rather, the user in the first stage 3605 is selecting a power switch 3620 of the device 3600 by using a finger to depress the power switch 3620 in order to switch the device 3600 to a power saving mode.

The second stage 3610 shows the device 3600 after the user depressed the power switch 3620. As indicated, the second stage 3610 illustrates that the device 3600 is in a power saving mode. As such, the device 3600's display is turned off. In some embodiments, while the device 3600 is in power saving mode, the device 3600's notification services provides notifications through a lock screen of the device 3600. When the commute application of some such embodiments receives a notification for the Advisories feature, the commute application sends the notification to the notification services of the device 3600, which in turn displays the notification through the lock screen of the device 3600.

The third stage 3615 illustrates the device 3600 displaying a notification through the device 3600's lock screen. As shown, the notification is for the commute application and indicates that a route is running late. In some embodiments the device displays a notification by the commute application only when the advisory notification services is enabled on the device. Although in the illustrated example a notification in relation with a route running late is displayed, one of ordinary skill in the art would realize that the device can display any other advisory notification (e.g., a route is temporarily closed, transit vehicle involved in an accident, etc.) when this service is enabled. In some embodiments, the commute application receives advisory notifications from a set of servers when the set of servers are notified of the occurrence of certain events (e.g., a transit vehicle involving in an accident, etc.).

Figure 37:
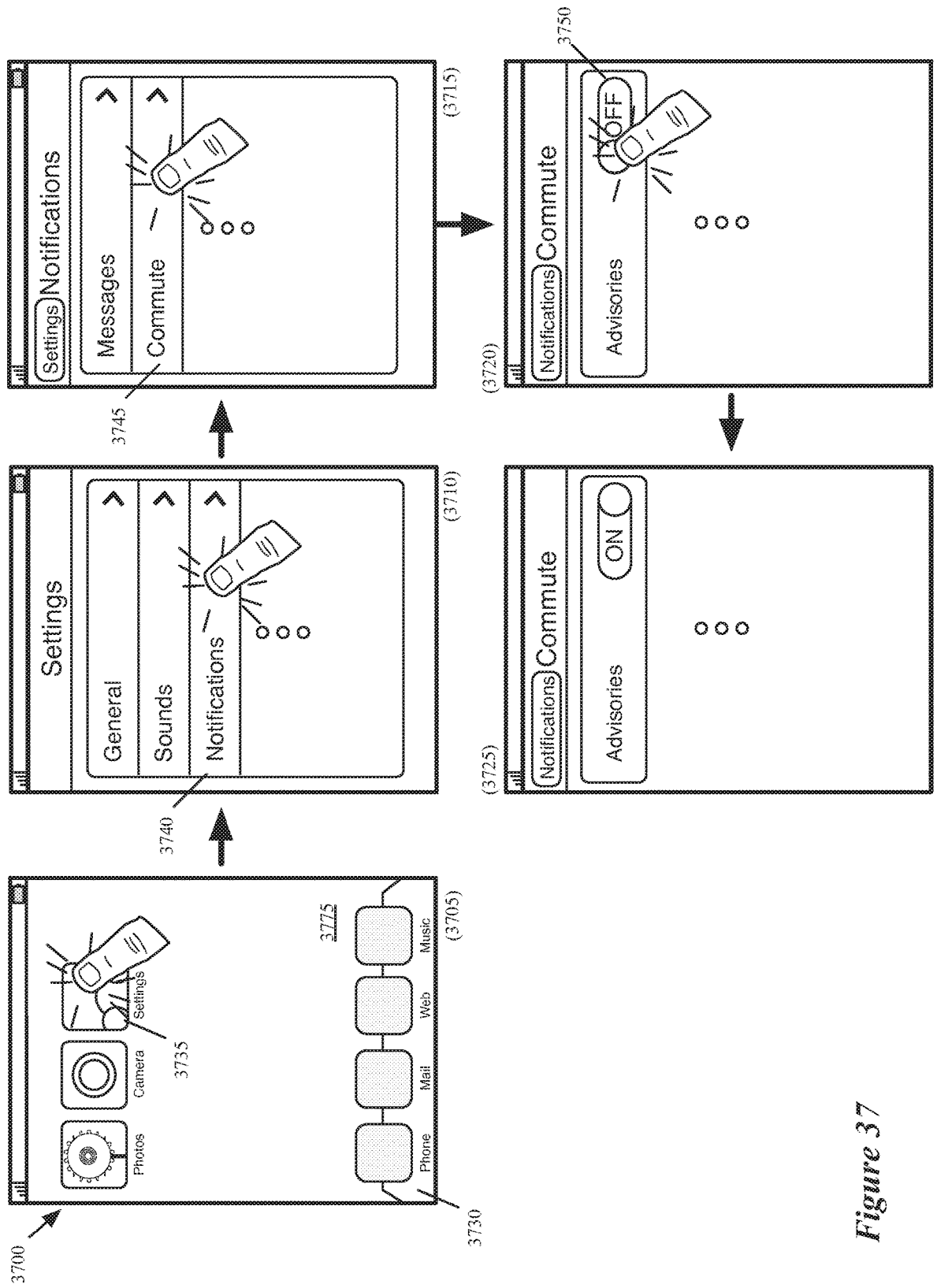
FIG. 37 conceptually illustrates enabling notifications for the commute application of some embodiments on a device.

FIG. 37 conceptually illustrates enabling notifications for the commute application of some embodiments on a device. In particular, FIG. 37 illustrates a GUI 3700 of the device on which the commute application is operating at five different stages 3705-3725 of enabling notification for the commute application on the device.

The first stage 3705 illustrates the GUI 3700 of the device, which includes several selectable UI items for applications in the dock area 3730 and on a page 3775 of the GUI 3700. One of the selectable UI items displayed on the page at the first stage 3705 is a selectable UI item 3735 for invoking the settings application. As illustrated, a user is selecting the UI item 3735 by using a finger to tap the UI item 3735 displayed on the touchscreen in order to open the settings application.

The second stage 3710 shows the GUI 3700 of the device after the settings application has opened. As shown, the page of the settings application includes a selectable UI item 3740 for displaying a notifications page of the settings application. The second stage 3710 also illustrates the user selecting the UI item 3740 by using a finger to tap the UI item 3740 displayed on the touchscreen to display the notifications page of the settings application The third stage 3715 shows the GUI 3700 of the device displaying the notifications page of the settings application after the user selected the UI item 3740. As shown, the notifications page includes a selectable UI item 3745 for displaying a notifications page of the settings application for the commute application. Additionally, the third stage 3715 shows the user selecting the UI item 3745 by using a finger to tap the UI item 3745 displayed on the touchscreen to display the notifications page of the settings application for the commute application.

The fourth stage 3720 shows the GUI 3700 of the device displaying the notifications page of the settings application for the commute application after the user selected the UI item 3745. The notifications page for the commute application illustrated in the fourth stage 3720 includes a selectable UI item 3745 for enabling and disabling the commute application's notifications for the device's notification services. When the commute application's notifications are enabled for the device's notification services, the commute application sends notifications that the commute application receives and/or generates to the device's notification services for display on the device through the device's notification services. In addition, the fourth stage 3720 shows the user selecting the UI item 3750 by using a finger to tap the UI item 3750 displayed on the touchscreen to enable the commute application's notifications for the device's notification services. The fifth stage 3725 illustrates the GUI 3700 of the device showing that the commute application's notifications are enabled for the device's notification services after the user selected the UI item 3750. As described above, enabling the commute application's notification services causes the device to display the advisory notifications upon occurrence of certain events.

The commute application of some embodiments displays different graphical representations of transit systems, routes, stops and/or schedules for different localities. The elements of graphical representation (e.g., fonts, icons, symbols, colors, shapes, etc.) in each particular locality are defined differently based on the graphical representations of the transit data (e.g., the route data, stop data, schedule data, etc.) that the transit system operator or operators use in that locality. This approach allows the commute application to customize the views (e.g., map views, list views, etc.) displayed in the commute application to match the graphical representation of the transit data in different localities, which, in turn, causes the application to appear more realistic to the user of the application.

Figure 38:
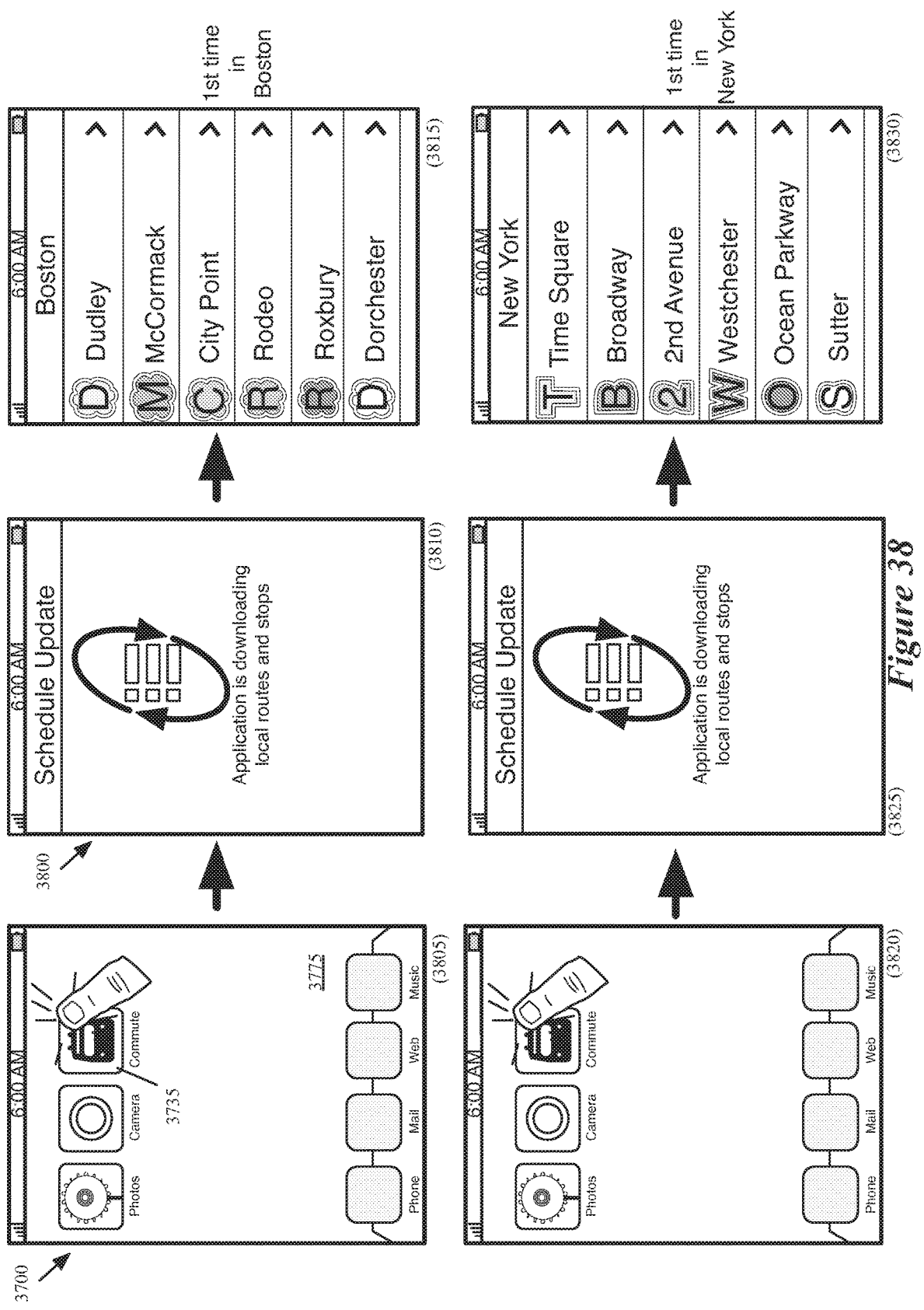
FIG. 38 conceptually illustrates the commute application of some embodiments downloading different route data based on different localities in which a device operates.

FIG. 38 conceptually illustrates the commute application of some embodiments downloading different route data based on different localities in which a device operates. In particular, FIG. 38 illustrates six different stages 3805-3830 that show the commute application displaying different graphical representations (e.g., symbols, etc.) for different routes when the device is used in different localities (e.g., cities). The stages 3805-3815 show the commute application downloading route data for a first locality while the stages 3820-3830 show the commute application downloading route data for a second, different locality.

The first stage 3805 illustrates the GUI 3700 of the device. As shown in the first stage 3805, a user is selecting the UI item 3735 by using a finger to tap the UI item 3735 displayed on the touchscreen in order to open the commute application. In some embodiments, when the commute application is opened, the commute application determines the locality in which the device is operating (e.g., via global positioning system (GPS) location data, Wi-Fi-based positioning system location data, cellular tower data, etc.) and downloads route data for the locality if such data is not already stored on the device on which the commute application is operating.

The second stage 3810 shows a GUI 3800 of the commute application after the commute application determined that route data for the location in which the device is operating is not stored on the device. As shown, the GUI 3800 is displaying a page indicating that data for local transit systems, routes, and stops are being downloaded to the device. In some embodiments, the data for local routes and stops includes graphical representations (e.g., icons) for the different transit systems, routes, and/or stops along the different routes.

The third stage 3815 illustrates the commute application after the commute application has finished downloading the data for the local routes and stops of the locality in which the device is operating. The third stage 3815 shows a page displaying the different routes and graphical representations (e.g., icons) of the routes for the locality in which the device is operating, which is Boston in this example. As illustrated in this stage, the list view that displays the list of different routes of a transit system in Boston, has a particular symbol in a particular color (shade) for each route in the list.

For this example, the fourth stage 3820 illustrates the GUI 3700 of the device, which is operating at a locality different from the locality illustrated for stages 3805-3815. As shown, the user in the fourth stage 3820 is selecting the UI item 3735 by using a finger to tap the UI item 3735 displayed on the touchscreen in order to open the settings application.

The fifth stage 3825 shows the GUI 3800 of the commute application after the commute application determined that route data for the location in which the device is operating is not stored on the device. As illustrated, the GUI 3800 is displaying the same page shown in the second stage 3810 indicating that data for local routes and stops are being downloaded to the device.

The sixth stage 3830 illustrates the commute application after the commute application has finished downloading the data for the local routes and stops of the locality in which the device is operating. The page shown in sixth stage 3830 is displaying the different routes and graphical representations (e.g., icons) of the routes for the locality in which the device is operating, which is New York in this example. As illustrated in this stage, the graphical representations for displaying the routes of a transit system (e.g. a bus line) in New York is different than the graphical representation of the same or different transit system operating in Boston in stage 2. More specifically, for the New York locality, each route in the list view at stage 3830 is presented with a symbol that includes the first letter in the name of the route along with a background shape that follows the contour of the first letter. On the other hand, for the Boston locality, all the routes in the list view of stage 3815 are represented with a single shape (e.g., a circle) but in different colors (shades).

In some embodiments, the commute application shows different graphical representations of transit systems, routes, stops and/or schedules for different localities. The elements of graphical representations (e.g., fonts, icons, symbols, colors, shapes, etc.) in each particular locality in some embodiments are defined differently based on the graphical representations of the transit data (e.g., the route data, stop data, schedule data, etc.) presented by the transit system operator in that locality. For instance, in some embodiments, a set of servers receives the graphical representations of transit systems, routes, stops and/or schedules for each locality (e.g., each city) from one or more transit operators (e.g., train operators, bus operators, etc.) of the locality and/or third parties that work with these transit operators. These servers, or servers that communicatively couple to these servers, then provide the received graphical representation to specify the route, stop, and/or schedule display for a particular locality to a device's commute application when the device is operating in that particular locality.

This approach allows the commute application to customize the display of the transit data (e.g., the route data, stop data, schedule data, etc.) in each locality to mirror the representations of this data in that locality. As stated above, in this manner, the commute application can use different symbols to display transit data in New York than the symbols it uses to display transit data in Boston, and in each of these localities, the application can use the symbols that are used by the transit operators in those localities to represent the transit data. The architecture for gathering different data for different localities will be further described below by reference to FIGS. 40-43.

Figure 39:
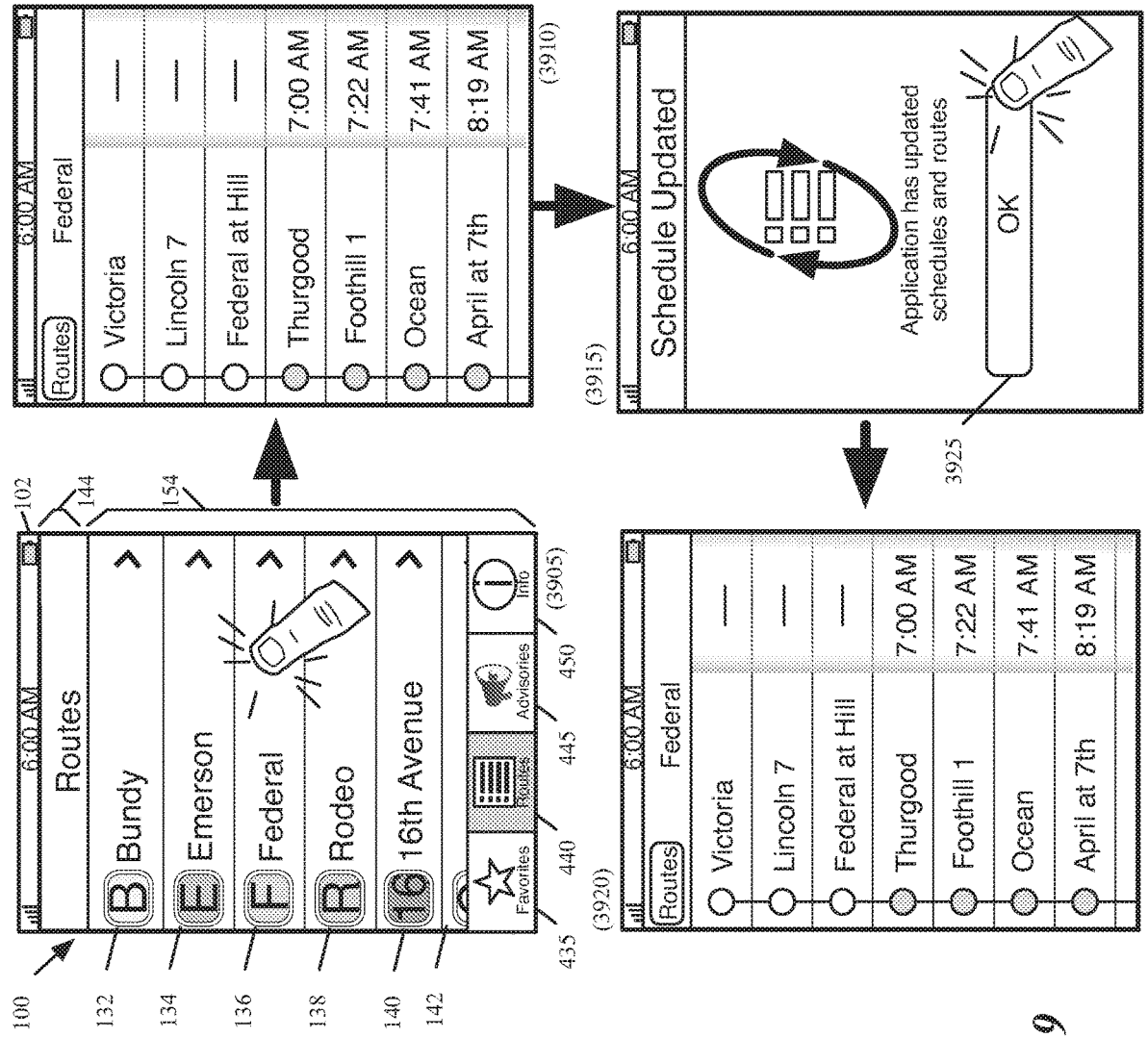
FIG. 39 conceptually illustrates the commute application of some embodiments that provides a schedule and route data update feature.

FIG. 39 conceptually illustrates the commute application of some embodiments that provides a schedule and route data update feature. Specifically, FIG. 39 illustrates the GUI 100 of the commute application of some embodiments at four different stages 3905-3920 that show the commute application downloading updates for schedule and route data.

The first stage 3905 is the same as the first stage 505 described above by reference to FIG. 5. The second stage 3910 is similar to the second stage 510 described above by reference to FIG. 5 except the second stage 3910 of FIG. 39 does not show a user performing a scroll operation on the dynamic focus table. In some embodiments, when a route is selected to view schedules for the route, the commute application determines whether the schedule and route data stored at the device on which the commute application is operating need to be updated. The commute application of some embodiments determines this by accessing a set of servers and/or services that provides schedule and route data and then comparing the schedule and route data stored at the device with the schedule and route data provided by the servers and/or services. When the commute application determines that the schedule and route data stored at the device is not the same as the schedule and route data provided by the servers and/or services, the commute application downloads the schedule and route data from the servers and/or services and uses this data to update the schedule and route data stored at the device.

The third stage 3915 shows the GUI 100 of the commute application after the commute application determined that the commute application needs to update the schedule and route data stored at the device. As shown, the GUI 100 is displaying a page, which includes a selectable UI item 3925 for exiting the page, indicating that the commute application has updated the schedules and routes. In addition, the third stage 3915 illustrates the user selecting the UI item 3925 by using a finger to tap the UI item 3925 displayed on the touchscreen in order to exit the page. Although in the illustrated example, the GUI 100 displays a separate page for notifying the user that the commute application has updated the schedules and routes, the commute application's information in other embodiments is updated periodically without notifying the user.

The fourth stage 3920 illustrates the GUI 100 after the user selected the UI item 3925 to exit the page shown in the third stage 3915. The commute application of some embodiments returns to the page of the GUI 100 that was displayed prior to updating the schedule and route data. As shown, the commute application returned to the GUI 100 illustrated in the second stage 3910.

While FIG. 39 illustrates an example of the commute application checking for a schedule and route data update when a route is selected to view the route's schedule, the commute application of some embodiments checks for a schedule and route data update at additional and/or different times. For example, in some embodiments, the commute application checks for a schedule and route data update when the commute application is opened.

V. Server-Side Features

As explained above, the commute application of some embodiments provides users information about different routes as well as information about schedules for the different routes. To provide such information, the commute application of some embodiments needs to access a set of servers and/or services that provides the schedule and route data as well as definitions of different graphical representations in which the schedule and route data of a particular locality are presented. As noted above, the schedule and route data of some embodiments are presented using different graphical representations (e.g., icons, symbols, colors, etc.) for the different routes and/or stops along the different routes in different localities. This approach allows the commute application to customize the views (e.g., map views, list views, etc.) displayed in the commute application to match the graphical representation of the transit data in different localities, which, in turn, causes the application to appear more realistic to the user of the application.

In some embodiments, a set of servers first generates the definitions of different graphical representations data of the transit systems (e.g., the route data, stop data, schedule data, etc.) by receiving and processing the graphical representation data from a variety of vendors (e.g., train operators, bus operators, third party providers, etc.). The set of servers then places the processed data in data structures (e.g., tiles) that will be provided to a client device upon the client device's request. These data structures are then used by the commute application operating on the client device to render different graphical representations (e.g., fonts, icons, symbols, colors, shapes, etc.) for different transit data. Several manners of server-side generation of definitions of map areas or constructs to render and client-side rendering of these definitions are further described in the U.S. patent application Ser. No. 13/632,040, entitled "Virtual Camera for 3D Maps," filed Sep. 30, 2012. This application is incorporated herein by reference.

Figure 40:
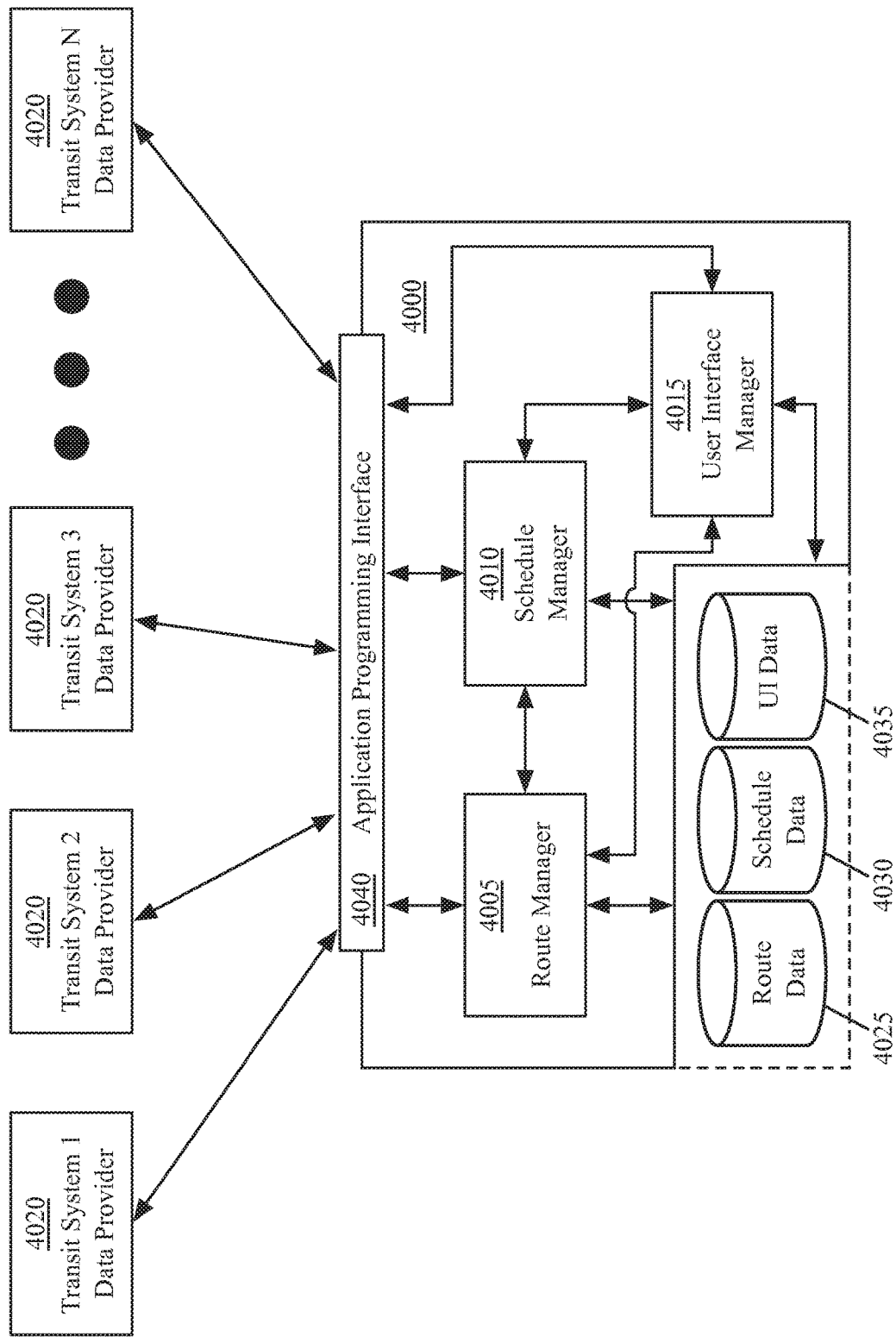
FIG. 40 conceptually illustrates an architecture for a server set that aggregates different schedule and route data from different data providers.

FIG. 40 conceptually illustrates an architecture for a server set 4000 that aggregates different schedule and route data from different data providers. The server set includes only one server in some embodiments, while it includes more than one servers (e.g., one or more servers for each manager or each data storage) in other embodiments. As shown, the server set 4000 includes a router manager 4005, a schedule manager 4010, and a user interface manager 4015. FIG. 40 also illustrates N transit system data providers 4020 where N can be any positive real number. In some embodiments, a transit system data provider 4020 provides the server set 4000 with information regarding a transit system, such as the different routes and/or lines in the transit system, the stops along the different routes and/or lines, schedules for different trips along the routes and/or lines, user interface definitions that specify the manner in which user interface and/or graphical elements associated with the locality of the transit system are displayed in the commute application of some embodiments, etc.

In addition, FIG. 40 illustrates route data storage 4025, schedule data storage 4030, and UI data storage 4035. In some embodiments, the route data storage 4025 is for storing data for different routes. For each route, the route data storage 4025 stores the stops along the route, the names of the stops, the geographical location of the stops, etc.

The schedule data storage 4030 of some embodiments stores information for different schedules for the different routes stored in the route data storage 4025. In some embodiments, information for a scheduled trip along a route includes the name of the route, the stops along the route for the scheduled trip, the arrival times at the stops along the route for the scheduled trip, etc.

In some embodiments, the UI data storage 4035 stores user interface data for the routes stored in the route data storage 4025 and the schedules stored in the schedule data storage 4030. Examples of such user interface data include definitions of graphical representations (e.g., fonts, icons, symbols, colors, shapes, etc.) of the transit systems, routes, stops and schedules for different views (e.g., map view, list view, etc.) displayed by the commute application of some embodiments. For example, in some embodiments, when two different transit bus operators in two different cities have two different styles for representing bus stops and/or bus routes, the commute application in some embodiments uses different styles to display the bus stops and/or bus routes in the different cities (e.g., uses each city's particular style to display that city's bus stops and/or bus routes). In some embodiments, the storages 4025-4035 are implemented as one physical storage while, in other embodiments, the storages 4025-4035 are implemented in separate physical storages. Still, in some embodiments, one or more of the storages 4025-4035 are implemented across several physical storages.

As mentioned above by reference to FIG. 38, the UI data storage stores different graphical representations of routes, stops and/or schedules for different localities. For instance, in some embodiments, the server set receives the graphical representations of routes, stops and/or schedules for each locality (e.g., city, state, county, etc.) from one or more transit system data providers (e.g., train operators, bus operators, third party providers, etc.) of the locality. This server set, or servers that communicatively couple to this server set, then provide the received graphical representation to specify the route, stop, and/or schedule display for a particular locality to a device's commute application when the device is operating in that particular locality. This approach allows the commute application to render a customized display of the transit data (e.g., the route data, stop data, schedule data, etc.) in each locality to mirror the representations of this data in that locality. In this manner, the commute application can render different symbols to display transit data in New York than the symbols it uses to display transit data in Boston, and in each of these localities, the application can use the symbols that are used by the transit operators in those localities to represent the transit data.

The route manager 4005 handles route data that the route manager 4005 receives from the transit system data providers 4020. The route manager 4005 receives route data from the transit system data providers 4020 through an application programming interface (API) 4040 that the server set 4000 provides to the transit system data providers 4020. In some embodiments, the API 4040 specifies a particular format in which to send data and the manner in which to send the data. In some embodiments, the route manager 4005 processes the route data (e.g., clean and/or modify stop names, route names, etc.) in order to transform the data to a defined format. The route manager 4005 then stores the route data in the route data storage 4025.

When the route manager 4005 receives from a transit system data provider 4020 route data that is specified as an update to existing route data, the route manager 4005 of some embodiments accesses the route data storage 4025 to identify the corresponding route data for which the received route data is an update. In some embodiments, the route manager 4005 updates the corresponding route data stored in the route data storage 4025 with the received route data.

The schedule manager 4010 is responsible for managing schedule data received from the transit system data providers 4020 through the API 4040. Upon receiving schedule data, the schedule manager 4010 of some embodiments processes it (e.g., clean and/or modify stop names, route names, etc.) in order to transform the data to a defined format. In some embodiments, the schedule data references routes associated with the schedule data. The schedule manager 4010 in some embodiments interacts with the route manager 4005 or accesses the route data storage 4025 to identify the routes that are associated with the schedule data and to add the routes' information to the schedule data. In some embodiments, the schedule manager 4010 stores the schedule data in the schedule data storage 4030.

In some embodiments, the schedule data that the schedule manager 4010 receives from a transit system data provider 4020 is specified as an update to existing schedule data. The schedule manager 4020 in some such embodiments accesses the schedule data storage 4030 to identify the corresponding schedule data for which the received schedule data is an update. In some embodiments, the schedule manager 4010 then updates the corresponding schedule data stored in the schedule data storage 4030 with the received schedule data.

In some embodiments, the user interface manager 4015 manages UI data received from the transit system data providers 4020 through the API 4040. The user interface manager 4015 of some embodiments processes the user interface data to transform the data to a defined format. In some embodiments, the user interface data references routes and/or schedules associated with the user interface data. The user interface manager 4015 in some embodiments interacts with the route manager 4005 and/or the schedule manager 4010, or accesses the route data storage 4025 and/or the schedule data storage 4030, to identify the routes and/or schedules that are associated with the user interface data and to add the routes' and/or schedules' information to the user interface data. The user interface manager 4015 then stores the user interface data in the UI data storage 4035. Through the API 4040, the user interface manager 4015 of some embodiments receives different graphical representations of transit data for different localities, and this allows the user interface storage 4035 to store different representations of transit data for different localities. As mentioned above, and further described below, these different representations are then used by schedule and route servers to specify different transit displays (e.g., different displays of routes, stops and/or schedules) for different localities.

Upon receiving from a transit system data provider 4020 UI data that is specified as an update to existing UI data, the user interface manager 4015 of some embodiments accesses the UI data storage 4035 to identify the corresponding UI data for which the received UI data is an update. In some embodiments, the user interface manager 4015 then updates the corresponding UI data stored in the UI data storage 4035 with the received UI data.

Figure 41:
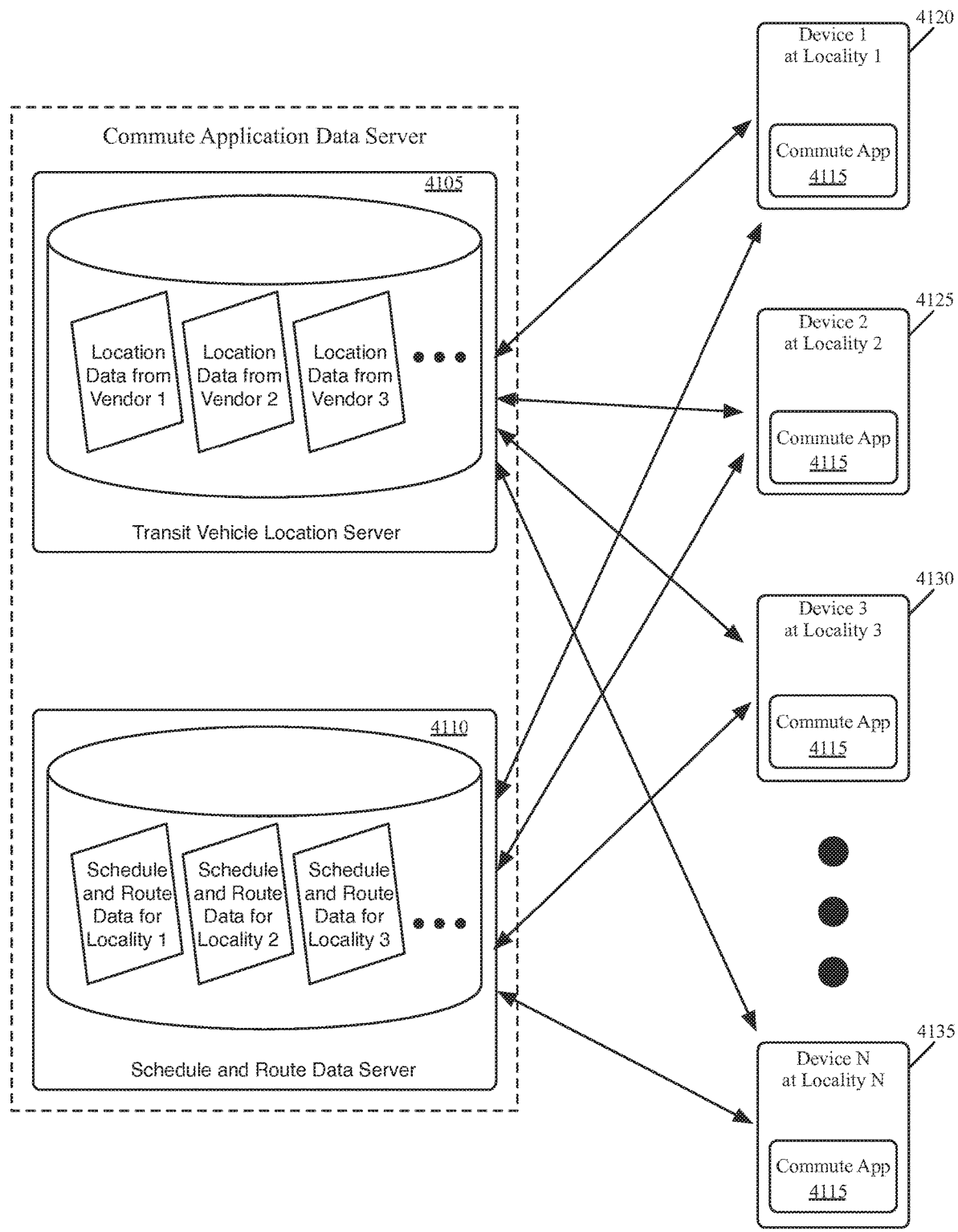
FIG. 41 conceptually illustrates a set of servers that provide different data to commute applications operating on different devices.

FIG. 41 conceptually illustrates a set of servers 4105 and 4110 that provide different data to commute applications 4115 operating on different devices 4120-4135. As shown, the servers 4105 and 4110 in this example collectively form a commute application data server, which provides schedule and route data that the commute applications 4115 use to present on the devices 4120-4135 routes and schedules to users of the devices 4120-4135. While FIG. 41 shows each server 4105 or 4110 as one server to simplify the illustration in this figure, one of ordinary skill will realize that each server 4105 or 4110 can be a combination of several servers in some embodiments of the invention.

The commute application data server of some embodiments also provides updates for the schedule and route data. For this example, the commute application data server provides data to the devices 4120-4135 through a network (not shown in FIG. 41), such as a local area network ("LAN"), a wide area network ("WAN"), or an Intranet, or a network of networks, such as the Internet.

In some embodiments, the servers 4105 and 4110 are each implemented by a different set of servers while, in other embodiments, the servers 4105 and 4110 are implemented by the same set of servers. As such, when the servers 4105 and 4110 are implemented by different sets of servers, the commute applications 4115 access two different points/locations for the commute applications 4115 data.

In some embodiments, the server 4105 is for hosting and providing dynamic data. In this example, the server 4105 hosts and provides location data for transit vehicles. In some embodiments, the location data that the server 4105 provides to the commute applications 4115 is used to display the location of transit vehicles on a map (e.g., the map views described above by reference to FIGS. 21-28).

The locations of transit vehicles are tracked in real-time, in some embodiments. The tracking information (e.g., GPS location data) for different transit vehicles is provided in some embodiments by any number of different vendors. The server 4105 of some embodiments retrieves and aggregates the tracking information from the vendors for the different transit vehicles. As illustrated in FIG. 41, the server 4105 is storing location data from Vendor 1, location data from Vendor 2, location data from Vendor 3, etc. This way, the server 4105 is able to provide to the commute applications 4115 the location data for any of the different transit vehicles.

The server 4110 of some embodiments is for hosting and providing static and/or slow changing data. As shown, the server 4110 in this example hosts and provides schedule and route data. In some embodiments, the server 4110 is implemented by the server set 4000 described above by reference to FIG. 40.

As explained above, the commute application of some embodiments downloads different route data based on different localities. In some such embodiments, the server 4110 hosts and provides the schedule and route data for the different localities. The schedule and route data for a particular locality in some embodiments includes UI data (e.g., graphical representations of the routes, such as icons) for the particular locality, which may differ from the UI data for another locality. As shown in FIG. 41, the server 4110 is storing schedule and route data for locality 1, schedule and route data for locality 2, schedule and route data for locality 3, etc.

To provide different UI representations for different localities, the server 4110 retrieves the different transit data representations (e.g., different transit data definitions) for different transit data constructs (e.g., different routes, stops, schedules, etc.) from the UI data storage 4035, and then uses these representations to provide a definition of the transit data constructs for the commute application to render. In this manner, the aggregation and distribution architectures illustrated in FIGS. 40 and 41 allow the commute application to display transit data differently in different localities. For instance, as described above by reference to FIG. 38, the commute application can render different style of icons to represent differently the transit stops in different cities. Each city's style of icons mimics in some embodiments how the transit operators in that city display an actual transit stop. Similarly, the servers and the commute application for each locality display other transit data (e.g., route depiction, transit operator depiction, etc.) in a manner that mimics how the transit operators of that locality display such other transit data.

FIG. 41 shows for this example that the device 4120 is operating at locality 1, the device 4125 is operating at locality 2, the device 4130 is operating at locality 3, and the device 4135 is operating at locality N. Accordingly, when the devices 4120-4135 request schedule and route data from the server 4110, the server 4110 provides the devices 4120-4135 with schedule and route data for the corresponding locality.

Figure 42:
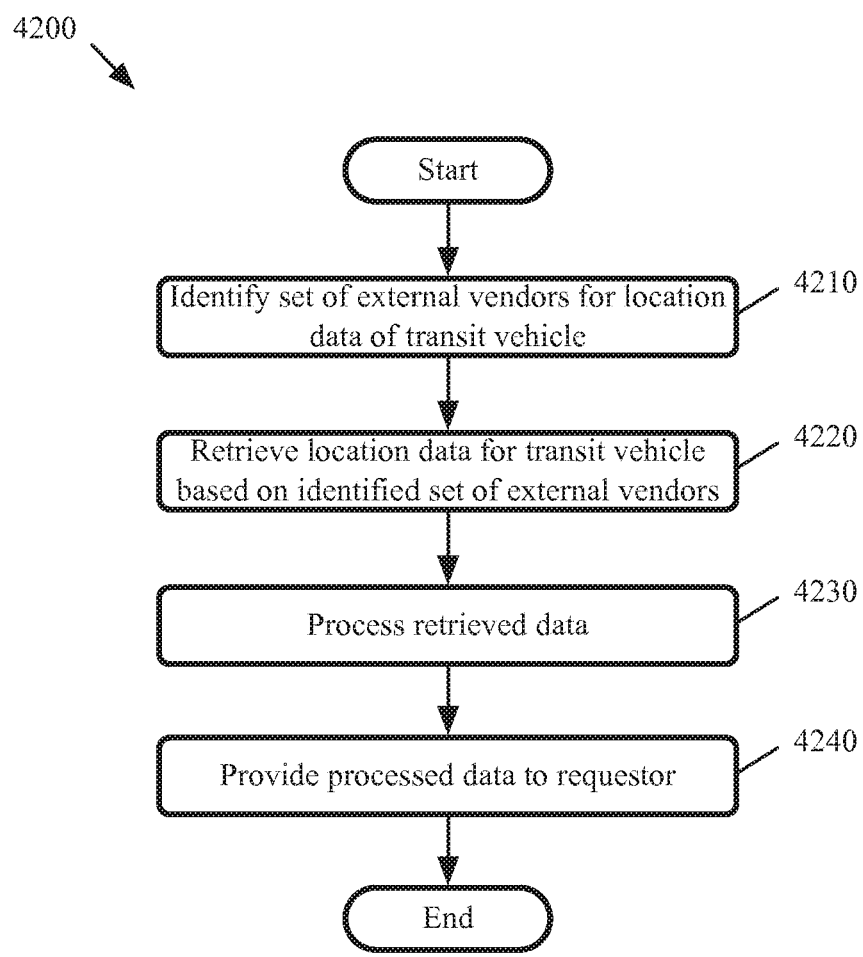
FIG. 42 conceptually illustrates a process of some embodiments for processing a location request for a transit vehicle.

FIG. 42 conceptually illustrates the process 4200 of some embodiments for processing a location request for a transit vehicle. In some embodiments, the server 4105 described above by reference to FIG. 41 performs the process 4200 when the server 4105 receives a request for the location of a particular transit vehicle.

As shown, the process 4200 starts by identifying (at 4210) a set of external vendors for location data of a transit vehicle. In some embodiments, one or more external vendors provide tracking information for the transit vehicle.

Once the external vendors have been identified, the process 4200 retrieves (at 4220) the location data for the transit vehicle based on the identified set of external vendors. In some embodiments, some or all of the identified location data has been previously retrieved from the external vendors (e.g., through periodic aggregation from external vendors) and stored. The process 4200 in some such embodiments accesses (e.g., a storage on the server 4105) the previously retrieved location data and retrieves location data for the transit vehicle. For any remaining portions of the location data, the process 4200 retrieves the location data from some or all of the identified external vendors. In some embodiments, the process 4200 retrieves the location data by retrieving all the location data for the transit vehicle from the identified set of external vendors.

Next, the process 4200 processes (at 4230) the retrieved data. In some embodiments, the location data retrieved from the external vendors needs to be formatted according to a defined format that is usable by the commute application. The process 4200 in some such embodiments processes the location data into the defined format. In some embodiments, the process 4200 performs other operations on the location data (e.g., filtering, cleaning, modifying, etc.) in order to place the location data in a format useable by the commute application.

Finally, the process 4200 provides (at 4240) the processed location data to the requestor. Referring to FIG. 41 as an example, the process 4200 would provide the processed data to one of the devices 4120-4135 that requested the location of the transit vehicle.

Figure 43:
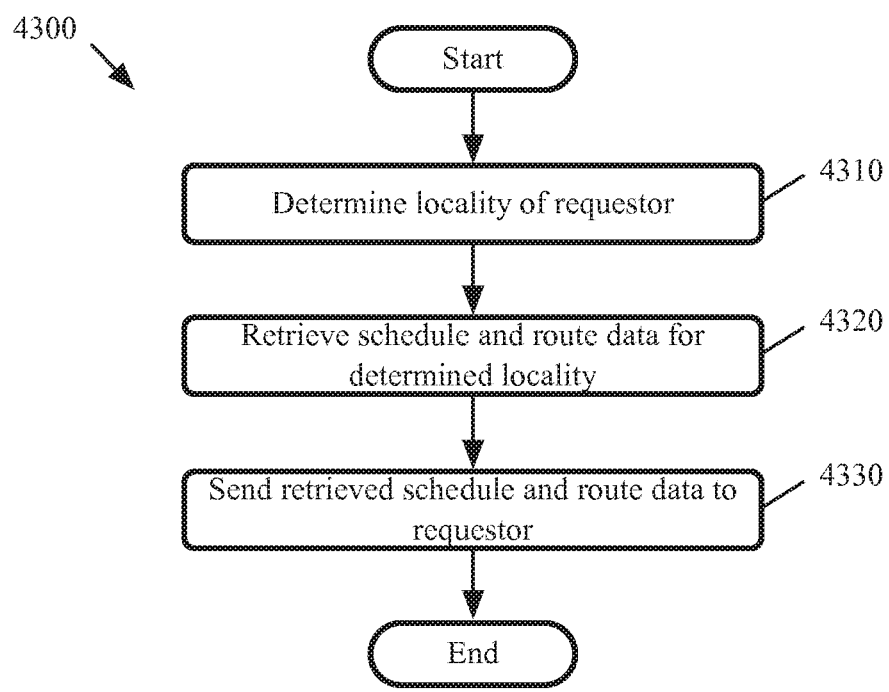
FIG. 43 conceptually illustrates a process of some embodiments for processing a request for schedule and route data.

FIG. 43 conceptually illustrates the process 4300 of some embodiments for processing a request for schedule and route data. In some embodiments, the server 4110 described above by reference to FIG. 41 performs the process 4300 when the server 4110 receives a request for schedule and route data or for an update for schedule and route data.

As shown, the process 4300 begins by determining (at 4310) the locality of the requestor. In some embodiments, the requestor includes in its request data specifying the locality in which the requestor is operating. In other embodiments, the process 4300 receives in the request metadata describing the location of the request. The process 4300 of some such embodiments determines a locality based on metadata. For instance, in some embodiments, the process 4300 accesses a lookup table that specifies a locality based on the location data in order to determine the locality of the requestor.

Next, the process 4300 retrieves (at 4320) schedule and route data for the determined locality. As described above by reference to FIG. 40, some embodiments aggregate and store different schedule and route data for different localities. In some embodiments, the process 4300 accesses such data to identify the schedule, route, and graphical representation data that correspond to the determined locality and retrieves the identified schedule, route, and graphical representation data.

Finally, the process 4300 sends (at 4330) the retrieved schedule and route data to the requestor. Referring to FIG. 41 as an example, the process 4300 would provide the schedule, route, and graphical representation data for the determined locality to one of the devices 4120-4135 that requested the schedule and route data while operating in the determined locality. That is, the process 4300 would send schedule and route data for locality 1 to device 4120, schedule and route data for locality 2 to device 4125, schedule and route data for locality 3 to device 4130, and schedule and route data for locality N to device 4135. Each of these schedule and route data then will be presented to the user of the device based on the graphical representation of the locality in which the commute application operating on the device has requested this data.

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 44:
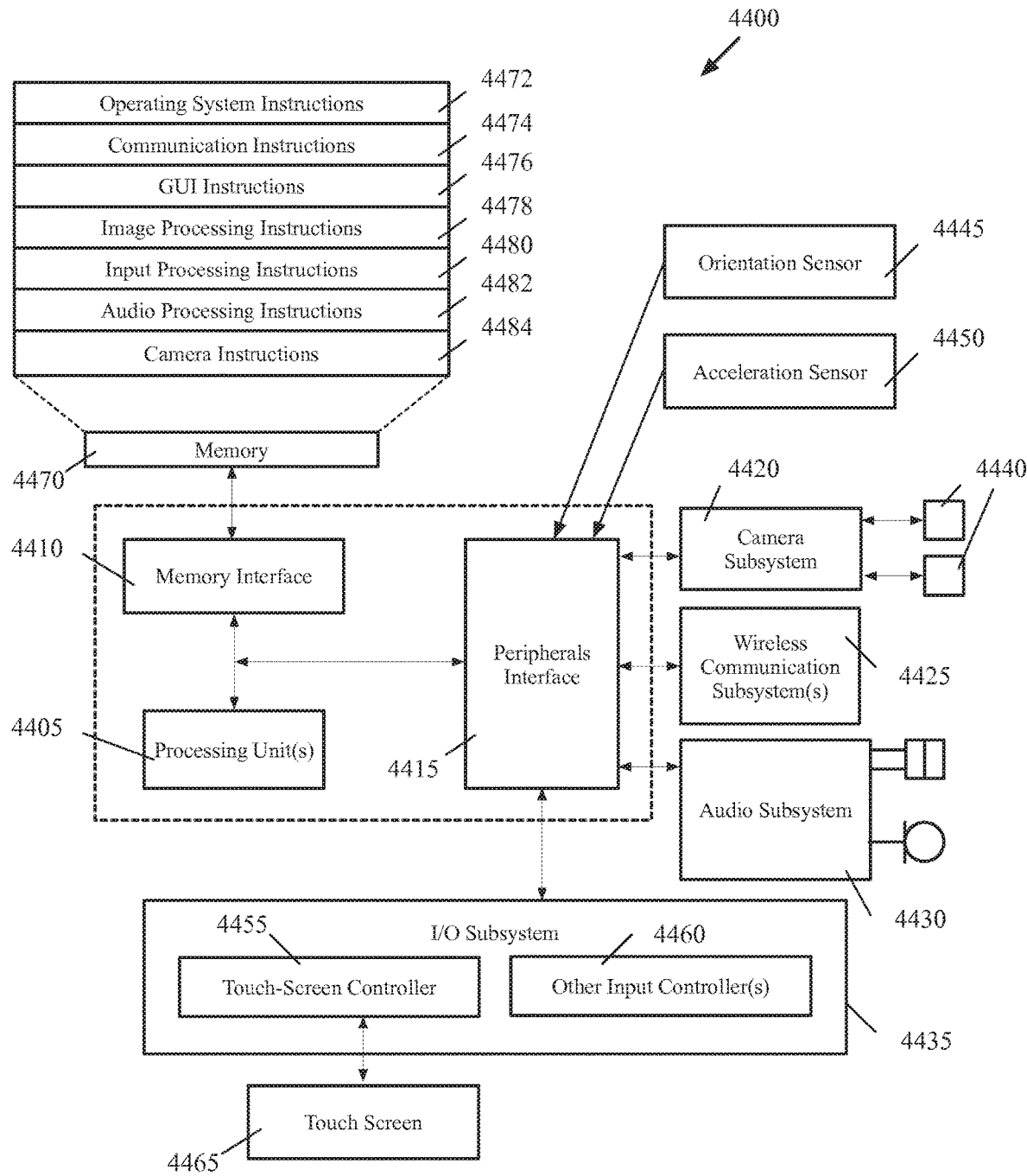
FIG. 44 is an example of an architecture of a mobile computing device.

The commute application of some embodiments operate on mobile devices, such as smart phones (e.g., iPhones®) and tablets (e.g., iPads®). FIG. 44 is an example of an architecture 4400 of such a mobile computing device. Examples of mobile computing devices include smartphones, tablets, laptops, etc. As shown, the mobile computing device 4400 includes one or more processing units 4405, a memory interface 4410 and a peripherals interface 4415.

The peripherals interface 4415 is coupled to various sensors and subsystems, including a camera subsystem 4420, a wireless communication subsystem(s) 4425, an audio subsystem 4430, an I/O subsystem 4435, etc. The peripherals interface 4415 enables communication between the processing units 4405 and various peripherals. For example, an orientation sensor 4445 (e.g., a gyroscope) and an acceleration sensor 4450 (e.g., an accelerometer) is coupled to the peripherals interface 4415 to facilitate orientation and acceleration functions.

The camera subsystem 4420 is coupled to one or more optical sensors 4440 (e.g., a charged coupled device (CCD) optical sensor, a complementary metal-oxide-semiconductor (CMOS) optical sensor, etc.). The camera subsystem 4420 coupled with the optical sensors 4440 facilitates camera functions, such as image and/or video data capturing. The wireless communication subsystem 4425 serves to facilitate communication functions. In some embodiments, the wireless communication subsystem 4425 includes radio frequency receivers and transmitters, and optical receivers and transmitters (not shown in FIG. 44). These receivers and transmitters of some embodiments are implemented to operate over one or more communication networks such as a GSM network, a Wi-Fi network, a Bluetooth network, etc. The audio subsystem 4430 is coupled to a speaker to output audio (e.g., to output voice navigation instructions). Additionally, the audio subsystem 4430 is coupled to a microphone to facilitate voice-enabled functions, such as voice recognition (e.g., for searching), digital recording, etc.

The I/O subsystem 4435 involves the transfer between input/output peripheral devices, such as a display, a touchscreen, etc., and the data bus of the processing units 4405 through the peripherals interface 4415. The I/O subsystem 4435 includes a touchscreen controller 4455 and other input controllers 4460 to facilitate the transfer between input/output peripheral devices and the data bus of the processing units 4405. As shown, the touchscreen controller 4455 is coupled to a touchscreen 4465. The touchscreen controller 4455 detects contact and movement on the touchscreen 4465 using any of multiple touch sensitivity technologies. The other input controllers 4460 are coupled to other input/control devices, such as one or more buttons. Some embodiments include a near-touch sensitive screen and a corresponding controller that can detect near-touch interactions instead of or in addition to touch interactions.

The memory interface 4410 is coupled to memory 4470. In some embodiments, the memory 4470 includes volatile memory (e.g., high-speed random access memory), non-volatile memory (e.g., flash memory), a combination of volatile and non-volatile memory, and/or any other type of memory. As illustrated in FIG. 44, the memory 4470 stores an operating system (OS) 4472. The OS 4472 includes instructions for handling basic system services and for performing hardware dependent tasks.

The memory 4470 also includes communication instructions 4474 to facilitate communicating with one or more additional devices; graphical user interface instructions 4476 to facilitate graphic user interface processing; image processing instructions 4478 to facilitate image-related processing and functions; input processing instructions 4480 to facilitate input-related (e.g., touch input) processes and functions; audio processing instructions 4482 to facilitate audio-related processes and functions; and camera instructions 4484 to facilitate camera-related processes and functions. The instructions described above are merely exemplary and the memory 4470 includes additional and/or other instructions in some embodiments. For instance, the memory for a smartphone may include phone instructions to facilitate phone-related processes and functions. Additionally, the memory may include instructions for a commute application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 44 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 44 may be split into two or more integrated circuits.

B. Computer System

Figure 45:
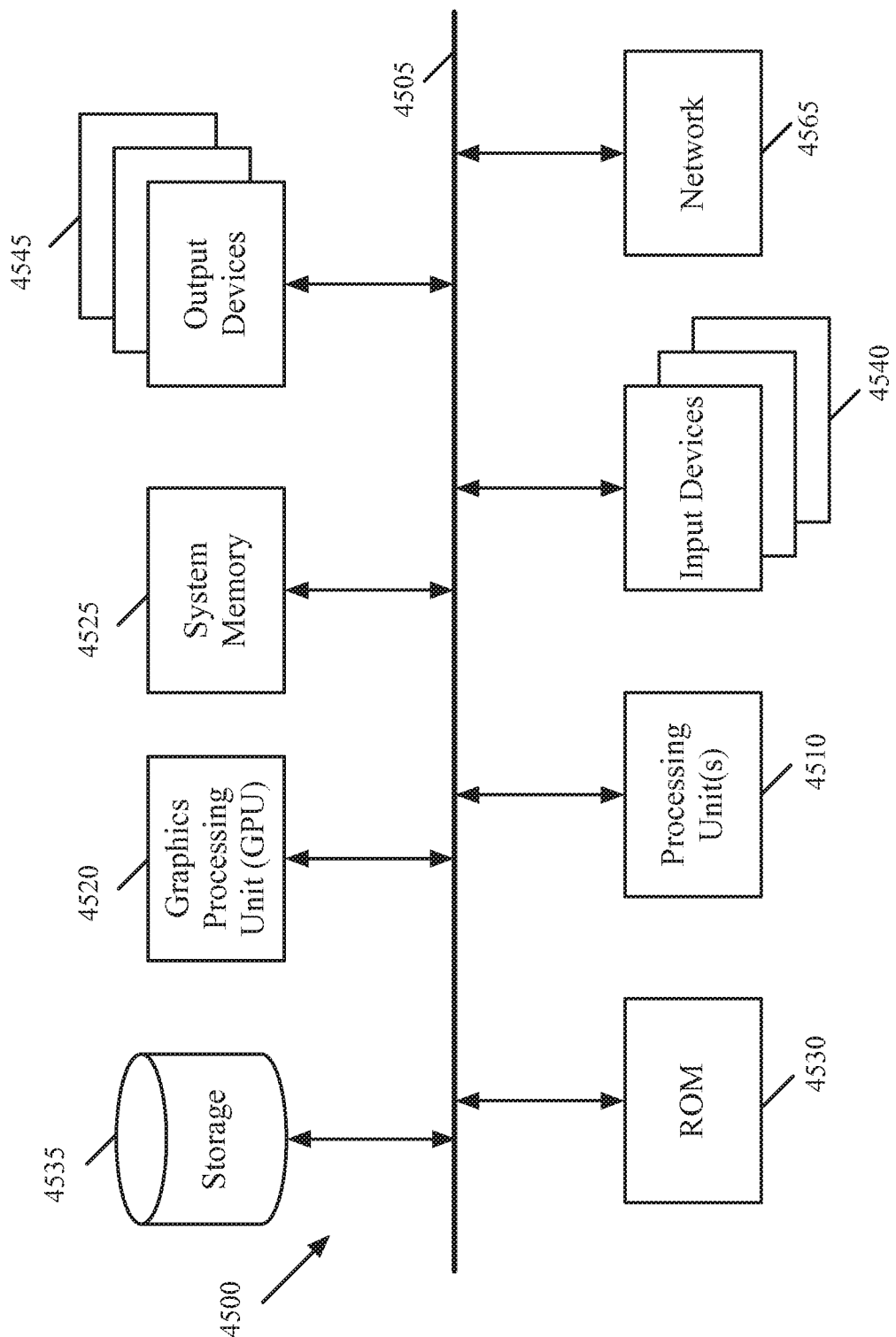
FIG. 45 conceptually illustrates an example of an electronic system with which some embodiments of the invention are implemented.

FIG. 45 conceptually illustrates another example of an electronic system 4500 with which some embodiments of the invention are implemented. The electronic system 4500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 4500 includes a bus 4505, processing unit(s) 4510, a graphics processing unit (GPU) 4515, a system memory 4520, a network 4525, a read-only memory 4530, a permanent storage device 4535, input devices 4540, and output devices 4545.

The bus 4505 collectively represents all system, peripheral, and chipset buses that communicatively connect the numerous internal devices of the electronic system 4500. For instance, the bus 4505 communicatively connects the processing unit(s) 4510 with the read-only memory 4530, the GPU 4515, the system memory 4520, and the permanent storage device 4535.

From these various memory units, the processing unit(s) 4510 retrieves instructions to execute and data to process in order to execute the processes of the invention. The processing unit(s) may be a single processor or a multi-core processor in different embodiments. Some instructions are passed to and executed by the GPU 4515. The GPU 4515 can offload various computations or complement the image processing provided by the processing unit(s) 4510.

The read-only-memory (ROM) 4530 stores static data and instructions that are needed by the processing unit(s) 4510 and other modules of the electronic system. The permanent storage device 4535, on the other hand, is a read-and-write memory device. This device is a non-volatile memory unit that stores instructions and data even when the electronic system 4500 is off. Some embodiments of the invention use a mass-storage device (such as a magnetic or optical disk and its corresponding disk drive, integrated flash memory) as the permanent storage device 4535.

Other embodiments use a removable storage device (such as a floppy disk, flash memory device, etc., and its corresponding drive) as the permanent storage device. Like the permanent storage device 4535, the system memory 4520 is a read-and-write memory device. However, unlike storage device 4535, the system memory 4520 is a volatile read-and-write memory, such a random access memory. The system memory 4520 stores some of the instructions and data that the processor needs at runtime. In some embodiments, the invention's processes are stored in the system memory 4520, the permanent storage device 4535, and/or the read-only memory 4530. From these various memory units, the processing unit(s) 4510 retrieves instructions to execute and data to process in order to execute the processes of some embodiments.

The bus 4505 also connects to the input and output devices 4540 and 4545. The input devices 4540 enable the user to communicate information and select commands to the electronic system. The input devices 4540 include alphanumeric keyboards and pointing devices (also called "cursor control devices"), cameras (e.g., webcams), microphones or similar devices for receiving voice commands, etc. The output devices 4545 display images generated by the electronic system or otherwise output data. The output devices 4545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 45, bus 4505 also couples electronic system 4500 to a network 4525 through a network adapter (not shown). In this manner, the computer can be a part of a network of computers (such as a local area network ("LAN"), a wide area network ("WAN"), or an Intranet, or a network of networks, such as the Internet. Any or all components of electronic system 4500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 42 and 43) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. For example, the various affordances (e.g., selectable UI items, slider controls, etc.) illustrated in FIGS. 1-7, 9-25, and 28-39 are examples of affordances that can be used in some embodiments. One of ordinary skill in the art will understand that any number of different affordances can be used in FIGS. 1-7, 9-25, and 28-39. For instance, FIG. 25 illustrates the selectable UI item 2535 for displaying different trips along different routes that stop at a particular stop. In some embodiments, the commute application provides a set of tools that allows a user to specify the particular stop for displaying different trips along different routes that stop at the particular stop. Thus, one of ordinary skill in the art would understand that the invention is not to be limited by the foregoing illustrative details, but rather is to be defined by the appended claims.

What is claimed is:

1. A non-transitory machine-readable medium storing a commute application which when executed by at least one processing unit of a device provides routes and schedules for routes in a transit system, the commute application comprising sets of instructions for:

presenting a transit map presentation that includes a plurality of transit stops of the transit system;

receiving, by user input on the transit map presentation, a selection of a particular transit stop of the transit system;

in response to the selection of the particular transit stop from the transit map presentation, presenting a first presentation displaying a sequence of trips corresponding to a plurality of transit routes that traverse through the particular transit stop;

receiving a selection of a first trip of the sequence of trips associated with the particular transit stop and corresponding to a first route;

in response to the selection of the first trip, replacing the first presentation with a second presentation that presents information associated with the selected first trip while excluding information associated with all other trips, where the second presentation presents a first sequence of stops corresponding to the first route associated with the first trip and first timing information associated with the first sequence of stops corresponding to the first trip, the first sequence of stops including a beginning stop, an ending stop, and a plurality of intermediate stops corresponding to the first route;

receiving an input on the second presentation; and in response to the input, replacing the second presentation with a third presentation that presents information associated with a second trip while excluding information associated with all other trips, where the third presentation presents a second sequence of stops corresponding to a second route associated with the second trip and second timing information associated with the second sequence of stops corresponding to the second trip.

2. The non-transitory machine-readable medium of claim 1, wherein the commute application further comprises sets of instructions for:

identifying one or more routes that include the particular transit stop; and identifying one or more of the plurality of trips that traverse the one or more routes that include the particular transit stop.

3. The non-transitory machine-readable medium of claim 1, wherein the second presentation represents a dynamic focus table, and wherein the commute application further comprises sets of instructions for:

in response to receiving the selection of the particular transit stop, providing the dynamic focus table comprising a first portion for displaying the first sequence of stops along the first route traversing the particular transit stop and a second portion for displaying metadata regarding the first route, wherein the metadata presented in the second portion is automatically updated whenever a different sequence of stops is displayed in the first portion of the dynamic focus table.

4. The non-transitory machine-readable medium of claim 3, wherein the device displays the second presentation on a touch-sensitive display of the device, and wherein the commute application further comprises sets of instructions for:

receiving a scroll input on the second portion of the dynamic focus table; and automatically modifying, in the first portion, the metadata for the first route in response to the scroll input.

5. The non-transitory machine-readable medium of claim 4, wherein the scroll input in the second portion is a rightward input, and wherein the commute application further comprises sets of instructions for:

displaying, in the second presentation, a set of scheduled arrival times associated with a second trip along the first route that occurs before the first trip.

6. The non-transitory machine-readable medium of claim 4, wherein the scroll input in the second portion is a leftward input, and wherein the commute application further comprises sets of instructions for:

displaying, in the second presentation, a set of scheduled arrival times associated with a third trip along the first route that occurs after the first trip.

7. The non-transitory machine-readable medium of claim 1, wherein the commute application further comprises sets of instructions for:

displaying a graphical object on the second presentation for transitioning back to the first presentation;

receiving a selection of the graphical object; and transitioning from the second presentation back to the first presentation.

8. The non-transitory machine-readable medium of claim 1, wherein the commute application further comprises sets of instructions for:

determining that one or more trips in the sequence of trips displayed in the first presentation occurred in the past; and displaying the one or more determined trips in a deemphasized manner.

9. The non-transitory machine-readable medium of claim 1, wherein the commute application further comprises sets of instructions for:

determining that a transit vehicle does not stop at one or more stops in the first sequence of stops displayed in the second presentation; and displaying the one or more determined stops without any scheduled arrival times.

10. A method for providing a graphical user interface (GUI) of a commute application, the method comprising:

presenting a map presentation that includes a plurality of transit stops of the transit system;

receiving, by user input on the map presentation, a selection of a particular transit stop of the transit system;

in response to the selection of the particular transit stop from the map presentation, presenting a first presentation displaying a sequence of trips corresponding to a plurality of transit routes that traverse through the particular transit stop;

receiving a selection of a first trip of the sequence of trips associated with the particular transit stop and corresponding to a first route;

in response to the selection of the first trip, replacing the first presentation with a second presentation that presents information associated with the selected first trip while excluding information associated with all other trips, where the second presentation presents a first sequence of stops corresponding to the first route associated with the first trip and first timing information associated with the first sequence of stops corresponding to the first trip, the first sequence of stops including a beginning stop, an ending stop, and a plurality of intermediate stops corresponding to the first route;

receiving an input on the second presentation; and in response to the input, replacing the second presentation with a third presentation that presents information associated with a second trip while excluding information associated with all other trips, where the third presentation presents a second sequence of stops corresponding to a second route associated with the second trip and second timing information associated with the second sequence of stops corresponding to the second trip.

11. The method of claim 10, further comprising:
identifying one or more routes that include the particular transit stop; and
identifying one or more of the plurality of trips that traverse the one or more routes that include the particular transit stop.

12. The method of claim 10, wherein the second presentation represents a dynamic focus table, further comprising:
in response to receiving the selection of the particular transit stop, providing the dynamic focus table comprising a first portion for displaying the first sequence of stops along the first route traversing the particular transit stop and a second portion for displaying metadata regarding the first route, wherein the metadata presented in the second portion is automatically updated whenever a different sequence of stops is displayed in the first portion of the dynamic focus table.

13. The method of claim 12, wherein the device displays the second presentation on a touch-sensitive display of the device, further comprising:
receiving a scroll input on the second portion of the dynamic focus table; and
automatically modifying, in the first portion, the metadata for the first route in response to the scroll input.

14. The method of claim 13, wherein the scroll input in the second portion is a rightward input, further comprising:
displaying, in the second presentation, a set of scheduled arrival times associated with a second trip along the first route that occurs before the first trip.

15. The method of claim 13, wherein the scroll input in the second portion is a leftward input, further comprising:
displaying, in the second presentation, a set of scheduled arrival times associated with a third trip along the first route that occurs after the first trip.

16. An electronic device comprising a non-transitory medium for storing a storing a commute application which, when executed by at least one processing unit of the device, provides routes and schedules for routes in a transit system, the commute application comprising sets of instructions for:
presenting a map presentation that includes a plurality of transit stops of the transit system;
receiving, by user input on the map presentation, a selection of a particular transit stop of the transit system;
in response to the selection of the particular transit stop from the map presentation, presenting a first presentation displaying a sequence of trips corresponding to a plurality of transit routes that traverse through the particular transit stop;
receiving a selection of a first trip of the sequence of trips associated with the particular transit stop and corresponding to a first route;
in response to the selection of the first trip, replacing the first presentation with a second presentation that presents information associated with the selected first trip while excluding information associated with all other trips, where the second presentation presents a first sequence of stops corresponding to the first route associated with the first trip and first timing information associated with the first sequence of stops corresponding to the first trip, the first sequence of stops including a beginning stop, an ending stop, and a plurality of intermediate stops corresponding to the first route;
receiving an input on the second presentation; and
in response to the input, replacing the second presentation with a third presentation that presents information associated with a second trip while excluding information associated with all other trips, where the third presentation presents a second sequence of stops corresponding to a second route associated with the second trip and second timing information associated with the second sequence of stops corresponding to the second trip.

17. The device of claim 16, wherein the second presentation represents a dynamic focus table, wherein the commute application further comprises sets of instructions for:
in response to receiving the selection of the particular transit stop, providing the dynamic focus table comprising a first portion for displaying the first sequence of stops along the first route traversing the particular transit stop and a second portion for displaying metadata regarding the first route, wherein the metadata presented in the second portion is automatically updated whenever a different sequence of stops is displayed in the first portion of the dynamic focus table.

18. The device of claim 17, wherein the device displays the second presentation on a touch-sensitive display of the device, and wherein the commute application further comprises sets of instructions for:
receiving a scroll input on the second portion of the dynamic focus table; and
automatically modifying, in the first portion, the metadata for the first route in response to the scroll input.

19. The device of claim 17, wherein the scroll input in the second portion is one of a leftward input and a rightward input, and wherein the commute application further comprises sets of instructions for:
displaying, in the second presentation, a set of scheduled arrival times associated with a second trip along the first route that occurs before the first trip when the scroll input is a rightward input; and
displaying, in the second presentation, a set of scheduled arrival times associated with a third trip along the first route that occurs after the first trip when the scroll input is a leftward input.

20. The method of claim 1, wherein the second route is the same route as the first route.

21. The non-transitory machine-readable medium of claim 1, wherein a particular graphical element representing the transit stop on the transit map presentation includes a departure time for a next trip for a transit vehicle of a route that traverses through the particular transit stop.

22. The non-transitory machine-readable medium of claim 1, wherein the second route is a different route to the first route.

23. The non-transitory machine-readable medium of claim 1, further comprising:
in response to the selection of the particular transit stop, providing a first transit presentation displaying a first sequence of trips corresponding to a first plurality of transit routes that traverse through the particular transit stop, wherein each trip of the first sequence of trips comprises a different set of scheduled arrival times at which transit vehicles are scheduled to stop at the first transit stop after arriving from a second transit stop and before traveling to a third transit stop.

24. The non-transitory machine-readable medium of claim 1, wherein the transit system is a private transit system.

25. The method of claim 10, wherein the transit system is a private transit system.

26. The electronic device of claim 16, wherein the transit system is a private transit system.

\* \* \* \* \*